(12) United States Patent
Kawashima et al.

(10) Patent No.: US 7,093,941 B2
(45) Date of Patent: Aug. 22, 2006

(54) VIDEO DISPLAY APPARATUS AND VIDEO DISPLAY METHOD

(75) Inventors: Masahiro Kawashima, Ibaraki (JP); Hitoshi Noda, Suita (JP); Takaaki Gyoten, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/311,925

(22) PCT Filed: Apr. 19, 2002

(86) PCT No.: PCT/JP02/03900

§ 371 (c)(1),
(2), (4) Date: Dec. 20, 2002

(87) PCT Pub. No.: WO02/089106

PCT Pub. Date: Nov. 7, 2002

(65) Prior Publication Data

US 2003/0146919 A1    Aug. 7, 2003

(30) Foreign Application Priority Data

Apr. 25, 2001 (JP) .............................. 2001-128094
May 31, 2001 (JP) .............................. 2001-165052

(51) Int. Cl.
*G03B 21/20* (2006.01)
*G02F 1/13357* (2006.01)

(52) U.S. Cl. ...................... 353/97; 353/121; 353/30; 348/790; 349/61

(58) Field of Classification Search ............... 353/85, 353/86, 30, 31, 29, 122, 121, 28, 69, 97; 349/5, 61, 72; 348/771, 790, 791; G03B 21/20
See application file for complete search history.

(56) References Cited

U.S. PATENT DOCUMENTS

| | | | | |
|---|---|---|---|---|
| 3,833,297 | A * | 9/1974 | Swartz | 353/85 |
| 5,257,108 | A * | 10/1993 | Muraoka | 348/674 |
| 5,658,062 | A * | 8/1997 | Lee et al. | 353/85 |
| 5,717,422 | A | 2/1998 | Fergason | 345/102 |
| 6,614,475 | B1 * | 9/2003 | Yamaga et al. | 348/254 |
| 6,631,995 | B1 * | 10/2003 | Stanton et al. | 353/84 |
| 6,634,757 | B1 * | 10/2003 | Asakawa | 353/85 |
| 6,694,104 | B1 * | 2/2004 | Caplan et al. | 398/197 |
| 6,747,708 | B1 * | 6/2004 | Taniai et al. | 348/761 |

FOREIGN PATENT DOCUMENTS

EP    0 730 371    9/1996

(Continued)

*Primary Examiner*—W. B. Perkey
*Assistant Examiner*—Andrew Sever
(74) *Attorney, Agent, or Firm*—Wenderoth, Lind & Ponack, L.L.P.

(57) ABSTRACT

An APL detection unit detects the APL for each unit field time period of an input video signal, and a light source control data production unit produces, depending on the results of the APL detection, a light source control signal at a minimum level which can stably drive a light source when the APL is 0% up to a predetermined value A1, a light source control signal at a maximum level which can stably drive the light source when the APL is a predetermined value A2 up to 100%, and a light source control signal which dynamically varies depending on the APL when the APL is between the predetermined value A1 and the predetermined value A2, to drive the light source on the basis of the light source control signal. As a result, it is possible to mitigate the lack of a contrast feeling and the occurrence of a floating blackness, as well as to improve the reliability of the light source.

52 Claims, 40 Drawing Sheets

FOREIGN PATENT DOCUMENTS

| | | |
|---|---|---|
| EP | 1 11 578 | 6/2001 |
| JP | 3-179886 | 8/1991 |
| JP | 5-66501 | 3/1993 |
| JP | 5-127608 | 5/1993 |
| JP | 5-188345 | 7/1993 |
| JP | 6-160811 | 6/1994 |
| JP | 7-129113 | 5/1995 |
| JP | 7-322179 | 12/1995 |
| JP | 8-201812 | 8/1996 |
| JP | 8-202319 | 8/1996 |
| JP | 9-244548 | 9/1997 |
| JP | 11-109317 | 4/1999 |
| JP | 2000-321571 | 11/2000 |
| JP | 2000-330542 | 11/2002 |
| WO | 00/68926 | 11/2000 |

\* cited by examiner

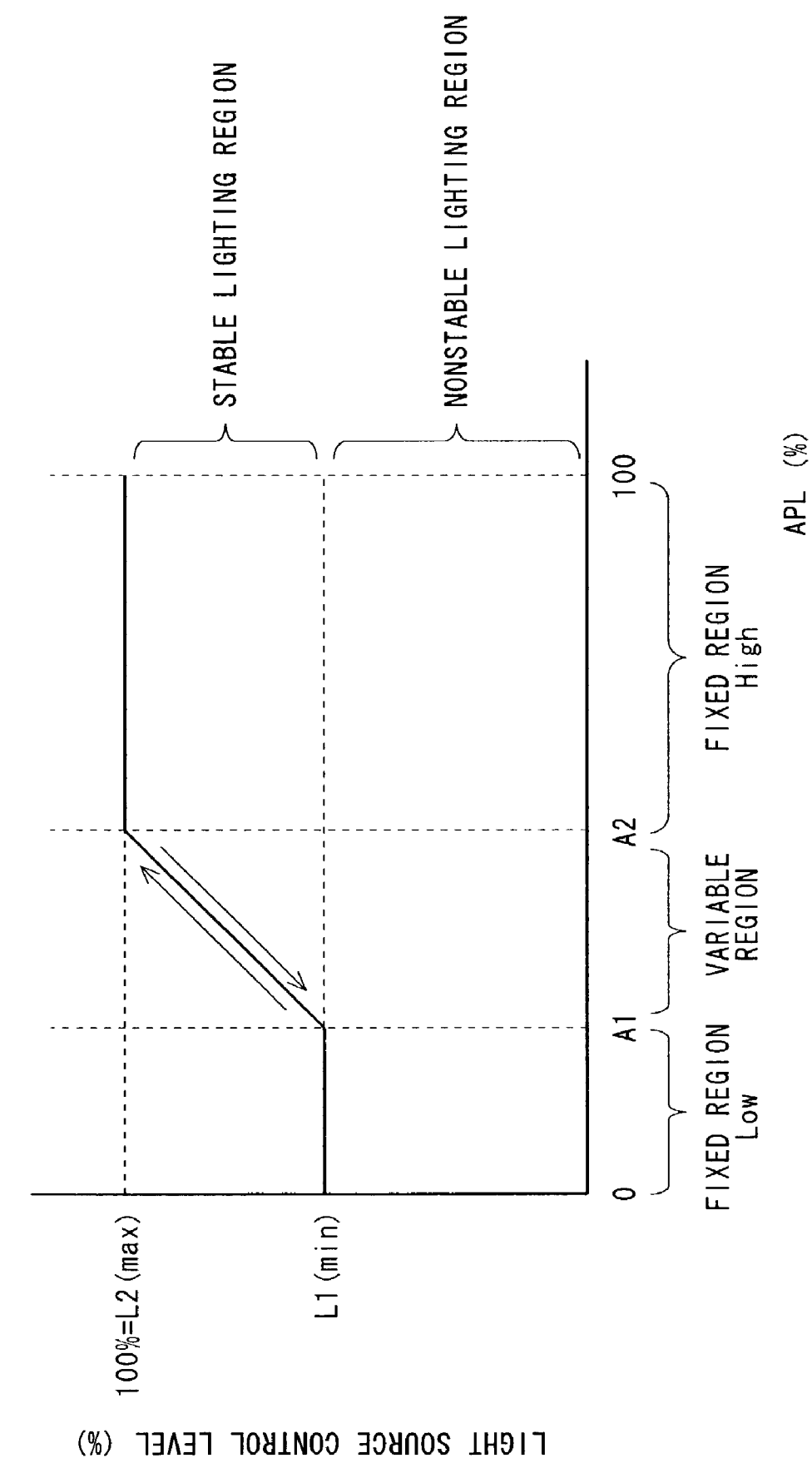
F I G. 5

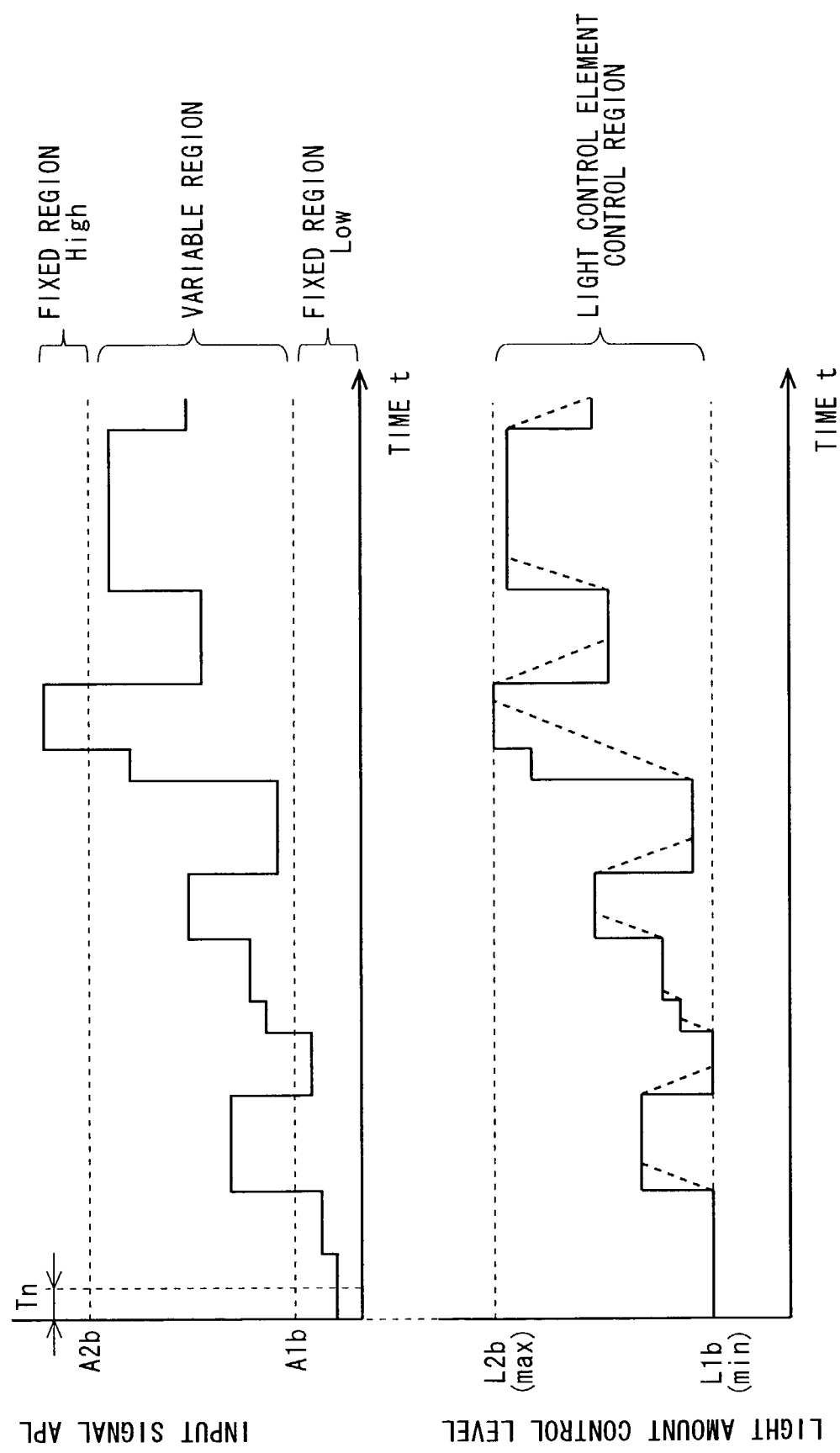
F I G. 13

VIDEO DISPLAY APPARATUS AND VIDEO DISPLAY METHOD

TECHNICAL FIELD

The present invention relates to a video display apparatus and a video display method, and more particularly, to a video display apparatus and a video display method, in which light from a light source is irradiated onto a transmission type or reflection type display component having a light modulating function to display video.

BACKGROUND ART

In recent years, with enhancement of video equipment, such as a video tape recorder or a video disk player and video software, desires for image display apparatuses capable of enjoying powerful video have increased.

Examples of video display apparatuses for spatially modulating light emitted from a light source by a transmission type or reflection type display component having a light modulating function to display video include a direct view type liquid crystal display apparatus and a projection type display apparatus. In the direct view type liquid crystal display apparatus, a liquid crystal panel is used for the display component, video displayed on the liquid crystal panel is directly viewed. On the other hand, the direct view type display apparatus, the projection type display apparatus has a primary object: to reduce the power consumption of the apparatus rather than to improve the display quality; to carry out brightness control to set the brightness of video so that the video is easily seen with respect to a screen size and under environmental illumination conditions; and to lengthen the life of the light source. And, as in the direct view type liquid crystal display apparatus, the brightness level of the light source is controlled manually by a user and, thereafter, the brightness of the light source is in a fixed state.

As described in the foregoing, in both the conventional direct view type liquid crystal display apparatus and projection type display apparatus, there have been strong demands for the improvement in the display quality over the lack of the brightness feeling in the bright scene and the floating blackness in the dark scene, as compared with the self-light emission type display apparatus, such as the CRT. However, the method of controlling the brightness of the light source which has been employed in the conventional direct view type liquid crystal display apparatus and projection type display apparatus is static fixed control and does not cope with the dynamic change in the input video signal, as described above. Therefore, the display quality in each scene of the input video signal cannot be improved.

As one method of improving the display quality, a method of dynamically changing the brightness of a light source depending on a video scene has been proposed. The method is disclosed in Japanese Patent Laid-Open Publication No. 5-127608 and Japanese Patent Laid-Open Publication No. 6-160811, for example.

Japanese Patent Laid-Open Publication No. 5-127608 has proposed a method of detecting the features of an input video signal from the maximum value and the minimum value of the input video signal, and an average value there between, to lower, when the level difference between the maximum value and the minimum value is large, contrast control to decrease signal amplification gain, while conversely raising, when the level difference between the maximum value and the minimum value is small, contrast control to increase signal amplification gain as well as to lower, when the average value between the maximum value and the minimum value is higher than a defined value previously set, the brightness of a light source to bring the brightness of a display apparatus nearer to a predetermined value.

On the other hand, Japanese Patent Laid-Open Publication No. 6-160811 has proposed a method of detecting the maximum value of an input video signal, to raise the brightness of a light source when the maximum value is high, while lowering the brightness of the light source when the maximum value is low, and to make the amplitude of a brightness signal in a case of a low maximum value smaller than the amplitude of the brightness signal in a case of a high maximum value, thereby increasing the relative contrast ratio in a case where the maximum value is high and a case where it is low.

A technique proposed in Japanese Patent Laid-Open Publication No. 5-127608 is to dynamically control the brightness of the light source depending on an input scene, as described above. However, an object is to make the display brightness constant. Therefore, floating blackness is not mitigated for a dark scene as in movie software. The brightness of the light source is controlled on the basis of the average value between the maximum value and the minimum value of the input video signal. Therefore, in an input scene where the maximum value is locally high or the minimum value is locally low, the features of the input scene cannot be entirely grasped, leading to an unsuitable control of the brightness of the light source. Further, the brightness of the light source is discontinuously controlled. Accordingly, the brightness of a screen is greatly changed at the time point where the brightness of the light source is changed, thereby giving an uncomfortable feeling to a viewer.

On the other hand, a technique proposed in Japanese Patent Laid-Open Publication No. 6-160811 is also to dynamically control the brightness of the light source depending on the input video signal, as described above. However, the brightness of the light source is controlled depending on the maximum value of the input video signal. In the case of such an input scene where the maximum value is locally high despite the fact that an average brightness (picture) level (hereinafter referred to as APL) is low, the brightness of the light source is high, causing floating blackness in a dark portion of video. Further, a discharging light source, such as a xenon lamp or a high-pressure mercury lamp, employed for the projection type display apparatus repeats a rapid change in driving conditions to cause instability of lighting starting characteristics, and degradation in stable lighting characteristics and degradation in life characteristics, such as flicker at the time of stationary lighting, resulting in the degraded reliability of the lamp.

Therefore, an object of the present invention is to mitigate the problems of the quality of display video (lack of a contrast feeling, floating blackness) in a video display apparatus including a transmission type or reflection type display component having a light modulating function and a light source for irradiating light onto the display component. Another object of the present invention is to mitigate the degradation in the reliability of a light source, an optical aperture, or a light control element for controlling the amount of light irradiated onto the display component in a case where the amount of light is dynamically controlled.

Still another object of the present invention is to provide a video display apparatus and a video display method, in which the brightness of a light source is changed depending on an input video signal, to realize the display of video having a contrast feeling, while capable of preventing an uncomfortable feeling during display caused by the rapid change in the brightness of the light source and improving the life characteristics of the light source.

SUMMARY OF THE INVENTION

In order to attain the above-mentioned objects, the present invention has features as described below.

A first aspect of the present invention is directed to a video display apparatus that irradiates light from a light source onto a transmission type or reflection type display component having a light modulating function to display video, including:

APL detection means for detecting an average brightness level of an input video signal;

light amount control data production means for producing light amount control data for controlling an amount of the light irradiated onto the display component on the basis of the average brightness level detected by the APL detection means; and light amount control means for controlling the amount of the light irradiated onto the display component on the basis of the light amount control data, wherein the light amount control data production means produces light amount control data such that the amount of the light irradiated onto the display component is controlled so as to be at a predetermined minimum level or at a level close thereto when the average brightness level detected by the APL detection means is within a range of not more than a first predetermined value.

According to the above-mentioned first aspect, the brightness can be dynamically controlled depending on a video scene, thereby making it possible to mitigate the problems of lack of a brightness feeing in a bright scene and floating blackness in a dark scene, to increase a contrast feeling. Further, in the case of the dark scene, that is, in a case where the APL of the input video signal is in a range lower than a predetermined threshold value, control is carried out such that the amount of the light irradiated onto the display component is at a predetermined minimum level or at a level close thereto, thereby making it possible to further mitigate the problem of the floating blackness in the dark scene. As a result, the contrast feeling can be further increased.

According to a second aspect based on the first aspect, the light amount control data production means includes light source control data production means for producing light source control data for controlling the light source on the basis of the average brightness level detected by the APL detection means, the light amount control means includes light source driving means for driving the light source on the basis of the light source control data, and the light source control data production means produces the light source control data so as to drive the light source at a minimum level at which it can be stably driven or at a level close thereto when the average brightness level detected by the APL detection means is in a range of not more than the first predetermined value.

According to the above-mentioned second aspect, the brightness can be dynamically driven depending on a video scene by dynamically driving the light source, thereby making it possible to mitigate the problems of lack of a brightness feeing in a bright scene and floating blackness in a dark scene, to increase a contrast feeling. Further, in the case of the dark scene, that is, in a case where the APL of the input video signal is in a range lower than a predetermined threshold value, the light source is driven at the minimum level at which it can be stably driven or a level close thereto, thereby making it possible to further mitigate the problem of the floating blackness in the dark scene. As a result, the contrast feeling can be further increased.

According to a third aspect based on the first aspect, the video display apparatus further includes an optical aperture placed between the light source and the display component for controlling the amount of the light irradiated onto the display component, wherein the light amount control data production means includes optical aperture control data production means for producing optical aperture control data for controlling the optical aperture on the basis of the average brightness level detected by the APL detection means, and the light amount control means includes optical aperture driving means for driving the optical aperture on the basis of the optical aperture control data, and the optical aperture control data production means produces the optical aperture control data so as to drive the optical aperture such that the amount of the light irradiated onto the display component is at the predetermined minimum level or at a level close thereto when the average brightness level detected by the APL detection means is in a range of not more than the first predetermined value.

According to the above-mentioned third aspect, the brightness can be dynamically controlled depending on a video scene by dynamically driving the optical aperture, thereby making it possible to mitigate the problems of lack of a brightness feeing in a bright scene and floating blackness in a dark scene, to increase a contrast feeling. Further, in the case of the dark scene, that is, in a case where the APL of the input video signal is in a range lower than a predetermined threshold value, the optical aperture is driven such that the amount of the light irradiated onto the display component is at the predetermined minimum level or at a level close thereto, thereby making it possible to further mitigate the problem of the floating blackness in the dark scene. As a result, the contrast feeling can be further increased.

According to a fourth aspect based on the first aspect, the video display apparatus further includes a light control element placed between the light source and the display component for controlling the amount of the light irradiated onto the display component, wherein the light amount control data production means includes light control element control data production means for producing light control element control data for controlling the light control element on the basis of the average brightness level detected by the APL detection means, the light amount control means includes light control element driving means for driving the light control element on the basis of the light control element control data, and the light control element control data production means produces the light control element control data so as to drive the light control element such that the amount of the light irradiated onto the display component is at the predetermined minimum level or a level close thereto when the average brightness level detected by the APL detection means is in a range of not more than the first predetermined value.

According to the above-mentioned fourth aspect, the brightness can be dynamically controlled depending on a video scene by dynamically driving the light control element, thereby making it possible to mitigate the problems of lack of a brightness feeling in a bright scene and floating blackness in a dark scene, to increase a contrast feeling.

Further, in the case of the dark scene, that is, in a case where the APL of the input video signal is in a range lower than a predetermined threshold value, the light control in the projection type display apparatus, a powerful light source is used, and video displayed on a liquid crystal panel or other display components is projected for viewing.

When the video display apparatus using the display component having a light modulating function and a video display apparatus using a self-light emission type display component, such as a CRT (Cathode Ray Tube), are compared with each other, lack of a brightness feeling in a bright scene and floating blackness in a dark scene, for example, are problems in the direct view type liquid crystal display apparatus. Therefore, attempts to solve the problems have been made.

In the direct view type liquid crystal display apparatus, an example of a method generally carried out in order to improve the display quality is an electrical signal control method, such as contrast control (control of a signal amplification gain) and black level control for an inputted video signal. Further, there is an apparatus adapted so that the brightness level of a light source can be varied to several levels in addition to the electrical control. However, the brightness level of the light source is controlled manually by a user and, thereafter, the brightness of the light source is in a fixed state.

On the other hand, even in the projection type display apparatus, a display apparatus including the function of controlling the brightness level of a light source has been similarly put to practical use. In this case, however, unlike element is driven such that the amount of the light irradiated onto the display component is at the predetermined minimum level or at a level close thereto, thereby making it possible to further mitigate the problem of the floating blackness in the dark scene. As a result, the contrast feeling can be further increased.

According to a fifth aspect based on the first aspect, a ratio of the amount of change in the amount of the light irradiated onto the display component to the amount of change in the average brightness level in a case where the average brightness level detected by the APL detection means changes from the minimum level to the first predetermined value is lower than a ratio of the amount of change in the amount of the light irradiated onto the display component to the amount of change in the average brightness level in a case where the average brightness level detected by the APL detection means changes from the first predetermined value to a maximum level.

According to the above-mentioned fifth aspect, the problem of the floating blackness in the dark scene can be further mitigated, as compared with that in a case where the amount of the light irradiated onto the display component is controlled in a linear function manner with respect to the results of the APL detection. As a result, the contrast feeing can be further increased.

According to a sixth aspect based on the first aspect, the light amount control data production means produces the light amount control data so as to fix the amount of the light irradiated onto the display component at the predetermined minimum level when the average brightness level detected by the APL detection means is lower than the first predetermined value.

According to the above-mentioned sixth aspect, in the case of the dark scene, that is, in a case where the APL of the input video signal is lower than a predetermined threshold value, the amount of the light irradiated onto the display component is driven at the predetermined minimum level, thereby making it possible to further mitigate the problem of the floating blackness in the dark scene. As a result, the contrast feeling can be further increased. Further, the driving conditions of a controlled system (e.g., alight source, an optical aperture, alight control element) of the light amount control means do not vary in the dark scene, thereby making it possible to mitigate the problem of the degradation in the reliability of the controlled system.

According to a seventh aspect based on the first aspect, the light amount control data production means produces the light amount control data so as to fix the amount of the light irradiated onto the display component at a predetermined maximum level when the average brightness level detected by the APL detection means is higher than the second predetermined value.

According to the above-mentioned seventh aspect, in the case of the bright scene, that is, in a case where the APL of the input video signal is higher than a predetermined threshold value, the amount of the light irradiated onto the display component is driven at the predetermined maximum level, thereby making it possible to further mitigate the problem of the lack of the brightness feeling in the bright scene. As a result, the contrast feeling can be further increased. Further, the driving conditions of a controlled system (e.g., a light source, an optical aperture, a light control element) of the light amount control means do not vary in the bright scene, thereby making it possible to mitigate the problem of the degradation in the reliability of the controlled system.

According to an eighth aspect based on the first aspect, the video display apparatus further includes means for filtering the light amount control data produced by the light amount control data production means, to provide a delay function to the change in the light amount control data.

According to the above-mentioned eighth aspect, the driving power for a controlled system (e.g., a light source, an optical aperture, a light control element) of the light amount control means is varied by giving the controlled system a time constant, thereby making it possible to prevent the reliability of the controlled system from being degraded by the rapid change in the driving power.

According to a ninth aspect based on the first aspect, the light amount control data production means produces the light amount control data on the basis of an average of the average brightness levels in a plurality of unit field time periods.

According to the above-mentioned ninth aspect, the variation in the driving conditions of a controlled system (e.g., a light source, an optical aperture, a light control element) of the light amount control means can be reduced, thereby making it possible to further reduce the degradation in the reliability of the controlled system.

According to a tenth aspect based on the first aspect, the video display apparatus further includes means for filtering an output at the average brightness level detected by the APL detection means, to provide a delay function to the change in the average brightness level.

According to the above-mentioned tenth aspect, the variation in the driving conditions of a controlled system (e.g., a light source, an optical aperture, a light control element) of the light amount control means can be reduced, thereby making it possible to further reduce the degradation in the reliability of the controlled system.

According to an eleventh aspect based on the first aspect, the light amount control data production means produces, when the change per unit time in the average brightness level detected by the APL detection means is smaller than a predetermined threshold value, the light amount control data so as to maintain the amount of the light irradiated onto the display component at a level immediately before the change following the change.

According to the above-mentioned eleventh aspect, when the change in the APL is very small, the driving conditions immediately before the change are held without changing the driving conditions of a controlled system (e.g., a light source, an optical aperture, a light control element) of the light amount control means. Accordingly, the frequency of the dynamic transition of the driving conditions of the controlled system is reduced. As a result, the reliability of the controlled system can be increased.

According to a twelfth aspect based on the first aspect, the light amount control data production means produces, when the average brightness level detected by the APL detection means changes to a value lower than the first predetermined value, the light amount control data so as to fix the amount of the light irradiated onto the display component at the predetermined minimum level during a predetermined time period irrespectively of the average brightness level detected by the APL detection means.

According to the above-mentioned twelfth aspect, it is possible to reduce the frequency of the dynamic transition of the driving conditions of a controlled system (e.g., a light source, an optical aperture, a light control element) of the light amount control means to increase the reliability of the controlled system, and it is possible to restrain the frequency of the change in the brightness in the bright scene, thereby improving the quality of display video.

According to a thirteenth aspect based on the seventh aspect, the light amount control data production means produces, when the average brightness level detected by the APL detection means changes to a value higher than the second predetermined value, the light amount control data so as to fix the amount of the light irradiated onto the display component at the predetermined maximum level during a predetermined time period irrespectively of the average brightness level detected by the APL detection means.

According to the above-mentioned thirteenth aspect, it is possible to reduce the frequency of the dynamic transition of the driving conditions of a controlled system (e.g., a light source, an optical aperture, a light control element) of the light amount control means, to increase the reliability of the controlled system.

According to a fourteenth aspect based on the first aspect, the video display apparatus further includes histogram production means for dividing a brightness level of the input video signal into a plurality of brightness level sections, and detecting a histogram distribution for each of the brightness level sections, wherein the light amount control data production means produces, when the histogram distribution for each of the sections which is detected by the histogram production means is in a predetermined distributed state, the light amount control data so as to fix the amount of the light irradiated onto the display component at a predetermined level corresponding to the predetermined distributed state irrespectively of the average brightness level detected by the APL detection means.

According to the fourteenth aspect, the amount of the light irradiated onto the display component is controlled on the basis of the histogram distribution, to more accurately extract the features of a video scene which cannot be uniquely judged from only the results of the APL detection, and the amount of the light irradiated onto the display component is more suitably controlled depending on the features of the video scene, thereby making it possible to improve the quality of display video.

According to a fifteenth aspect based on the fourteenth aspect, the light amount control data production means produces, when the histogram distribution for at least one of the plurality of brightness level sections which is detected by the histogram production means is larger or smaller than a predetermined threshold value, the light amount control data so as to fix the amount of the light irradiated onto the display component at the predetermined level irrespectively of the average brightness level detected by the APL detection means.

According to the above-mentioned fifteenth aspect, the histogram distribution in the certain brightness level of the video signal is compared with the predetermined threshold value, thereby making it possible to easily extract the features of a video scene.

According to a sixteenth aspect based on the fourteenth aspect, the light amount control data production means produces, when it is judged that a video scene related to the input video signal is a dark scene on the basis of the histogram distribution detected by the histogram production means, the light amount control data so as to fix the amount of the light irradiated onto the display component at the predetermined minimum level irrespectively of the average brightness level detected by the APL detection means.

According to the above-mentioned sixteenth aspect, even when a particularly bright portion exists in only a part of a dark scene, and it cannot be judged that the scene is the dark scene from the results of the APL detection, it is judged that the scene is the dark scene, thereby making it possible to control the amount of the light irradiated onto the display component so as to prevent floating blackness.

A seventeenth aspect is directed to a video display method in which light from a light source is irradiated onto a transmission type or reflection type display component having a light modulating function to display video, including:

an APL detection step of detecting an average brightness level of an input video signal;

a light amount control data production step of producing light amount control data for controlling an amount of the light irradiated onto the display component on the basis of the average brightness level detected in the APL detection step; and a light amount control step of controlling the amount of the light irradiated onto the display component on the basis of the light amount control data, wherein the light amount control data production step includes the step of producing light amount control data such that the amount of the light irradiated onto the display component is controlled so as to be at a predetermined minimum level or at a level close thereto when the average brightness level detected in the APL detection step is within a range of not more than a first predetermined value.

According to the above-mentioned seventeenth aspect, the brightness can be dynamically controlled depending on a video scene, thereby making it possible to mitigate the problems of lack of a brightness feeing in a bright scene and floating blackness in a dark scene, to increase a contrast feeling. Further, in the case of the dark scene, that is, in a case where the APL of the input video signal is in a range lower than a predetermined threshold value, control is carried out such that the amount of the light irradiated onto the display component is at a predetermined minimum level or a level close thereto, thereby making it possible to further mitigate the problem of the floating blackness in the dark scene. As a result, the contrast feeling can be further increased.

According to an eighteenth aspect based on the seventeenth aspect, the light amount control data production step includes a light source control data production step of producing light source control data for controlling the light source on the basis of the average brightness level detected in the APL detection step, the light amount control step includes a light source driving step of driving the light source on the basis of the light source control data, and the light source control data production step includes the step of producing the light source control data so as to drive the light source at a minimum level at which it can be stably driven or at a level close thereto when the average brightness level detected in the APL detection step is in a range of not more than the first predetermined value.

According to a nineteenth aspect based on the seventeenth aspect, the light amount control data production step includes an optical aperture control data production step of producing optical aperture control data for controlling an optical aperture placed between the light source and the display component for controlling the amount of the light irradiated onto the display component on the basis of the average brightness level detected in the APL detection step, the light amount control step includes an optical aperture driving step of driving the optical aperture on the basis of the optical aperture control data, and the optical aperture control data production step includes the step of producing the optical aperture control data so as to drive the optical aperture such that the amount of the light irradiated onto the display component is at the predetermined minimum level or at a level close thereto when the average brightness level detected in the APL detection step is in a range of not more than the first predetermined value.

According to a twentieth aspect based on the seventeenth aspect, the light amount control data production step includes a light control element control data production step of producing light control element control data for controlling a light control element placed between the light source and the display component for controlling the amount of the light irradiated onto the display component on the basis of the average brightness level detected in the APL detection step, the light amount control step includes a light control element driving step of driving the light control element on the basis of the light control element control data, and the light control element control data production step produces the light control element control data so as to drive the light control element such that the amount of the light irradiated onto the display component is at the predetermined minimum level or at a level close thereto when the average brightness level detected in the APL detection step is in a range of not more than the first predetermined value.

According to a twenty-first aspect based on the seventeenth aspect, a ratio of the amount of change in the amount of the light irradiated onto the display component to the amount of change in the average brightness level in a case where the average brightness level detected in the APL detection step changes from the minimum level to the first predetermined value is lower than a ratio of the amount of change in the amount of the light irradiated onto the display component to the amount of change in the average brightness level in a case where the average brightness level detected in the APL detection step changes from the first predetermined value to a maximum level.

According to a twenty-second aspect based on the seventeenth aspect, the light amount control data production step includes the step of producing such light amount control data as to fix the amount of the light irradiated onto the display component at the predetermined minimum level when the average brightness level detected in the APL detection step is lower than the first predetermined value.

According to a twenty-third aspect based on the seventeenth aspect, the light amount control data production step includes the step of producing the light amount control data so as to fix the amount of the light irradiated onto the display component at the predetermined maximum level when the average brightness level detected in the APL detection step is higher than the second predetermined value.

According to a twenty-fourth aspect based on the seventeenth aspect, the video display method further includes the step of filtering the light amount control data produced in the light amount control data production step, to provide a delay function to the change in the light amount control data.

According to a twenty-fifth aspect based on the seventeenth aspect, the light amount control data production step includes the step of producing the light amount control data on the basis of an average of the average brightness levels in a plurality of unit field time periods.

According to a twenty-sixth aspect based on the seventeenth aspect, the video display method further includes the step of filtering an output at the average brightness level detected in the APL detection step, to provide a delay function to the change in the average brightness level.

According to a twenty-seventh aspect based on the seventeenth aspect, the light amount control data production step includes the step of producing, when the change per unit time in the average brightness level detected in the APL detection step is smaller than a predetermined threshold value, the light amount control data so as to maintain the amount of the light irradiated onto the display component at a level immediately before the change without following the change.

According to a twenty-eighth aspect based on the seventeenth aspect, the light amount control data production step includes the step of producing, when the average brightness level detected in the APL detection step changes to a value lower than the first predetermined value, the light amount control data so as to fix the amount of the light irradiated onto the display component at the predetermined minimum level during a predetermined time period irrespectively of the average brightness level detected in the APL detection step.

According to a twenty-ninth aspect based on the twenty-third aspect, the light amount control data production step includes the step of producing, when the average brightness level detected in the APL detection step changes to a value higher than the second predetermined value, the light amount control data so as to fix the amount of the light irradiated onto the display component at the predetermined maximum level during a predetermined time period irrespectively of the average brightness level detected in the APL detection step.

According to a thirtieth aspect based on the seventeenth aspect, the video display method further includes a histogram production step of dividing a brightness level of the input video signal into a plurality of brightness level sections, and detecting a histogram distribution for each of the brightness level sections, wherein the light amount control data production step includes the step of producing, when the histogram distribution for each of the sections detected in the histogram production step is in a predetermined distributed state, the light amount control data so as to fix the amount of the light irradiated onto the display component at a predetermined level corresponding to the predetermined distributed state irrespectively of the average brightness level detected in the APL detection step.

According to a thirty-first aspect based on the thirtieth aspect, the light amount control data production step includes the step of producing, when the histogram distribution for at least one of the plurality of brightness level sections which is detected in the histogram production step is larger or smaller than a predetermined threshold value, the light amount control data so as to fix the amount of the light irradiated onto the display component at the predetermined level irrespectively of the average brightness level detected in the APL detection step.

According to a thirty-second aspect based on the thirtieth aspect, the light amount control data production step includes the step of producing, when it is judged that a video scene related to the input video signal is a dark scene on the basis of the histogram distribution detected in the histogram production step, the light amount control data so as to fix the amount of the light irradiated onto the display component at the predetermined minimum level irrespectively of the average brightness level detected in the APL detection step.

A thirty-third aspect is directed to a video display apparatus that irradiates light from a light source onto a transmission type or reflection type display component having a light modulating function to display video, including:

APL detection means for detecting an average brightness level of an input video signal;

light source control signal generation means for generating a light source control signal for dynamically controlling a brightness of the light source depending on the average brightness level detected by the APL detection means on the basis of the average brightness level; and light source driving means for driving the light source depending on the light source control signal generated by the light source control signal generation means, wherein the light source control signal generation means generates the light source control signal such that the amount of change in a level per unit time in the light source control signal is not more than a predetermined amount irrespectively of the change in the average brightness level detected by the APL detection means.

According to the above-mentioned thirty-third aspect, the amount of change in the brightness of the light source is set to not more than the predetermined amount irrespectively of the variation in the APL, thereby making it possible to restrain the change in the brightness of the light source even when the variation in the APL is large. Further, the change in the brightness of the light source is reduced, thereby making it possible to improve the life of the light source.

According to a thirty-fourth aspect based on the thirty-third aspect, the predetermined amount is such an amount of change that the change in the brightness of the light source is hardly perceived.

According to the above-mentioned thirty-fourth aspect, the amount of change in the brightness of the light source is set to such a degree that it is not perceived by a viewer, thereby making it possible to display video having no uncomfortable feeling when the brightness of the light source is dynamically controlled.

According to a thirty-fifth aspect based on the thirty-fourth aspect, the predetermined amount is an amount of change requiring at least 0.3 seconds to change the brightness of the light source in the maximum control width.

According to the above-mentioned thirty-fifth aspect, the predetermined amount of the brightness of the light source is set to an amount of change requiring at least 0.3 seconds to change the brightness in the maximum control width, so that the viewer does not feel the change in the brightness of the light source, thereby making it possible to display video having noun comfortable feeling when the brightness of the light source is dynamically controlled.

According to a thirty-sixth aspect based on the thirty-third aspect, the light source control signal generation means generates the light source control signal by successively adding or subtracting the predetermined amount to or from the level of the light source control signal outputted immediately before the change in the light source control signal generation means depending on the average brightness level detected by the APL detection means.

According to the above-mentioned thirty-sixth aspect, the current light source control signal is generated by adding or subtracting the predetermined amount to or from the level of the light source control signal generated immediately before the change, thereby making it possible to easily limit the amount of the change in the brightness of the light source.

According to a thirty-seventh aspect based on the thirty-third aspect, the light source control signal generation means includes intermediate control signal generation means for generating an intermediate control signal which varies in correspondence with the change in the average brightness level detected by the APL detection means, and signal change control means for controlling the change in the level of the intermediate control signal generated by the intermediate control signal generation means, to generate the light source control signal.

According to the thirty-seventh aspect, the amount of change in the light source control signal can be controlled, after first generating the intermediate control signal which varies in correspondence with the change in the average brightness level detected by the APL detection means, by controlling the change in the level.

According to a thirty-eighth aspect based on the thirty-seventh aspect, the signal change control means adds or subtracts, when the level difference between the light source control signal outputted immediately before the change in the signal change control means and the intermediate control signal generated by the intermediate control signal generation means is larger than a predetermined error amount, the predetermined amount to or from the level of the light source control signal outputted immediately before the change, while outputting, when the level difference is smaller than the predetermined error amount, the intermediate control signal as it is as the light source control signal.

According to the above-mentioned thirty-eighth aspect, in adding or subtracting the predetermined amount to or from the level of the light source control signal generated immediately before the change to generate the current light source control signal, it is possible to avoid the oscillation of the level in the light source control signal.

According to a thirty-ninth aspect based on the thirty-third aspect, the light source control signal generation means generates, when the input video signal is switched, the light source control signal corresponding to the current average brightness level detected by the APL detection means irrespectively of the state of the light source control signal generated immediately before the switching.

According to the above-mentioned thirty-ninth aspect, it is possible to avoid the occurrence of the problem that when the input video signal is switched, an uncomfortable feeling occurs in display video because the controlled state of the brightness of the light source immediately before the switching affects the controlled state after the switching.

A fortieth aspect is directed to a video display apparatus that irradiates light from a light source onto a transmission type or reflection type display component having a light modulating function to display video, including:

APL detection means for detecting an average brightness level of an input video signal;

light source control signal generation means for generating a light source control signal for dynamically controlling a brightness of the light source depending on the average brightness level detected by the APL detection means; and light source driving means for driving the light source depending on the light source control signal generated by the light source control signal generation means, wherein the light source control signal generation means generates the light source control signal such that the amount of change in a level per unit time of the light source control signal in a case where the brightness of the light source is decreased is higher than an amount of change in a case where the brightness of the light source is increased.

According to the above-mentioned fortieth aspect, the amount of change in a case where the brightness of the light source is controlled in the direction in which it decreases is made higher than that in a case where the brightness is controlled in the direction in which it increases, thereby restraining unnaturalness at an intermediate level smaller than a maximum level and larger than a minimum level is continued for a first predetermined time period, the dynamic control of the light source for at least a second predetermined time period.

According to the above-mentioned forty-first aspect, it is possible to prevent the life of the light source from being degraded by continuing to change the brightness of the light source for a long time period. Particularly when the brightness of the light source changes in the intermediate state for not less than the predetermined time period, the control of the brightness of the light source is interrupted, thereby making it possible to interrupt the control of the brightness of the light source at a minimum essential while improving the display quality.

According to a forty-second aspect based on the forty-first aspect, the light source control signal generation means resumes, after an elapse of the second predetermined time period since the dynamic control of the light source was interrupted, the dynamic control of the light source at the time point where the level difference between the average brightness level detected by the APL detection means and the average brightness level at the time of the interruption is within a predetermined difference.

According to the above-mentioned forty-second aspect, the control is not resumed until the level difference between the average brightness level detected by the APL detection means and the average brightness level at the time of the interruption is within the predetermined difference. Accordingly, it is possible to prevent an uncomfortable feeling from occurring in video display by rapidly resuming the interrupted control of the light source.

A forty-third aspect is directed to a video display method in which light from a light source is irradiated onto a transmission type or reflection type display component having a light modulating function to display video, including:

an APL detection step of detecting an average brightness level of an input video signal; and a light source driving step of dynamically driving the light source depending on the average brightness level detected in the APL detection step, wherein the light source driving step includes the step of driving the light source such that the amount of change in the level per unit time of the brightness of the light source is not more than a predetermined amount irrespectively of the change in the average brightness level detected in the APL detection step.

According to the above-mentioned forty-third aspect, the amount of the change in the brightness of the light source is set to not more than the predetermined amount irrespectively of the variation in the APL, thereby making it possible to restrain the change in the brightness of the light source even when the variation in the APL is large. Further, it is possible to improve the life of the light source by reducing the change in the brightness of the light source.

A forty-fourth aspect is directed to a video display method in which light from a light source is irradiated onto a transmission type or reflection type display component having a light modulating function to display video, including:

an APL detection step of detecting an average brightness level of an input video signal; and a light source driving step of dynamically driving the light source depending on the average brightness level detected in the APL detection step, wherein the light source driving step includes the step of driving the light source such that the amount of change in the level per unit time of the brightness of the light source in a case where the brightness of the light source is decreased is more than an amount of change in a case where the brightness of the light source is increased.

According to the above-mentioned forty-fourth aspect, the amount of change in a case where the brightness of the light source is controlled in the direction in which it decreases is made higher than that in a case where the brightness is controlled in the direction in which it increases, thereby restraining unnaturalness by the change in the brightness of the light source in a case where a video scene is changed from a dark scene to a bright scene. On the other hand, particularly when the video scene is changed to the dark scene, the brightness of the light source can be decreased earlier, thereby making it possible to mitigate the degradation of the display quality, for example, floating blackness, due to the fact that the brightness of the light source is high and to improve the quality of display video as a whole.

A forty-fifth aspect is directed to a video display method in which light from a light source is irradiated onto a transmission type or reflection type display component having a light modulating function to display video, including:

an APL detection step of detecting an average brightness level of an input video signal; and a light source driving step of dynamically driving the light source on the basis of the average brightness level detected in the APL detection step, wherein the light source driving step includes the step of driving the light source so as to interrupt, every time a state where the brightness of the light source is controlled at an intermediate level other than a maximum level and other than a minimum level is continued for a first predetermined time period, the dynamic control of the light source for at least a second predetermined time period.

According to the above-mentioned forty-fifth aspect, it is possible to prevent the life of the light source from being degraded by continuing to change the brightness of the light source for a long time period. Particularly when the brightness of the light source changes in the intermediate state for not less than the predetermined time period, the control of the brightness of the light source is interrupted, thereby making it possible to interrupt the control of the brightness of the light source at a minimum essential while improving the display quality.

BRIEF DESCRIPTION OF THE DRAWINGS

FIG. 5 is a diagram showing how a signal processing operation is performed in the first embodiment.

FIG. 13 is a diagram showing a specific example of signal processing when a method of controlling the light source in the first embodiment is applied to control of the light control element.

DETAILED DESCRIPTION OF THE INVENTION

Figure 1:
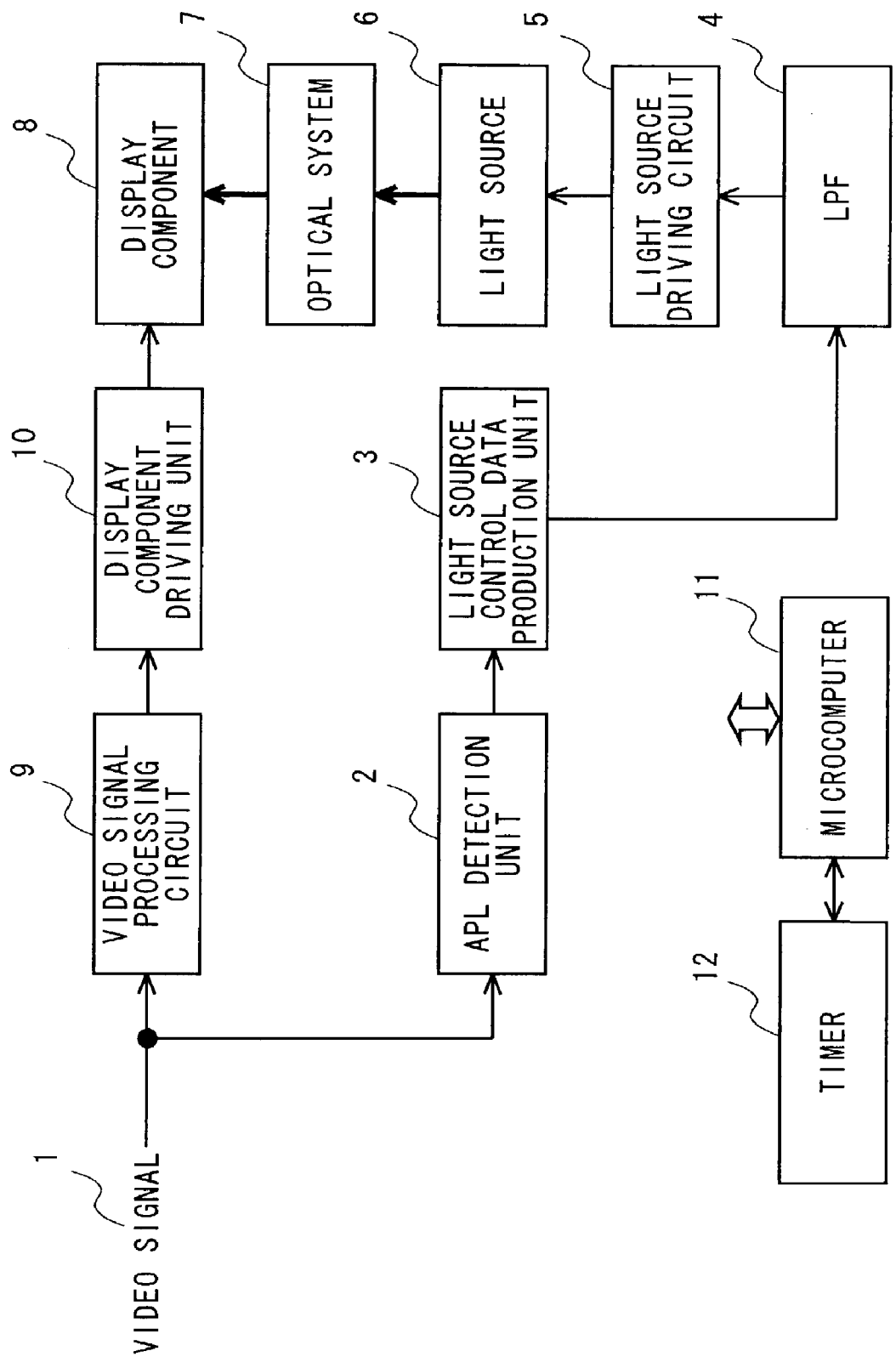
FIG. 1 is a block diagram showing the configuration of a video display apparatus according to a first embodiment of the present invention.

Referring now to the drawings, various embodiments of the present invention will be described with reference to the drawings.

First Embodiment

FIG. 1 illustrates the configuration of a video display apparatus according to a first embodiment of the present invention. The video display apparatus includes an APL detection unit 2, a light source control data production unit 3, an LPF 4, a light source driving circuit 5, a light source 6, an optical system 7, a display component 8, a video signal processing circuit 9, a display component driving unit 10, a microcomputer 11, and a timer 12. The optical system 7 is provided when the video display apparatus is a projector, and is not provided when it is of a direct view type. Operations in the first embodiment are described below.

A video signal 1 is fed to the video display apparatus. The video signal 1 is inputted to the video signal processing circuit 9 and the APL detection unit 2. The video signal 1 inputted to the video signal processing circuit 9 is subjected to signal processing required for a display apparatus, for example, contrast control and brightness control, and is then inputted to the display component 8 as a driving signal adapted to the light modulating function of the display component 8 through the display component driving unit 10. Signal processing in the video signal processing circuit 9 and the display component driving unit 10 are well known and hence, the detailed descriptions thereof are omitted.

The APL detection unit 2 detects an APL for each unit field time period from a brightness signal component of the input video signal 1, to output the results of the detection to the light source control data production unit 3. The light source control data production unit 3 produces light source control data conforming to the results of the APL detection. The produced light source control data is inputted to the light source driving circuit 5 via the LPF 4. The light source driving circuit 5 drives the light source 6 under driving conditions conforming to the light source control data. Light emitted from the light source 6 is converged by the optical system 7, and is irradiated onto the display component 8 as illuminating light corresponding to the display range of the display component 8. The microcomputer 11 and the timer 12 control the APL detection unit 2 and the light source control data production unit 3 in order to carry out time-axis control at the time of detecting the APL and at the time of producing the light source control data.

Figure 2:
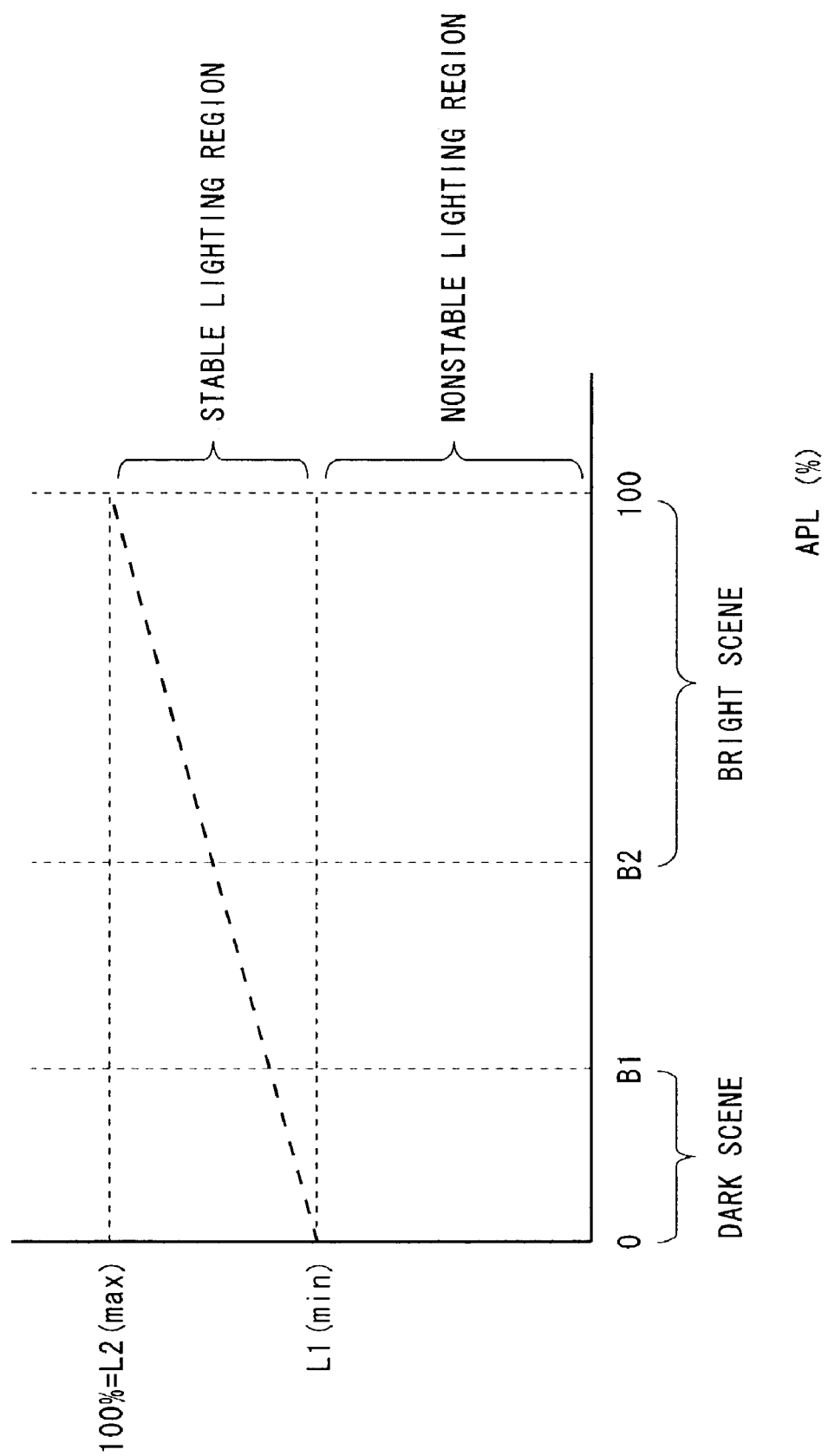
FIG. 2 is a diagram showing one method of light source brightness control.
Figure 3:
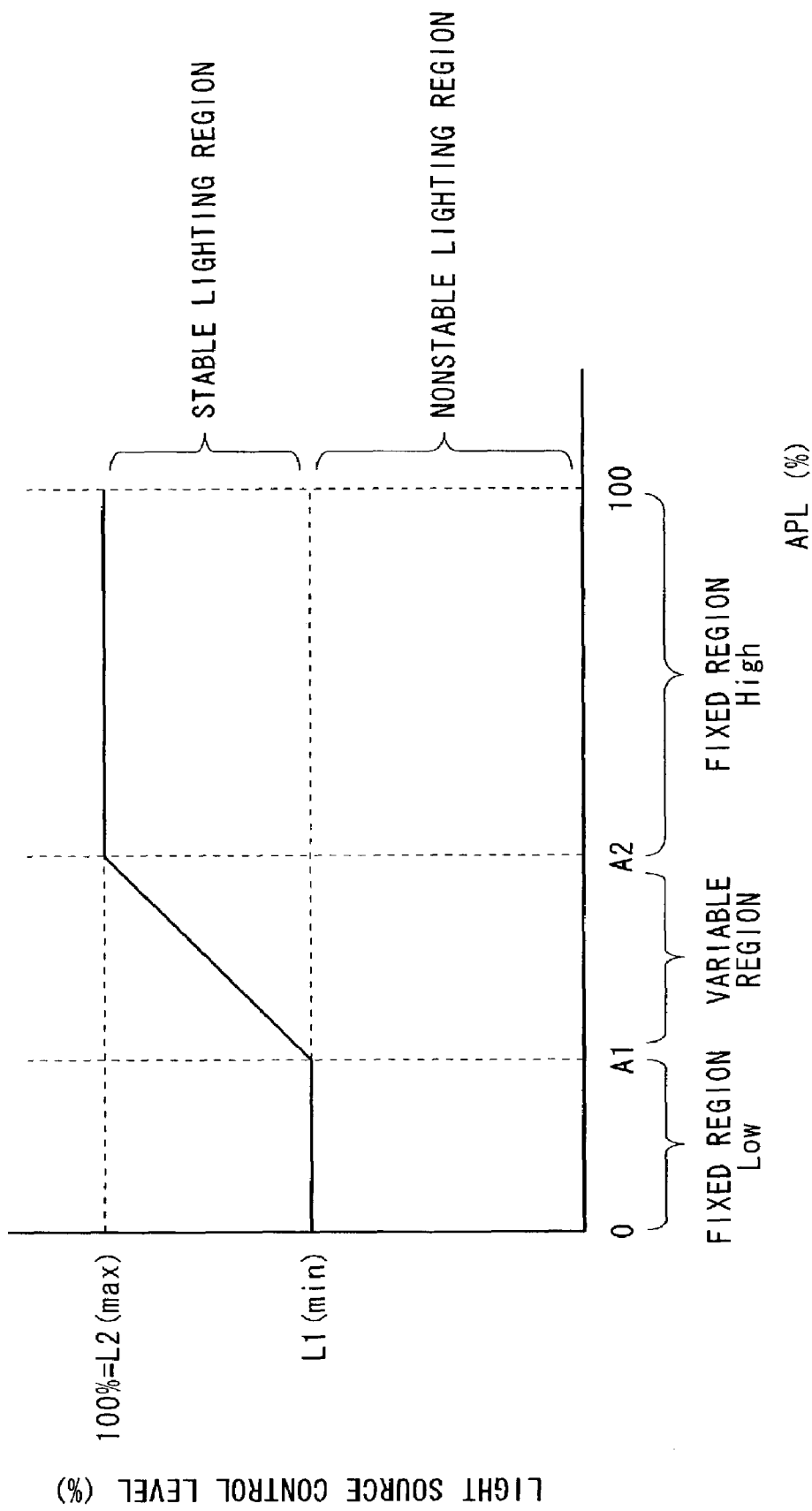
FIG. 3 is a diagram showing a method of the light source brightness control in the first embodiment.
Figure 4:
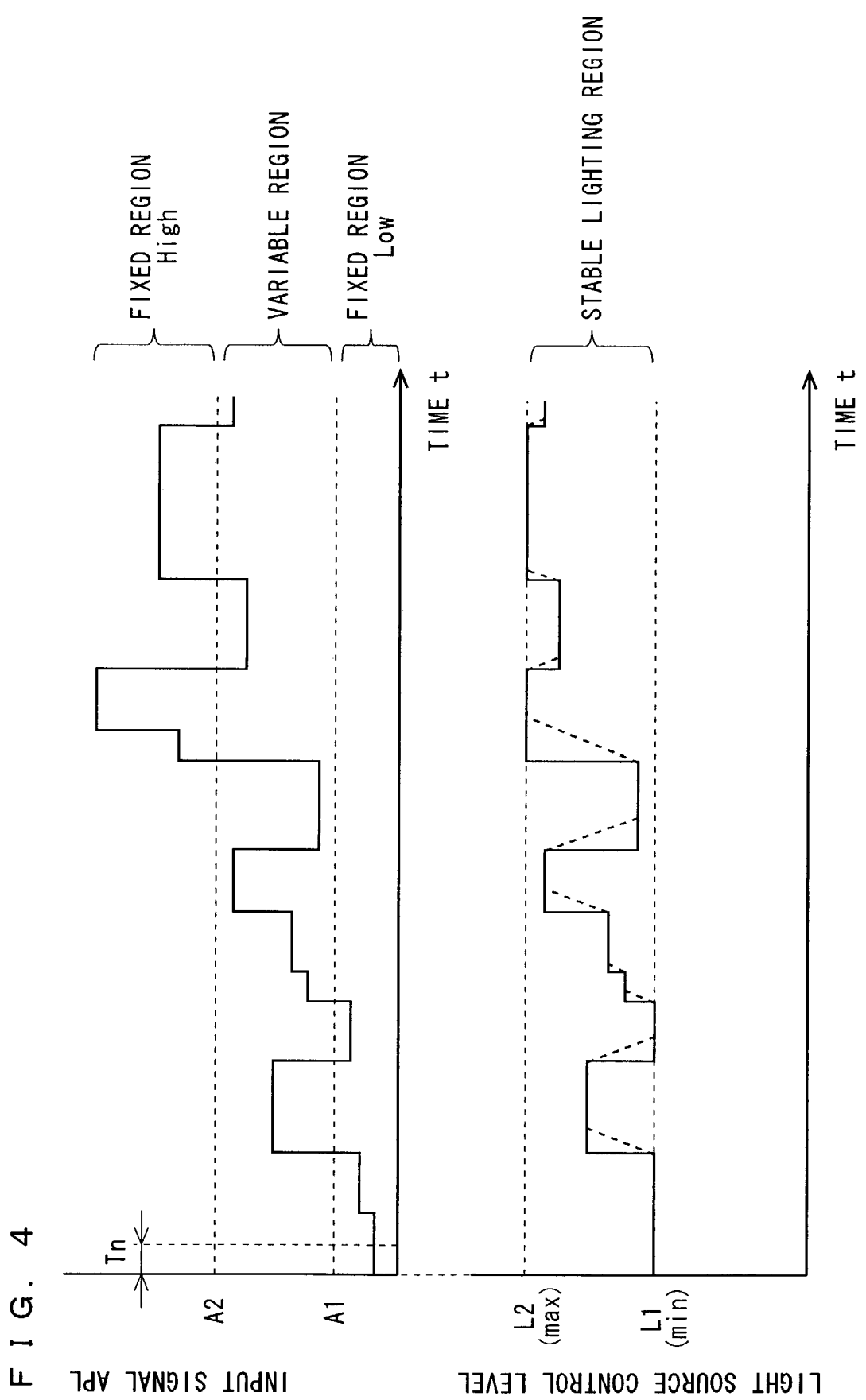
FIG. 4 is a diagram showing a specific example of signal processing in the first embodiment.

Referring now to FIGS. 2 to 4, description is made of the specific contents of processing of the light source control data production unit 3 and the function of the LPF 4.

A discharging lamp used for a project or is taken as an example. A range in which the level of light source driving power is L1 (min) to L2 (max) is a region where the light source is stably turned on, as shown in FIG. 2. When the level of the light source driving power is lower than L1 (min), the light source cannot be stably turned on. When the light source driving power is varied, therefore, the light source must be driven in a power range of the stable lighting region (L1 (min)-L2 (max)). Accordingly, dynamic light source control conforming to the APL of the input video signal 1 in the present embodiment is also carried out using the stable lighting region.

FIG. 2 illustrates by a dotted line the relationship between the APL of the input video signal 1 and a light source control level in a case where the power of the light source is linearly changed from L1 (min) to L2 (max) with respect to a range (0%–100%) of the change in the APL of the input video signal 1 for the purpose of reference. In this case, the light source control level has the minimum value L1 (min) in the stable lighting region only when the APL of the input video signal 1 is 0%. When the APL is B1, as illustrated, for example, the light source control level is not much reduced despite the fact that the scene is a dark scene, so that floating blackness is not prevented. On the other hand, the light source control level has the maximum value L2 (max) =100% in the stable lighting region only when the APL of the input video signal 1 is 100%. When the APL is B2, as illustrated, for example, the light source control level does not increase to the maximum despite the fact that the scene is a bright scene, such that a brightness feeling at a white peak is lost.

Particularly when movie software is used, a movie relatively has a lot of dark scenes on the whole screen, whereby it is greatly affected by floating blackness. Accordingly, the display quality of video is greatly lost by the occurrence of the floating blackness. Consequently, it is preferable to prevent the floating blackness to the utmost in the dark scenes.

When viewing the movie software, people feel that the contrast is high when the brightness level in the bright scene is higher, as compared with that for memory after dark adaptation in the dark scene. Conversely, people feel that the contrast is high when the black level in the dark scene is lower, as compared with that for memory after bright adaptation in the bright scene. It is important in increasing the display quality of video to increase a contrast feeling. Consequently, it is not preferable that floating blackness occurs, and the brightness feeling at the white peak is lost in the bright scene, which leads to the decrease in the contrast.

In view of the foregoing, in the present embodiment, the power of the light source is controlled, as shown in FIG. 3, in order to increase the display quality of the video. A1 and A2 shown in FIG. 3 are threshold values, previously set, of the APL. The threshold levels of A1 and A2 indicate threshold values for distinguishing between a dark scene and a bright scene, and are obtained by evaluating the movie software. The setting of the threshold values may be changed depending on a video source, such as software having a lot of bright scenes other than the movie software for use.

In FIG. 3, when the APL of the input video signal 1 is lower than the threshold value A1 as a first mode for light source control (a fixed region Low), the light source control level is fixed at L1 (min). When the APL of the input video signal 1 is from the threshold value A1 to the threshold value A2 as a second mode (a variable region), the light source control level is varied in a range of L1 (min) to L2 (max) depending on the change in the APL. When the APL of the input video signal 1 is higher than the threshold value A2 as a third mode (a fixed region High), the light source control level is fixed at L2 (max).

Although the relationship between the APL in the variable region and the light source control level is made linear in FIG. 3, the present invention is not limited to this. When the relationship between the light source control level and the light source driving power or the relationship between the light source driving power and the brightness of the light source is nonlinear, for example, the function may be a function such as to inversely correct nonlinear characteristics in the variable region. Further, the present invention is not limited to inverse correction of the nonlinear characteristics. It may be an arbitrary nonlinear characteristic function.

Referring now to FIG. 4, the relationship between the dynamic change in the APL of the input video signal 1 and the dynamic control of the light source control level are specifically described. In FIG. 4, an upper drawing illustrates one specific example of the dynamic change in the input APL to the light source control data production unit 3, and a lower drawing illustrates the dynamic control of the light source control level corresponding to the dynamic change in the input APL shown in the upper drawing. Particularly in the lower drawing, a solid line indicates an output signal from the light source control data production unit 3, and a dotted line indicates an output signal from the LPF 4. Tn denotes a unit field time period for detecting the APL. As shown in FIG. 4, in the present embodiment, control is carried out, in accordance with the above-mentioned control method shown in FIG. 3, such that the light source control also dynamically follows the dynamic change in the APL when the APL is in the variable region (A1–A2), while the light source control level is fixed at L1 (min) and L2 (max) when the APL is in the fixed region Low and the fixed region High, respectively.

The function of the LPF 4 is described next. As described above, the dynamic change indicated by the solid line in the lower drawing of FIG. 4 indicates the output signal from the light source control data production unit 3, that is, an input signal to the LPF 4. The output signal from the LPF 4 changes, as indicated by the dotted line in the lower drawing of FIG. 4, depending on a time constant previously set in the LPF 4, to drive the light source 6 through the light source driving circuit 5. In the case of the discharging lamp, the rapid change in the driving power affects a discharge arc state, to degrade an electrode of the lamp and degrade the reliability of the lamp. In the present embodiment, therefore, the discharging lamp is caused to have a time constant to vary the driving power using the LPF 4 so as not to degrade the reliability of the lamp in a transient state where the driving power is varied. The LPF 4 may be an analog LPF or a digital LPF, although the specific circuit is well known and is therefore omitted. When the digital LPF is used as the LPF 4, conversion into an analog signal is performed in processing of the light source driving circuit 5. The LPF 4 may be replaced with another means for giving a delay function to the output signal from the light source control data production unit 3.

The dynamic control described in FIG. 4 will be described in the same form as that shown in FIG. 3. When the APL is in a variable region (A1–A2), as shown in FIG. 5, the light source control level dynamically shifts to the stable lighting regions depending on the change in the APL of the input video signal 1, as indicated by arrows in the drawing.

As described in the foregoing, according to the first embodiment, the brightness can be dynamically controlled depending on a video scene by dynamically driving the light source, thereby making it possible to mitigate the problems of lack of a brightness feeling in a bright scene and floating blackness in a dark scene, leading to an increase in contrast feeling. In the case of the dark scene, that is, a case where the APL of the input video signal is lower than a predetermined threshold value, the light source control level is taken as the minimum value in a stable lighting region. Accordingly, the problem of the floating blackness in the dark scene can be further mitigated. On the other hand, in the case of the bright scene, that is, a case where the APL of the input video signal is higher than the predetermined threshold value, the light source control level is taken as the maximum value in the stable lighting region. Accordingly, the problem of the lack of the brightness feeling in the bright scene can be further mitigated. As a result, the contrast feeling can be further increased.

In the present embodiment, when the APL is in the fixed region Low and the fixed region High, the light source control level is controlled so as to be fixed at L1 (min) and L2 (max), respectively. However, the driving level of the light source need not necessarily be fixed at the minimum level or the maximum level. Even with a level close to the above levels, it goes without saying that the effect of further improving the problem of the floating blackness in the dark scene and the problem of the lack of the brightness feeling in the bright scene, as described above, can be obtained. However, if the light source is fixedly driven at the minimum level or the maximum level, as in the present embodiment, the effect can be obtained to the full. Also, the driving level of the light source does not vary in the dark scene and the bright scene. Therefore, this is more favorable because the problem of the degradation in the reliability of the light source can be mitigated. Accordingly, the above fixed driving is more favorable.

Figure 6:
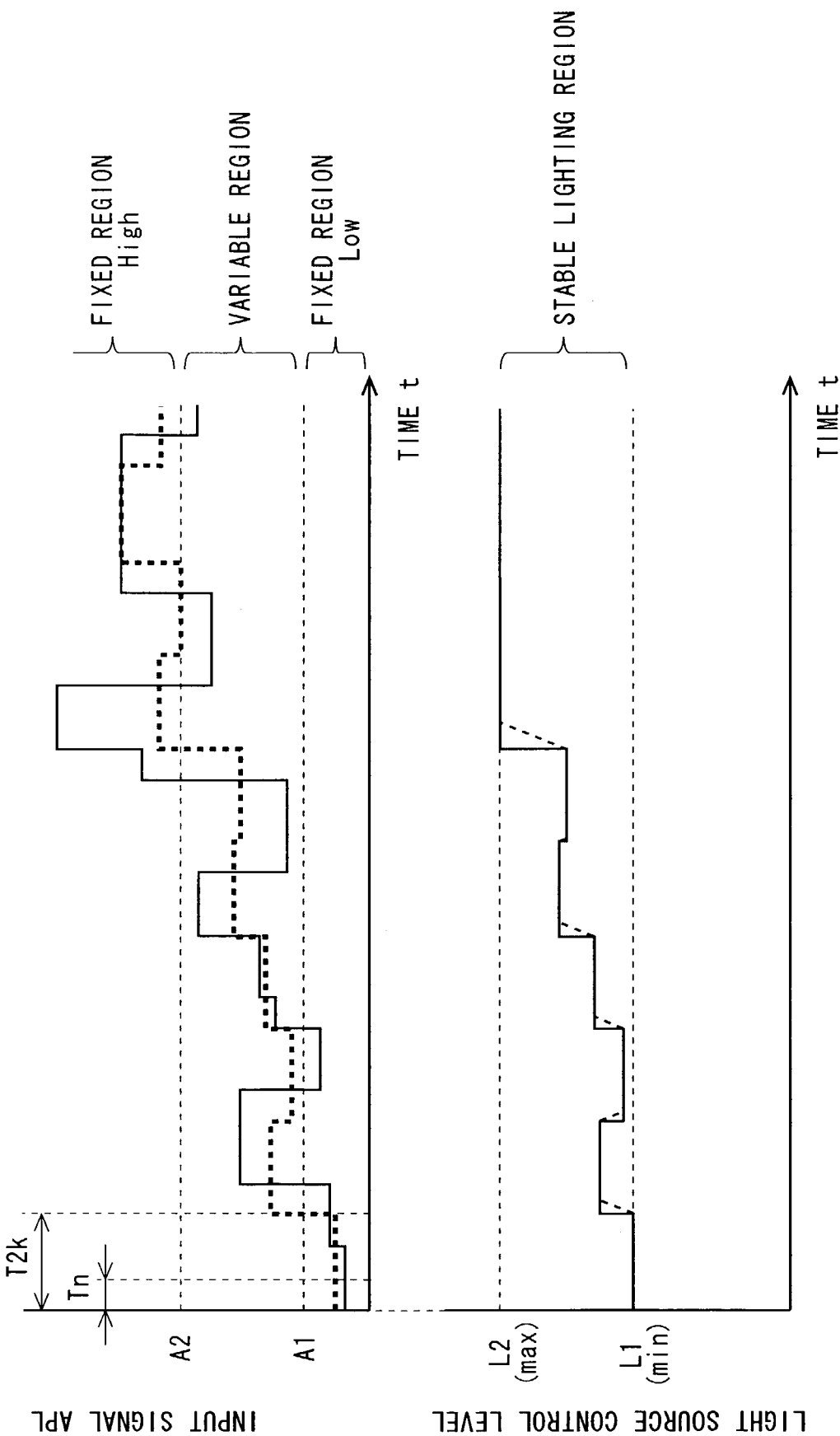
FIG. 6 is a diagram showing a modified example of signal processing in the first embodiment.

In the present embodiment, the light source control level is controlled depending on the APL for each unit field time period Tn, as shown in FIG. 4. Alternatively, an average of APLs in a plurality of unit field time periods Tn may be alternatively calculated to control the light source control level on the basis of the average. For example, Tn (unit field time period) in the upper drawing of FIG. 4 is replaced with an average of the results of detection of the APLs in a plurality of unit fields as T2k=(Tn−k+Tn−k+1+ . . . +Tn+ . . . Tn+k−1+Tn+k)/(2k+1). Consequently, the period of the dynamic changes indicated by the arrows shown in FIG. 5 and the amount of the change are reduced. That is, the period of the variation in the light source control level in a case where the APL is in the variable region is increased, and the amount of the change is decreased. Consequently, the degradation in the reliability of the lamp can be further reduced. This effect is more specifically described with reference to FIG. 6. FIG. 6 illustrates a case of k=1, a thick dotted line in an upper drawing indicates an average of the results of detection of APLs every three unit fields. The light source control level is controlled, as shown in a lower drawing of FIG. 6, on the basis of the average. Accordingly, the light source is controlled on the basis of the average of the APLs in the plurality of unit field time periods, so that the variation in the light source control level is reduced, as compared with that in the case shown in FIG. 4, thereby making it possible to further reduce the degradation in the reliability of the light source.

Furthermore, an LPF may be inserted into the output side of the APL detection unit 2 as a configuration capable of giving an effect similar to the above-mentioned control based on the average of the APLs in the plurality of unit field time periods, which is not illustrated. In the case of the control based on the average of the APLs, the number of subject fields can be accurately defined by an integer as the value of k, and the value of k can be suitably varied depending on circumstances by program setting or the like. Accordingly, it is possible to carry out a control method such that the change speed of the brightness of the light source is varied depending on whether the brightness is decreased or increased in the variable region shown in FIG. 5.

Although descriptions were made of the case where the light source is dynamically controlled as the first embodiment, the present invention is also similarly applicable to another case where the amount of light finally irradiated onto the display component can be controlled. Description is now made of the configuration and the operations of the video display apparatus in a case where the method of controlling the light source in the present embodiment is applied to control of an optical aperture and control of a light control element.

Figure 7:
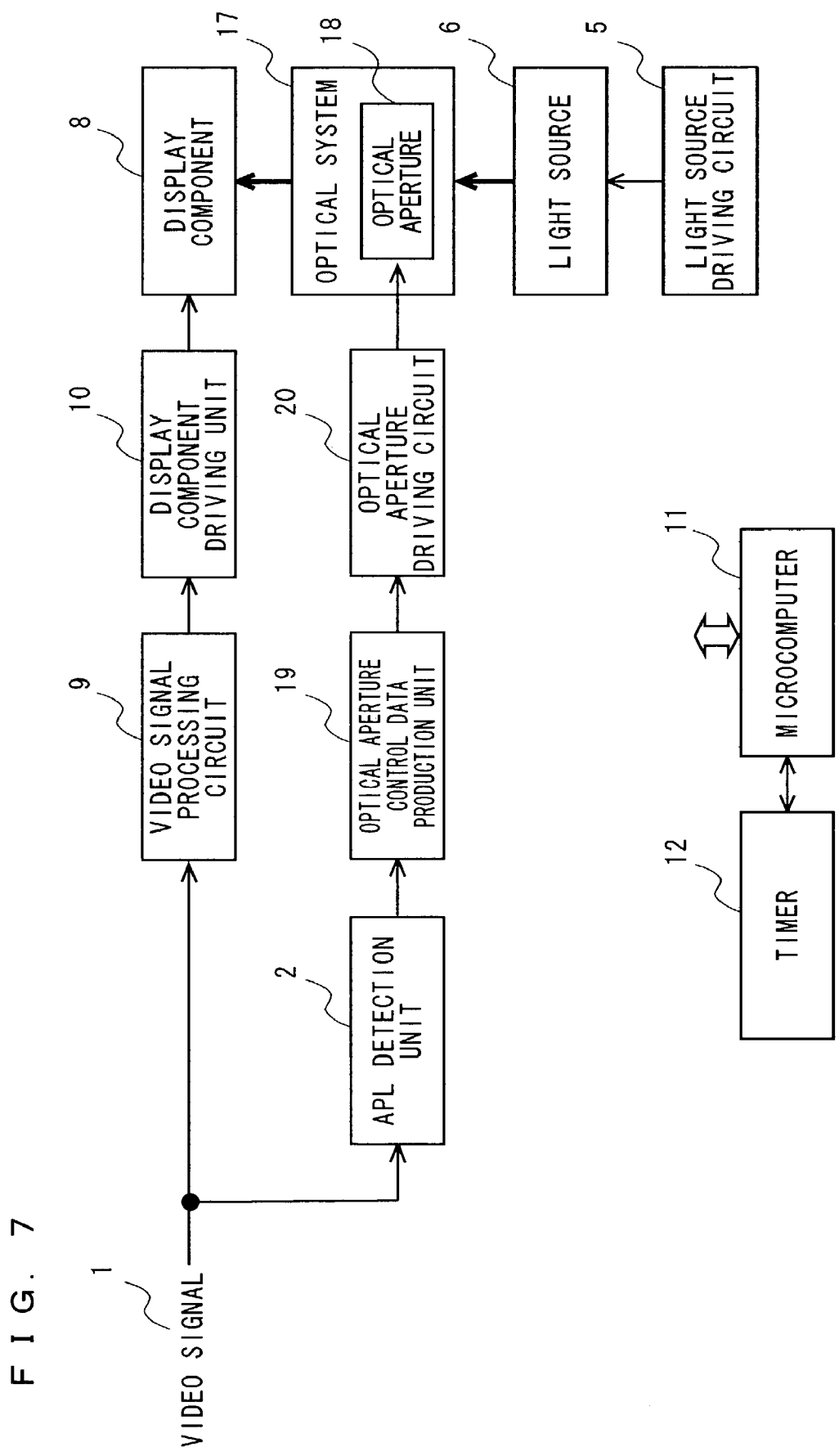
FIG. 7 is a block diagram showing an example of the configuration of a video display apparatus when a method of controlling a light source in the first embodiment is applied to control an optical aperture.

FIG. 7 is a block diagram showing the configuration of a video display apparatus in a case where the method of controlling the light source in the first embodiment is applied to the control of the optical aperture. In FIG. 7, the video display apparatus includes an APL detection unit 2, an optical aperture control data production unit 19, an optical aperture driving circuit 20, a light source driving circuit 5, a light source 6, an optical system 17, a display component 8, a video signal processing circuit 9, a display component driving unit 10, a microcomputer 11, and a timer 12. The optical system 17 includes an optical aperture 18. In FIG. 7, the same components as those shown in FIG. 1 are assigned the same reference numerals and hence, the descriptions thereof are not repeated. The operations of the video display apparatus is described below.

The optical aperture control data production unit 19 produces optical aperture control data conforming to the results of APL detection. The produced optical aperture control data is inputted to the optical aperture driving circuit 20. The optical aperture driving circuit 20 dynamically drives the optical aperture 18 under driving conditions conforming to the optical aperture control data, to vary the amount of shading of the optical aperture 18. Light emitted from the light source 6 is converged by the optical system 17, and is irradiated onto the display component 8 as illuminating light corresponding to the display range of the display component 8. The amount of the light irradiated onto the display component 8 is controlled depending on the amount of shading of the optical aperture 18.

Figure 8:
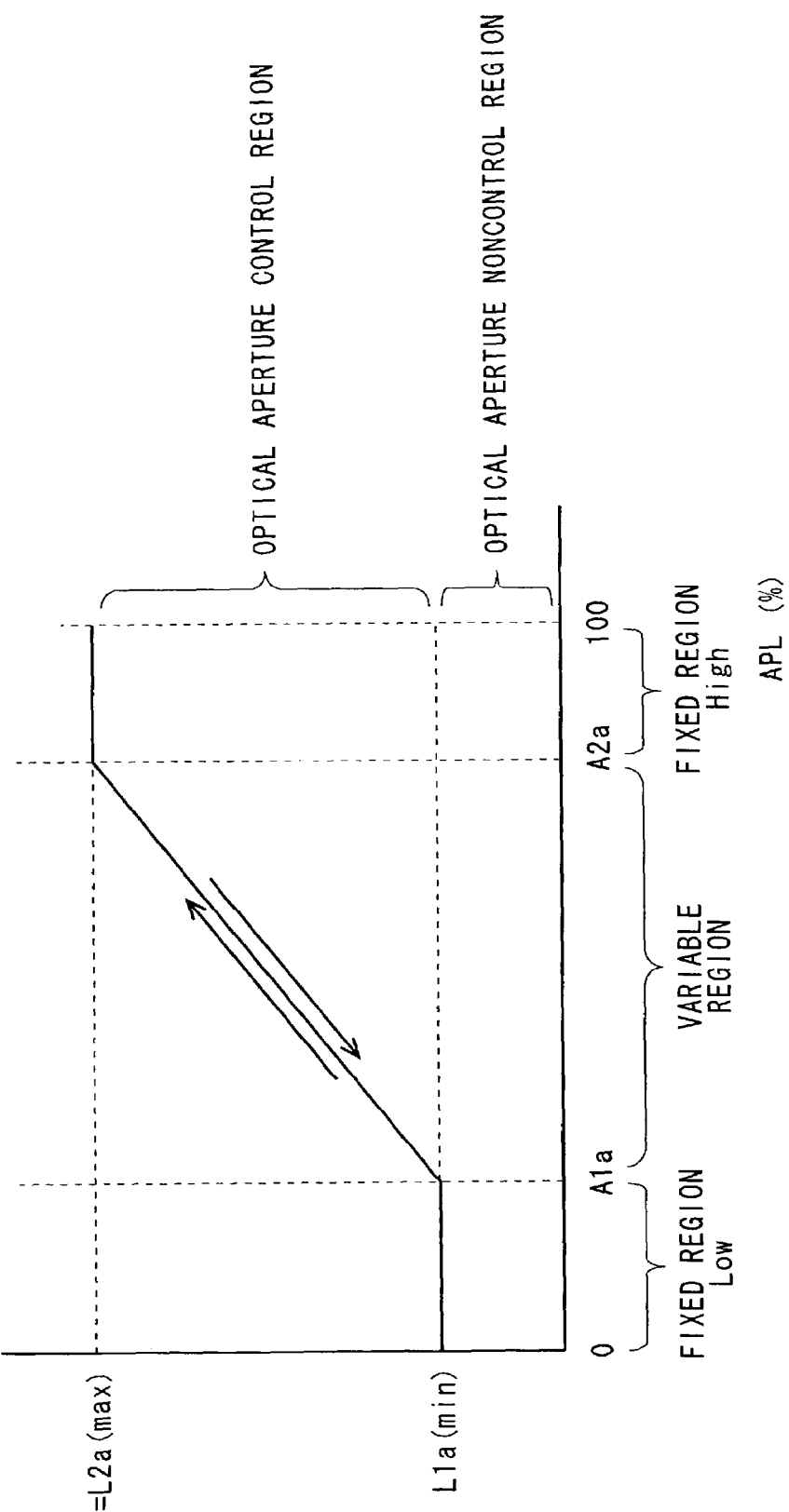
FIG. 8 is a diagram showing a method of controlling the optical aperture when the method of controlling the light source in the first embodiment is applied to control the optical aperture.
Figure 9:
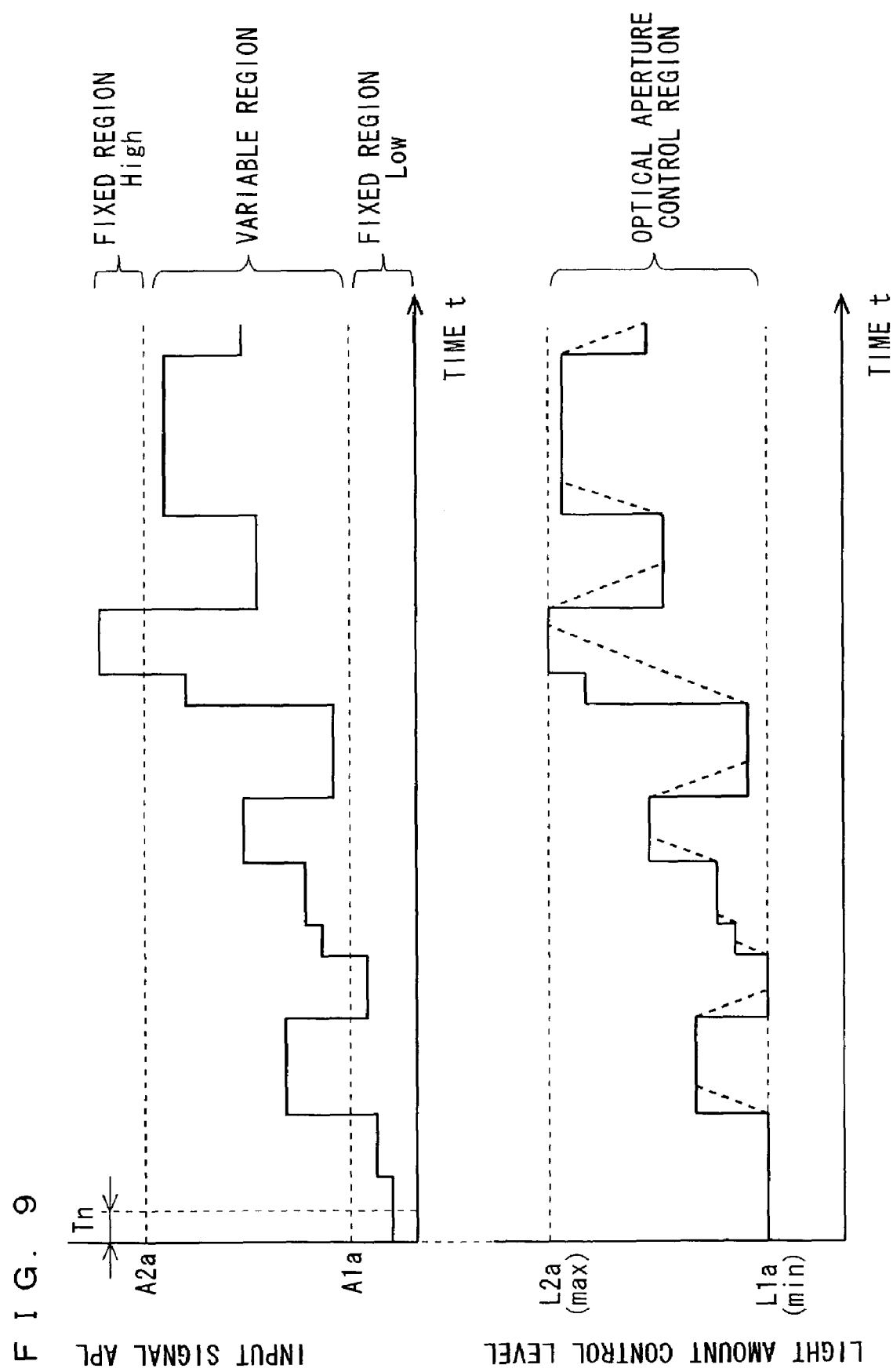
FIG. 9 is a diagram showing a specific example of signal processing when the method of controlling the light source in the first embodiment is applied to control the optical aperture.

Referring now to FIGS. 8 to 9, description is made of the specific contents of processing of the optical aperture control data production unit 19.

A1a and A2a shown in FIG. 8 are threshold values, previously set, of an APL. The threshold levels of A1a and A2a indicate threshold values for distinguishing between a dark scene and a bright scene, and are obtained by evaluating the movie software. The setting of the threshold values may be changed depending on a video source, such as software having a lot of bright scenes other than the movie software for use.

In FIG. 8, when the APL of the input video signal 1 is lower than the threshold value A1a as a first mode for light amount control (a fixed region Low), the light amount control level is fixed at L1a (min). When the APL of the input video signal 1 is from the threshold value A1a to the threshold value A2a as a second mode (a variable region), the light amount control level is varied in a range of L1a (min) to L2a (max) depending on the change in the APL. When the APL of the input video signal 1 is higher than the threshold value A2a as a third mode (a fixed region High), the light amount control level is fixed at L2a (max).

Although the relationship between the APL (A1a–A2a) in the variable region and the light source control level is made linear in FIG. 8, the present invention is not limited to this. It may be an arbitrary nonlinear characteristic function.

Referring now to FIG. 9, the relationship between the dynamic change in the APL of the input video signal 1 and the dynamic control of the light amount control level are specifically described. In FIG. 9, an upper drawing illustrates one specific example of the dynamic change in the input APL to the optical aperture control data production unit 19, and a lower drawing illustrates the dynamic control of the light amount control level corresponding to the dynamic change in the input APL shown in the upper drawing. Tn denotes a unit field time period for detecting the APL. Control is carried out, in accordance with the above-mentioned control method shown in FIG. 8, such that the light source control also dynamically follows the dynamic change in the APL when the APL is in the variable region (A1a–A2a), while the light amount control level is fixed at L1a (min) and L2a (max) when the APL is in the fixed region Low and the fixed region High.

An output signal from the optical aperture control data production unit 19 shown in the lower drawing of FIG. 9 is not limited to that in a case where it is indicated by a solid line. For example, temporal delay characteristics may be given to the change in the APL in consideration of the responsiveness and the reliability of an optical aperture driving structure, as indicated by a dotted line.

As described in the foregoing, when the APL is in the variable region (A1a–A2a), the light amount control level is dynamically shifted in the variable region depending on the change in the APL of the input video signal 1, as indicated by arrows shown in FIG. 8.

As described in the foregoing, according to the video display apparatus shown in FIG. 7, the amount of light can be controlled depending on a video scene by dynamically driving the optical aperture, thereby making it possible to mitigate the problems of lack of a brightness feeling in a bright scene and floating blackness in a dark scene, to increase a contrast feeling. In the case of the dark scene, that is, a case where the APL of the input video signal is lower than a predetermined threshold value, the light amount control level is taken as the minimum value in an optical aperture control region. Accordingly, the problem of the floating blackness in the dark scene can be further mitigated. On the other hand, in the case of the bright scene, that is, a case where the APL of the input video signal is higher than the predetermined threshold value, the light amount control level is taken as the maximum value in the optical aperture control region. Accordingly, the problem of the lack of the brightness feeling in the bright scene can be further mitigated. As a result, the contrast feeling can be further increased.

When the light source is controlled, the minimum value L1 for light source control is relatively large (approximately ⅓ to ½ of the maximum value L2) in view of stable lighting of the light source, so that the amount of light cannot be sufficiently reduced in the dark scene. On the other hand, when the optical aperture is controlled, the minimum value L1a for the light amount control can be sufficiently reduced (in principle, 0 is also possible). As a result, it is possible to sufficiently reduce the black level in the dark scene to satisfactorily mitigate the floating blackness, and to increase the relative contrast ratio of the dark scene to the bright scene.

When the light source is controlled, the lifetime thereof is degraded if the change speed of light source power is increased or the number of repetitions of the change is large in view of the reliability of the life of a discharging light source used for a projector. However, when the optical aperture is controlled, although depending on an opening or closing structure of the optical aperture, the change speed and the number of times of change of optical aperture driving conditions less affect the reliability of an optical aperture driving structure, as compared with that in a case where the light source is controlled. Therefore, the optical aperture driving conditions can follow the change in the APL, for example, for each field/frame unit. Follow-up characteristics in a case where the brightness of the video scene is steeply changed can be greatly improved, thereby making it possible to obtain a better contrast feeling according to the change in the brightness of the scene. The discharging light source used for a projector is roughly divided into categories of a xenon light source and a high-pressure mercury light source. The high-pressure mercury light source cannot easily ensure the reliability in the foregoing points, and an emission spectrum is liable to change when driving power (brightness) is changed, as compared with the xenon light source. When the high-pressure mercury light source is used, therefore, the control of the optical aperture is particularly effective.

It is also possible to simultaneously carry out both the control of the light source and the control of the optical aperture. In this case, the effect of improving the contrast is obtained by the product of the effect of improving the contrast by the control of the light source and the effect of improving the contrast by the control of the optical aperture. Consequently, this is more effective in improving the contrast. At this time, the change speed of the optical aperture is set higher than the change speed of the light source, thereby making it possible to improve the follow-up characteristics of the amount of light to the change in the video scene while eliminating an adverse effect of the light source on the reliability of the life.

Figure 10:
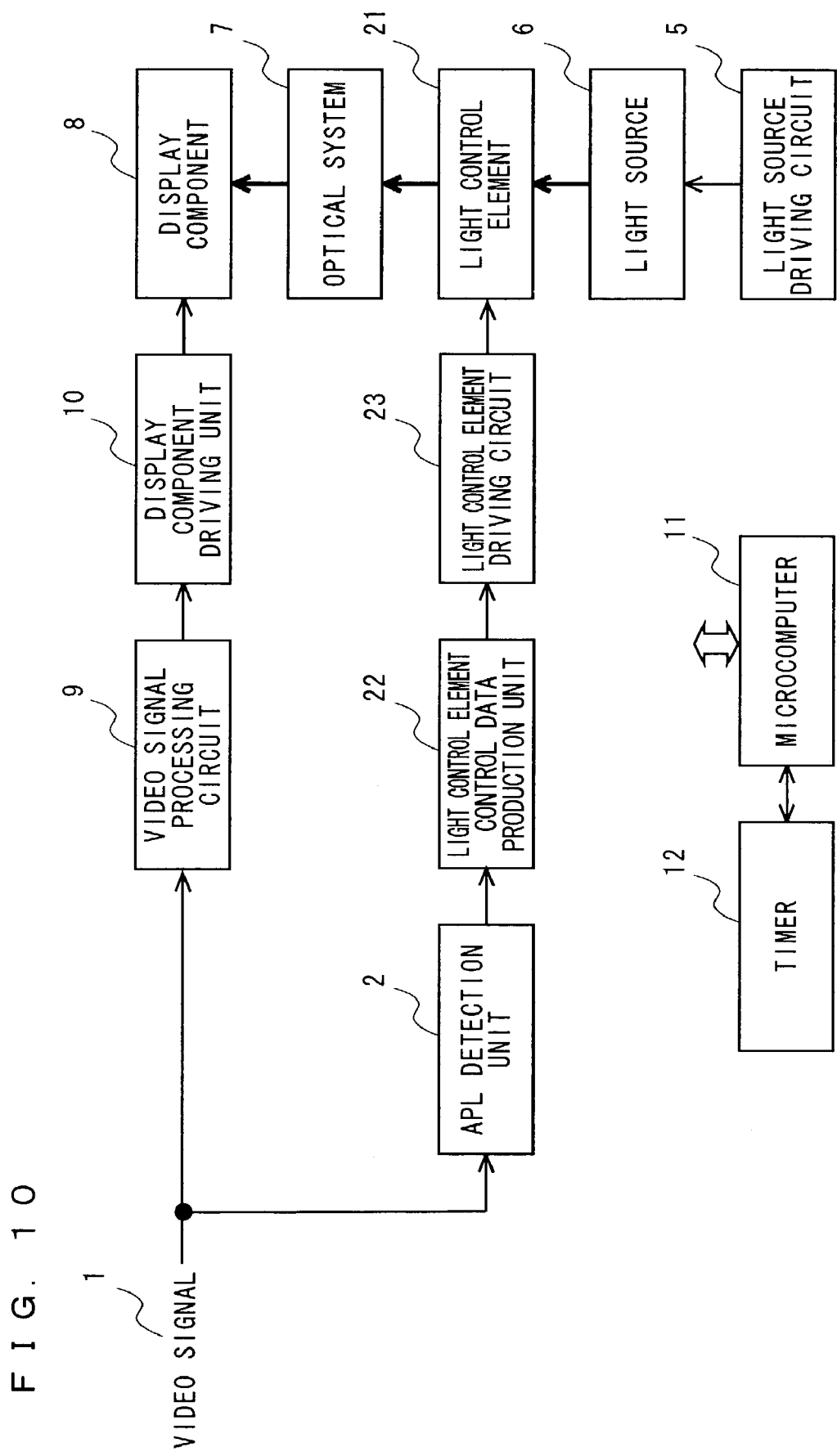
FIG. 10 is a block diagram showing the configuration of a video display apparatus when the method of controlling the light source in the first embodiment is applied to control a light control element.
Figure 11:
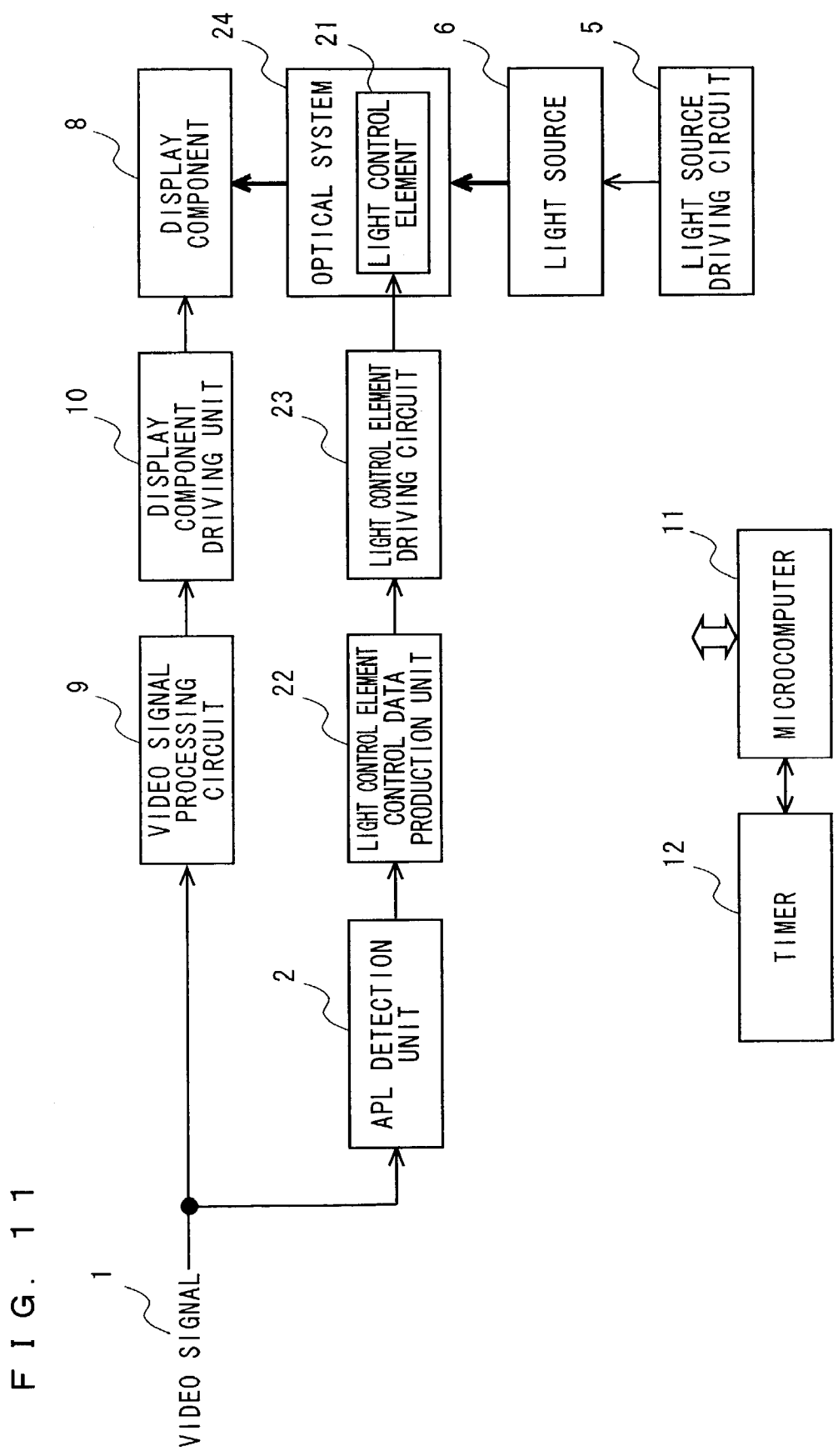
FIG. 11 is a block diagram showing another configuration of a video display apparatus when the method of controlling the light source in the first embodiment is applied to control the light control element.

FIG. 10 is a block diagram showing the configuration of a video display apparatus in a case where the method of controlling the light source in the first embodiment is applied to the control of the light control element. In FIG. 10, the video display apparatus includes an APL detection unit 2, a light control element control data production unit 22, a light control element driving circuit 23, a light source driving circuit 5, a light source 6, a light control element 21, an optical system 7, a display component 8, a video signal processing circuit 9, a display component driving unit 10, a microcomputer 11, and a timer 12. In FIG. 10, the same components as those shown in FIG. 1 are assigned the same reference numerals and hence, the descriptions thereof are not repeated. Although the light control element 21 is provided in the stage preceding the optical system 7 in the configuration shown in FIG. 10, the light control element 21 maybe provided inside the optical system 24, as shown in FIG. 11. The operations of the video display apparatus shown in FIG. 10 is described below.

The light control element control data production unit 22 produces light control element control data conforming to the results of APL detection. The produced light control element control data is inputted to the light control element driving circuit 23. The light control element driving circuit 23 dynamically drives the light control element 21 under driving conditions conforming to the light control element control data, to vary the transmission rate of the light control element 21. Light emitted from the light source 6 is transmitted through the light control element 21, is converged by the optical system 7, and is irradiated onto the display component 8 as illuminating light corresponding to the display range of the display component 8. The amount of the light irradiated onto the display component 8 is controlled depending on the transmission rate of the light control element 21.

Figure 12:
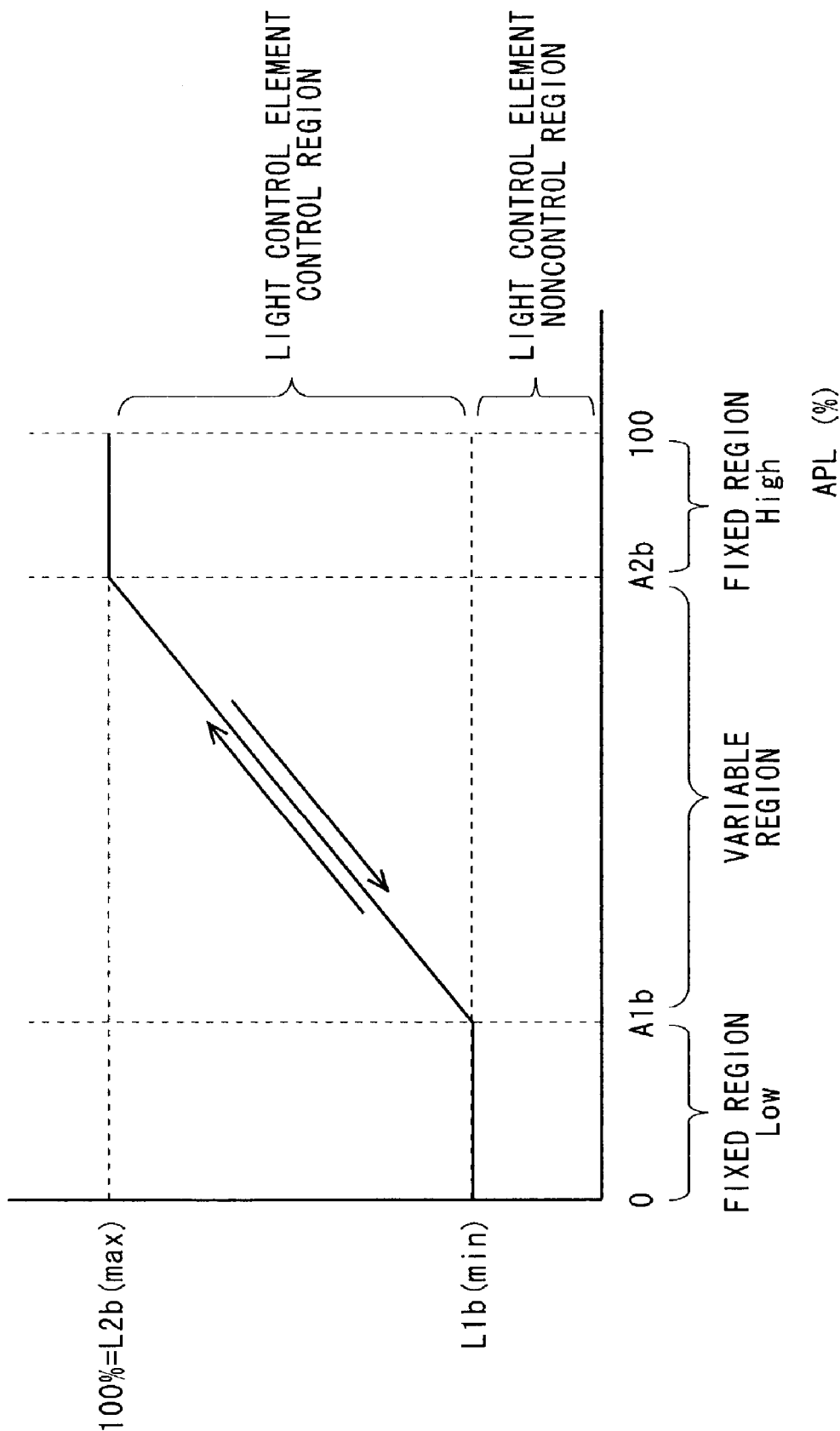
FIG. 12 is a diagram showing a method of controlling the light control element when the method of controlling the light source in the first embodiment is applied to control the light control element.

Referring now to FIGS. 12 to 13, the specific contents of processing of the light control element control data production unit 22 are described.

A1b and A2b shown in FIG. 12 are threshold values, previously set, of the APL. The threshold levels of A1b and A2b indicate threshold values for distinguishing between a dark scene and a bright scene, and are obtained by evaluating the movie software. The setting of the threshold values may be changed depending on a video source, such as software having a lot of bright scenes other than the movie software for use.

In FIG. 12, when the APL of the input video signal 1 is lower than the threshold value A1b as a first mode for light amount control (a fixed region Low), the light amount control level is fixed at L1a (min). When the APL of the input video signal 1 is from the threshold value A1b to the threshold value A2b as a second mode (a variable region), the light amount control level is varied in a range of L1b (min) to L2b (max) depending on the change in the APL. When the APL of the input video signal 1 is higher than the threshold value A2a as a third mode (a fixed region High), the light source control level is fixed at L2b (max).

Although the relationship between the APL (A1b–A2b) in the variable region and the light source control level is made linear in FIG. 12, the present invention is not limited to the same. For example, it may be an arbitrary nonlinear characteristic function.

Referring now to FIG. 13, the relationship between the dynamic change in the APL of the input video signal 1 and the dynamic control of the light amount control level are specifically described. In FIG. 13, an upper drawing illustrates one specific example of the dynamic change in the input APL to the light control element control data production unit 22, and a lower drawing illustrates the dynamic control of the light source control level corresponding to the dynamic change in the input APL shown in the upper drawing. Tn denotes a unit field time period for detecting the APL. Control is carried out, in accordance with the above-mentioned control method shown in FIG. 12, such that the light amount control also dynamically follows the dynamic change in the APL when the APL is in the variable region (A1b–A2b), while the light amount control level is fixed at L1a (min) and L2a (max) when the APL is in the fixed region Low and the fixed region High, respectively.

An output signal from the light control element control data production unit 22 shown in the lower drawing of FIG. 13 is not limited to that in a case where it is indicated by a solid line. For example, the output signal may be caused to have temporary delay characteristics with respect to the change in the APL in consideration of the responsiveness and the reliability of the light control element, as indicated by a dotted line.

As described in the foregoing, when the APL is in the variable region (A1b–A2b), the light amount control level is dynamically shifted in the variable region depending on the change in the APL of the input video signal 1, as indicated by arrows shown in FIG. 12.

As described in the foregoing, according to the video display apparatus shown in FIG. 10 or 11, the amount of light can be controlled depending on a video scene by dynamically driving the light control element, thereby making it possible to mitigate the problems of lack of a brightness feeling in a bright scene and floating blackness in a dark scene, to increase a contrast feeling. In the case of the dark scene, that is, a case where the APL of the input video signal is lower than the predetermined threshold value, the light amount control level is taken as the minimum value in a light control region. Accordingly, the problem of the floating blackness in the dark scene can be further mitigated. On the other hand, in the case of the bright scene, that is, a case where the APL of the input video signal is higher than the predetermined threshold value, the light amount control level is taken as the maximum value in the light control region. Accordingly, the problem of the lack of the brightness feeling in the bright scene can be further mitigated. As a result, the contrast feeling can be further increased.

When the light control element is controlled, the same effect as that in the above-mentioned case where the optical aperture is controlled can be generally obtained. A case where the light control element is controlled can be more easily realized because the light control element driving circuit can be realized as a relatively simple circuit and at a low voltage, as compared with a case where the light source is controlled. Further, the case where the light control element is controlled can be more easily realized because there is a degree of freedom in arrangement between the light source and the display component, and the driving of the light control element can be realized in a relatively simple structure in which no moving structure is required and only electrical control is carried out by a driving circuit, as compared with a case where the optical aperture is controlled.

It is also possible to simultaneously carry out both the control of the light source and the control of the light control element. In this case, however, the same effect can be obtained as that in a case where both the control of the light source and the control of the optical aperture are simultaneously carried out. Further, it is also possible to simultaneously carry out the control of the light source, the control of the optical aperture, and the control of the light control element. In this case, the effect of improving the contrast is obtained by the product of the effect of improving the contrast by the control of the light source, the effect of improving the contrast by the control of the optical aperture, and the effect of improving the contrast by the control of the light control element. Consequently, this becomes more effective in improving the contrast.

Second Embodiment

Figure 14:
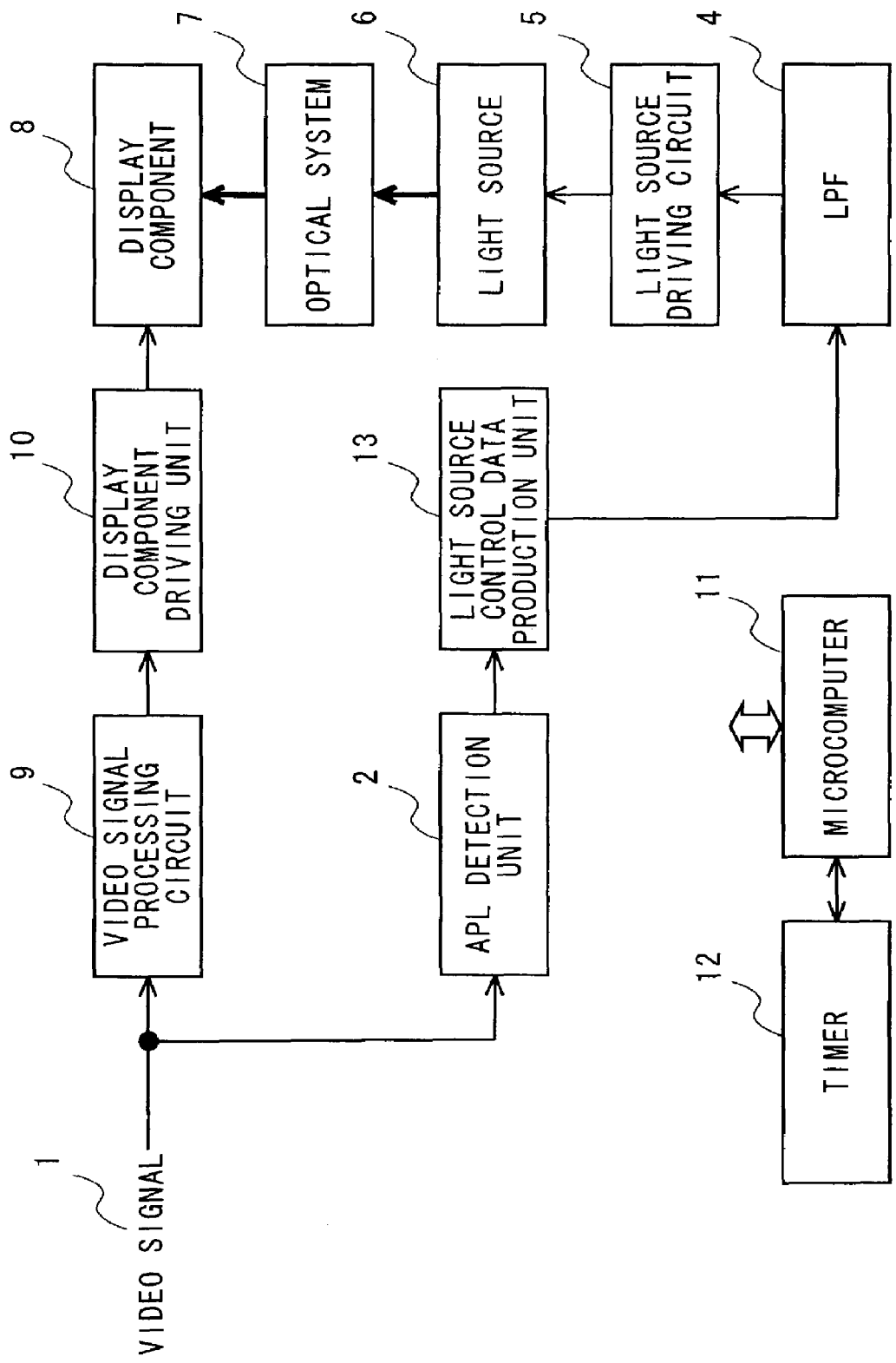
FIG. 14 is a block diagram showing the configuration of a video display apparatus according to a second embodiment of the present invention.

FIG. 14 illustrates the configuration of a video display apparatus according to a second embodiment of the present invention. The video display apparatus includes an APL detection unit 2, a light source control data production unit 13, an LPF 4, a light source driving circuit 5, a light source 6, an optical system 7, a display component 8, a video signal processing circuit 9, a display component driving unit 10, a microcomputer 11, and a timer 12. The present embodiment differs from the first embodiment only in the operations of the light source control data production unit 13. Therefore, the same other components are assigned the same reference numerals and hence, the descriptions thereof are not repeated.

Figure 15:
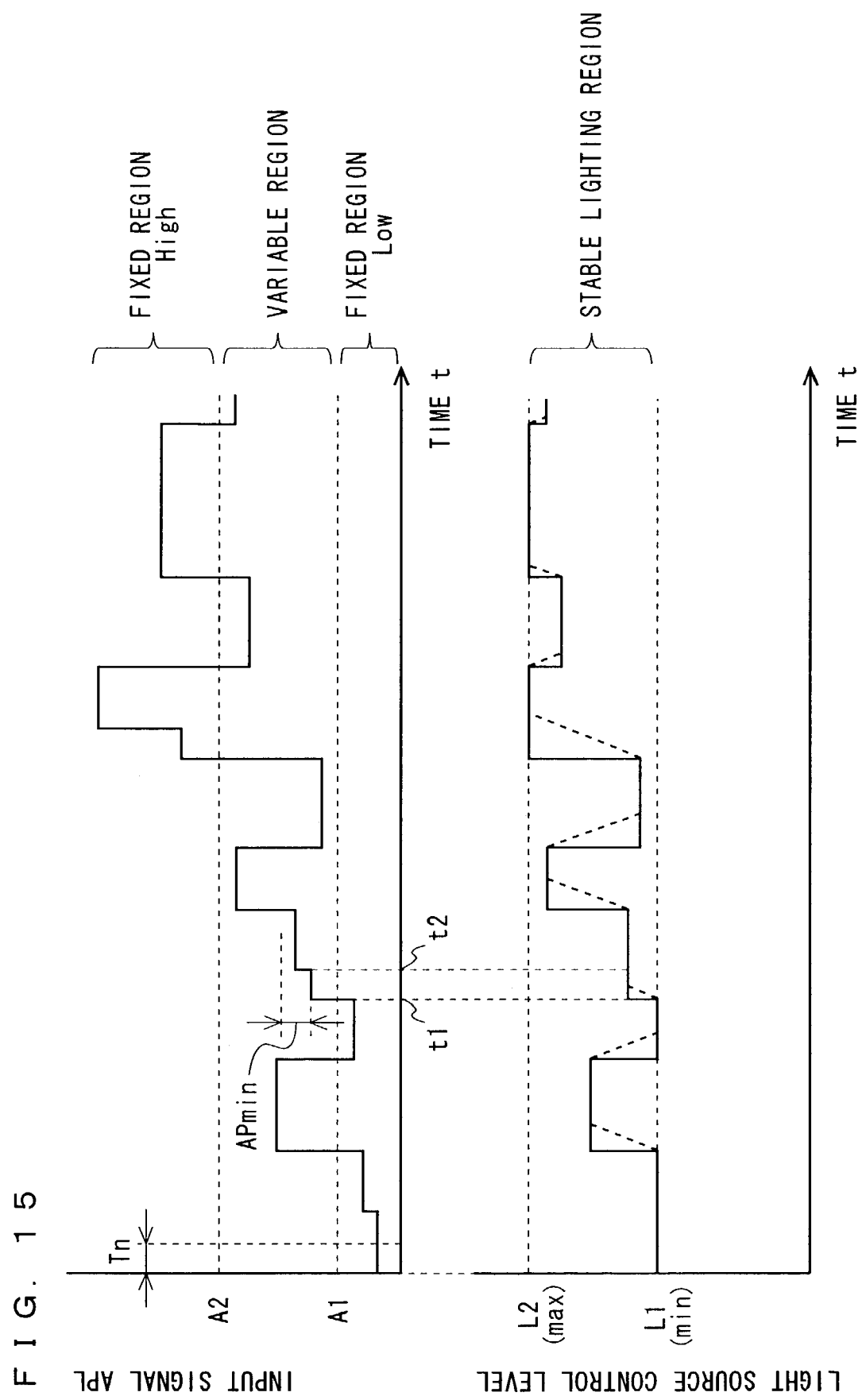
FIG. 15 is a diagram showing a specific example of signal processing in the second embodiment.

Referring to FIG. 15, the operation of the light source control data production unit 13 is described. The light source control data production unit 13 performs processing for relaxing the dynamic follow-up characteristics of light source level control to the change in an APL in addition to the processing of the light source control data production unit 3 in the first embodiment. Consequently, the frequency of the state transition of the conditions of driving power for a lamp is reduced, and the degradation in the reliability of the lamp is further mitigated. The foregoing is specifically described below with reference to FIG. 15.

FIG. 15 illustrates the relationship between the dynamic change in the APL of the input video signal 1 and the dynamic control of the light source control level. In FIG. 15, an upper drawing illustrates one specific example of the dynamic change in the input APL to the light source control data production unit 13, and a lower drawing illustrates the dynamic control of the light source control level corresponding to the dynamic change in the input APL shown in the upper drawing. Particularly in the lower drawing, a solid line indicates an output signal from the light source control data production unit 13, and a dotted line indicates an output signal from the LPF 4. Tn denotes a unit field time period for detecting the APL. As shown in FIG. 15, in the present embodiment, when the APL is in the variable region (A1–A2), the light source control also dynamically follows the dynamic change in the APL in accordance with the above-method control method shown in FIG. 3. When the APL is in the fixed region Low and the fixed region High, however, the light source control level is so controlled as to be fixed at L1 (min) and L2 (max), respectively.

In the present embodiment, however, it is judged whether or not the change in the input APL is smaller than the level of a judgment threshold value APmin previously set. When the change in the APL is smaller than APmin, the light source control level is not changed prior to the above-mentioned normal control. More specifically, in the upper drawing of FIG. 15, the change level of the APL at times t1 to t2 is lower than the judgment threshold value APmin. Consequently, the light source control level at the time t1 is maintained, and the dynamic change in the light source control level is not controlled at the time t2, as in the lower drawing of FIG. 15.

In the present embodiment, the light source control level does not follow the very small change in the APL. The reason for this is that it is not preferable if the light source control level follows the very small variation in the APL each time because the demerit of degrading the reliability of the light source is larger than the merit of improving the contrast.

As described in the foregoing, according to the second embodiment, in addition to the effect of the first embodiment, the driving conditions of the light source are not changed when the change in the APL is very small, so as to hold driving conditions the same as immediately before the change in the APL, thereby making it possible to reduce the frequency of the dynamic transition of the driving conditions of the light source. As a result, the problems of the degradation of the stable lighting characteristics of the light source and the degradation of the life characteristics are mitigated, thereby making it possible to enhance the reliability of the light source.

The control method according to the second embodiment is also applicable to the control of an optical aperture and a light control element. Description is now made of respective cases where the control method according to the second embodiment is applied to the control of the optical aperture and the control of the light control element.

Figure 16:
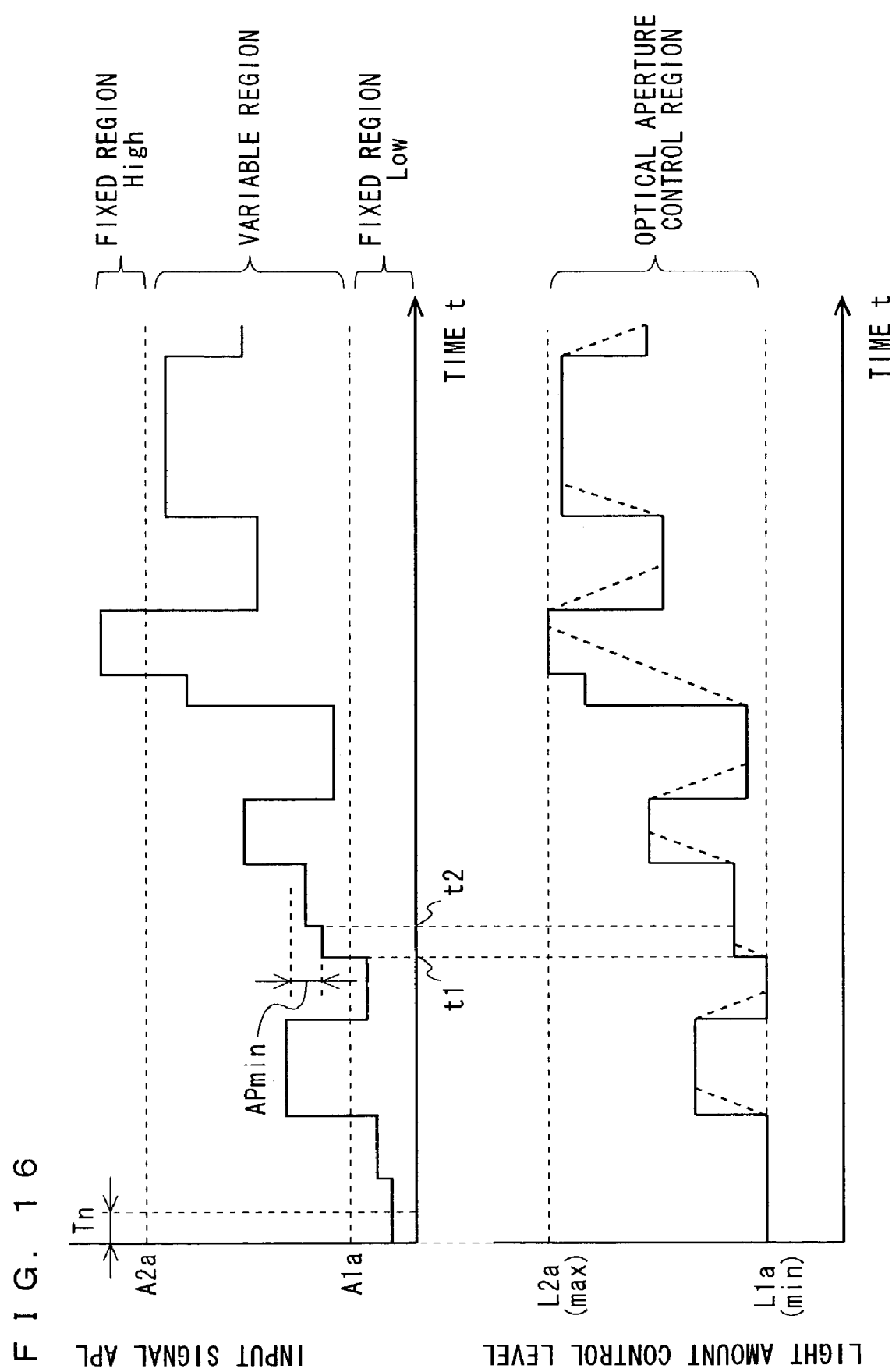
FIG. 16 is a diagram showing a specific example of signal processing when a method of controlling a light source in the second embodiment is applied to control an optical aperture.

FIG. 16 illustrates the relationship between the dynamic range in the APL of the input video signal 1 and the dynamic control of the optical aperture control level in a case where the control method according to the second embodiment is applied to the control of the optical aperture. In this case, the light amount control level is not changed when the change in the APL is smaller than the judgment threshold value APmin previously set. Consequently, it is possible to prevent the reliability of an optical aperture driving structure from being degraded by the optical aperture driving structure repeating an excessive number of very small moving operations.

Figure 17:
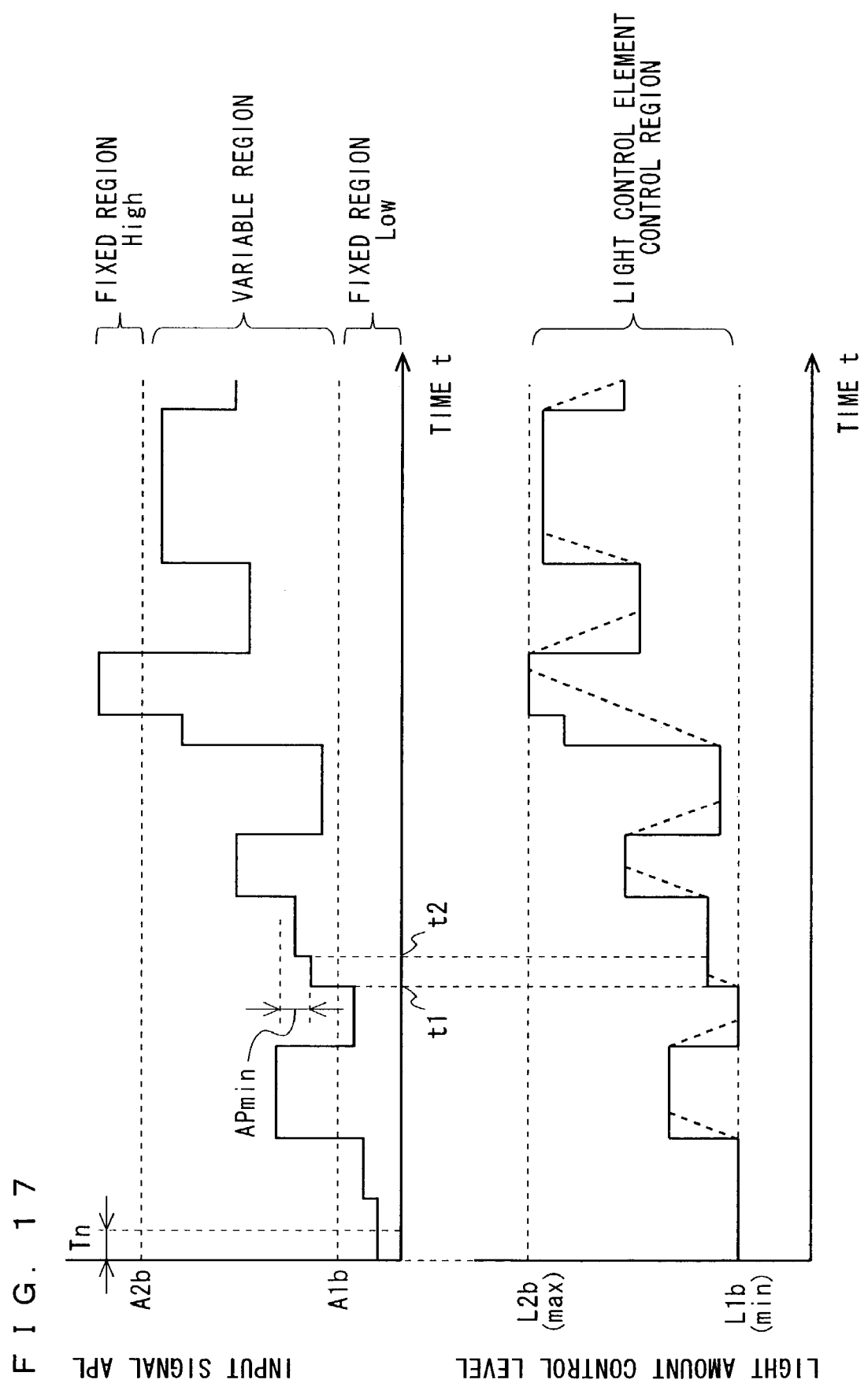
FIG. 17 is a diagram showing a specific example of signal processing when the method of controlling the light source in the second embodiment is applied to control a light control element.

FIG. 17 illustrates the relationship between the dynamic change in the APL of the input video signal 1 and the dynamic control of the light control element control level in a case where the control method according to the second embodiment is applied to the control of the light control element. Also in this case, the light amount control level is not changed when the change in the APL is smaller than the judgment threshold value APmin previously set. Consequently, it is possible to prevent the reliability of the light control element from being degraded by the light control element repeating an excessive number of very small moving operations.

Third Embodiment

Figure 18:
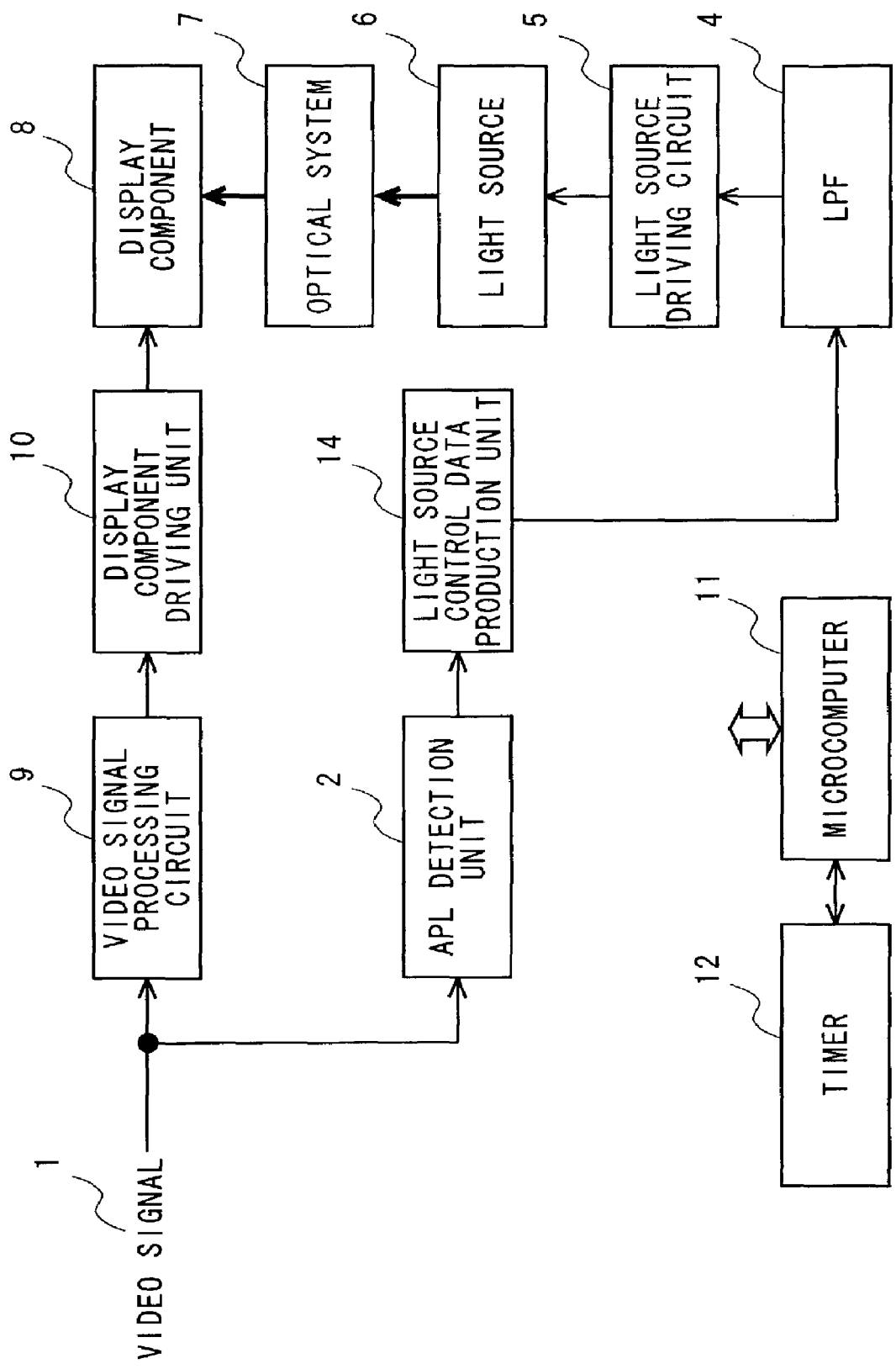
FIG. 18 is a block diagram showing the configuration of a video display apparatus according to a third embodiment of the present invention.

FIG. 18 illustrates the configuration of a video display apparatus according to a third embodiment of the present invention. The video display apparatus includes an APL detection unit 2, a light source control data production unit 14, an LPF 4, a light source driving circuit 5, a light source 6, an optical system 7, a display component 8, a video signal processing circuit 9, a display component driving unit 10, a microcomputer 11, and a timer 12. The present embodiment differs from the first embodiment only in the operations of the light source control data production unit 14. Therefore, the same other components are assigned the same reference numerals and hence, the descriptions thereof are not repeated.

Figure 19:
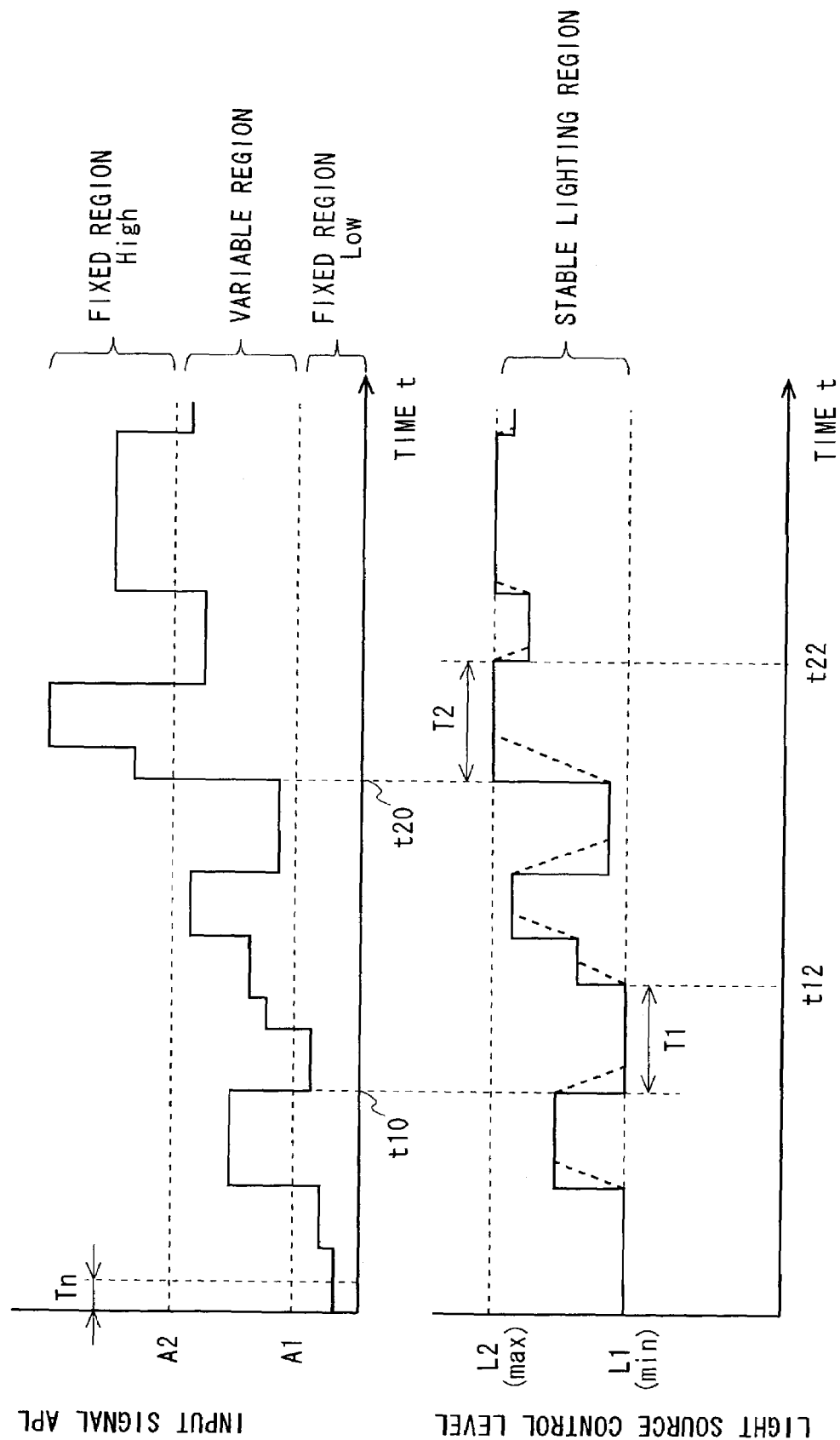
FIG. 19 is a diagram showing a specific example of signal processing in the third embodiment.

Referring to FIG. 19, the operations of the light source control data production unit 14 are described. The light source control data production unit 14 performs processing for relaxing the dynamic follow-up characteristics of light source level control to the change in an APL in addition to the processing of the light source control data production unit 3 in the first embodiment. Consequently, the frequency of the state transition of the conditions of driving power for a lamp is reduced, and the degradation in the reliability of the lamp is further mitigated. The foregoing is specifically described below with reference to FIG. 19.

FIG. 19 illustrates the relationship between the dynamic change in the APL of the input video signal 1 and the dynamic control of the light source control level. In FIG. 19, an upper drawing illustrates one specific example of the dynamic change in the input APL to the light source control data production unit 14, and a lower drawing illustrates the dynamic control of the light source control level corresponding to the dynamic change in the input APL shown in the upper drawing. Particularly in the lower drawing, a solid line indicates an output signal from the light source control data production unit 14, and a dotted line indicates an output signal from the LPF 4. Tn denotes a unit field time period for detecting the APL. As shown in FIG. 19, in the present embodiment, when the APL is in a variable region (A1–A2), the light source control also dynamically follows the dynamic change in the APL in accordance with the above-method control method shown in FIG. 3. When the APL is in the fixed region Low and the fixed region High, however, the light source control level is so controlled as to be fixed at L1 (min) and L2 (max), respectively.

In the present embodiment, it is judged whether or not the light source driving level is shifted to L1 (min) or L2 (max) and, when it is shifted, the light source driving level is held in a predetermined time period prior to the above-mentioned normal control.

More specifically, in the upper drawing of FIG. 19, the APL at a time t10 is lower than the threshold value A1. Consequently, the light source control level is shifted to the level of L1 (min), as shown in the lower drawing of FIG. 19. Once the driving conditions of the light source are shifted to L1 (min), the light source control data production unit 14 holds an output in the state of L1 (min) despite the change in the APL in a time period T1 previously defined. When the time period T1 ends at a time t12, normal processing corresponding to the change in the APL is performed, as in the first embodiment.

Similarly, the APL at a time t20 is higher than the threshold value A2. Consequently, the light source control level is shifted to the level of L2 (max). Once the driving conditions of the light source are shifted to L2 (min), the light source control data production unit 14 holds an output in the state of L2 (min) despite the change in the APL in a time period T2 previously defined. When the time period T2 ends at a time t22, normal processing corresponding to the change in the APL is performed, as in the first embodiment.

In the present embodiment, once the light source driving level is shifted to L1 (min) or L2 (max), as described above, the light source control level does not follow the change in the APL in a predetermined time period. This produces the effect of reducing the frequency of the dynamic transition of the driving conditions of the light source, thereby making it possible to mitigate the degradation of the stable lighting characteristics of the light source and the degradation of the life characteristics thereof. Further, to hold an output particularly when the light source control level is shifted to L1 (min) has another advantage. When the APL is frequently changed before and after A1, for example, the change in the brightness of the light source is easily perceived unless the light source control level is held as in the present embodiment because the scene is a relatively dark scene. The reason for this is that human vision is sensitive to the change in brightness in the dark scene rather than the change in brightness in the bright scene, and sensitivity to the change in brightness increases. Consequently, preventing the brightness from frequently varying before and after A1 of the APL is effective in order to improve the displayed video quality.

As described in the foregoing, according to the third embodiment, in addition to the effect of the first embodiment, the driving conditions of the light source are not changed once the light source driving level is shifted to L1 (min) or L2 (max), to keep driving conditions immediately before the change, thereby making it possible to reduce the frequency of the dynamic transition of the driving conditions of the light source. As a result, the problems of the degradation of the stable lighting characteristics of the light source and the degradation of the life characteristics are mitigated, thereby making it possible to enhance the reliability of the light source. Further, the displayed video quality can be improved.

Figure 20:
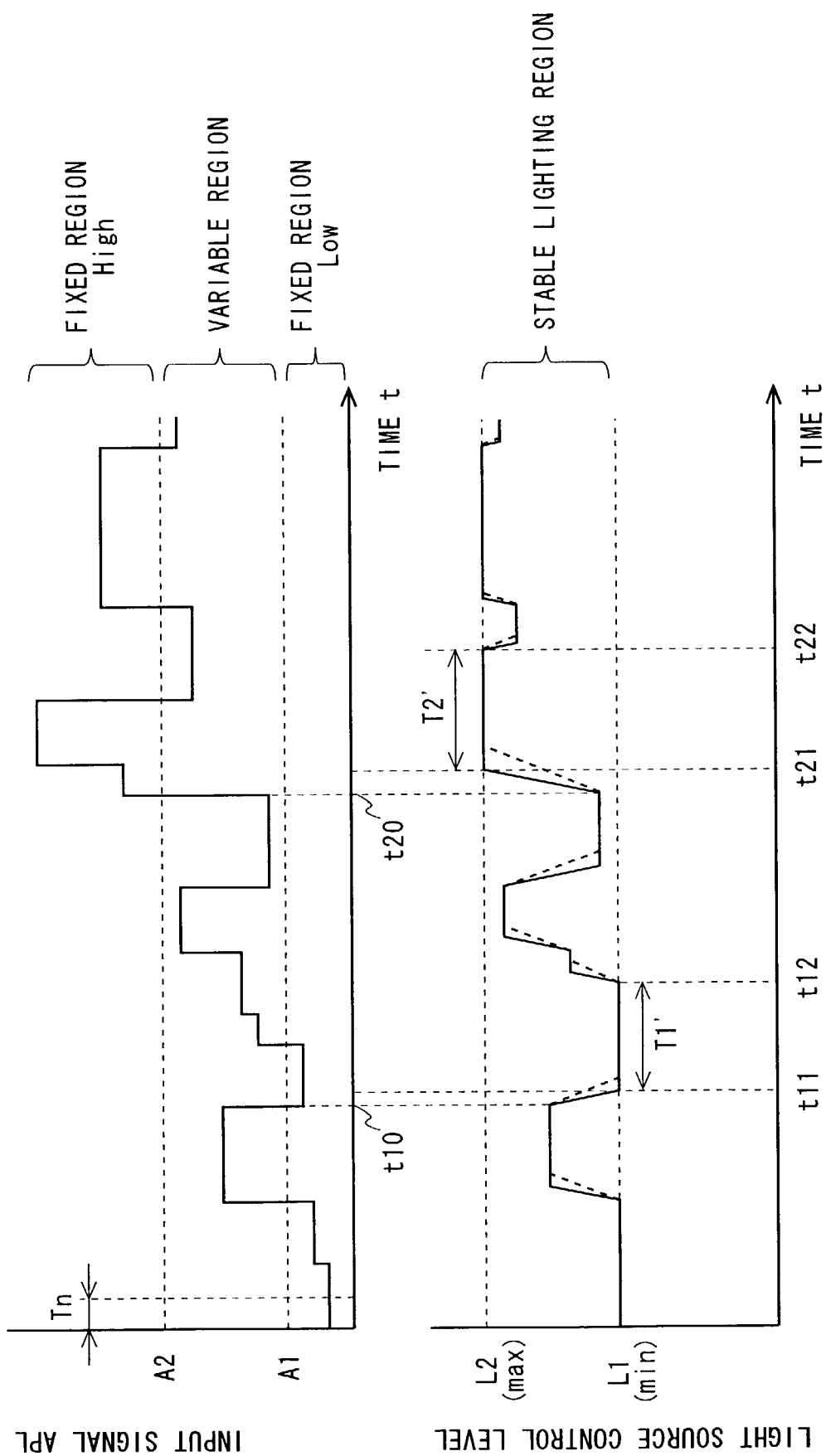
FIG. 20 is a diagram showing a modified example of signal processing in the third embodiment.

Although in the present embodiment, the light source control level is maintained for a predetermined time period elapsed from the time when the input APL is shifted to A1 or less or A2 or more, the present invention is not limited to this. For example, the light source control level may be maintained for a predetermined time period elapsed from the time when the actual power of the light source decreases to a minimum or increases to a maximum, or the light source control level may be maintained for a predetermined time period from the other timing. Referring now to FIG. 20, a modified example is described below.

In this modified example, the light source control data production unit carries out a control such that variable characteristics of the light source control level are given temporal delay using a digital processing operation, as shown in a lower drawing of FIG. 20, in correspondence with the change in an input APL. Specifically, in an upper drawing of FIG. 20, the APL at a time t10 is lower than a threshold value A1, and the light source control level is shifted to the level of L1 (min), as shown in the lower drawing of FIG. 20, at a time t11 by a temporal delay function of the light source control data production unit. Once the driving conditions of the light source are shifted to L1 (min), an output is held in a state of L1 (min) despite the change in the APL in a time period T1' previously defined. When the time period T1 ends at a time t12, normal processing conforming to the change in the APL is performed, as in the first embodiment.

Similarly, the APL at a time t20 is higher than a threshold value A2, and the light source control level is shifted to the level of L2 (max) at the time t12 by the temporal delay function in the light source control data production unit. Once the driving conditions of the light source are shifted to L2 (max), an output is held in a state of L2 (max) despite the change in the APL in a time period T2' previously defined. When the time period T2' ends at a time t22, normal processing conforming to the change in the APL is performed, as in the first embodiment.

The control method according to the third embodiment is also applicable to the control of an optical aperture and a light control element. In a case where the control method according to the present embodiment is applied to the dynamic control of the optical aperture shown in FIG. 8, for example, the light amount control level is maintained at L1a (min) and L2a (max) for a predetermined time period elapsed from the time when the input APL is shifted to A1a or less and to A2a or more, respectively. Consequently, the frequency of the dynamic transition of driving conditions of the optical aperture can be reduced. As a result, the reliability of an optical aperture driving structure can be prevented from being degraded. On the other hand, in a case where the control method according to the present embodiment is applied to the dynamic control of the light control element shown in FIG. 12, for example, the light amount control level is maintained at L1b (min) and L2b (max) for a predetermined time period elapsed from the time when the input APL is shifted to A1b or less and to A2b or more, respectively. Consequently, the frequency of the dynamic transition of the driving conditions of the light control element can be reduced. As a result, the reliability of the light control element can be prevented from being degraded.

Fourth Embodiment

Figure 21:
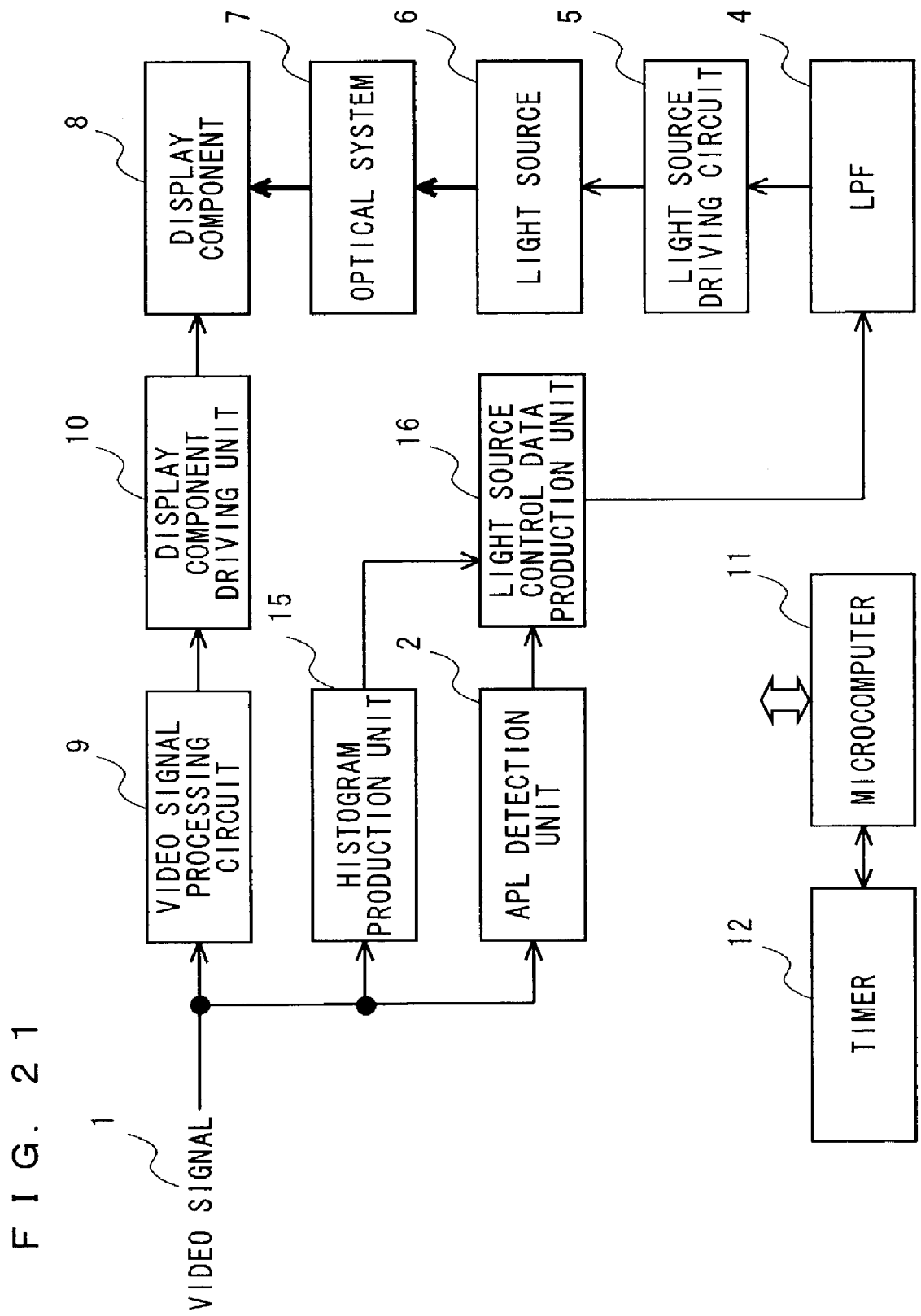
FIG. 21 is a block diagram showing the configuration of a video display apparatus according to a fourth embodiment of the present invention.

FIG. 21 illustrates the configuration of a video display apparatus according to a fourth embodiment of the present invention. The video display apparatus includes an APL detection unit 2, a histogram production unit 15, a light source control data production unit 16, an LPF 4, a light source driving circuit 5, a light source 6, an optical system 7, a display component 8, a video signal processing circuit 9, a display component driving unit 10, a microcomputer 11, and a timer 12. The present embodiment differs from the first embodiment only in the new provision of the histogram production unit 15 and the operations of the light source control data production unit 16. Accordingly, the same other components are assigned the same reference numerals and hence, the descriptions thereof are not repeated.

In FIG. 21, a video signal 1 is inputted to the video signal processing circuit 9, the histogram production unit 15, and the APL detection unit 2. The histogram production unit 15 detects, for each unit field time period, a histogram distribution for each of a plurality of arbitrary brightness level sections obtained by dividing an input video signal level. The results of the detection are inputted to the light source control data production unit 16. In the light source control data production unit 16, light source control data is produced on the basis of the results of APL detection and the results of histogram production.

Figure 22:
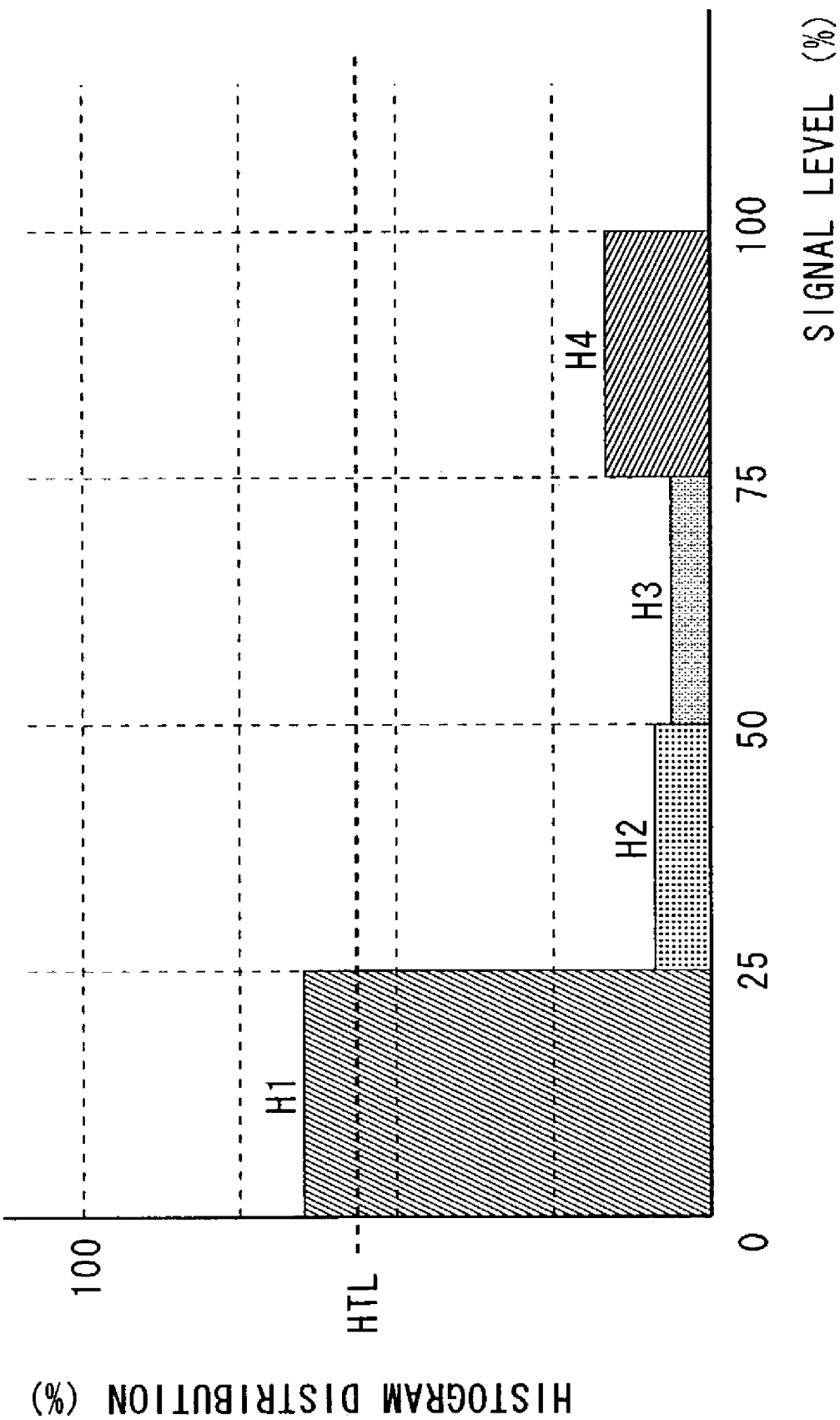
FIG. 22 is a diagram for explaining the operations of a histogram production unit 15.

Referring now to FIG. 22, the specific operations of the histogram production unit 15 are described below. In the histogram production unit 15, a signal level from 0% to 100% is previously divided into a plurality of brightness levels (four sections H1 to H4 in the drawing). A histogram distribution for each of the above-mentioned sections in the inputted video signal 1 is detected for each unit field. The results of the histogram production are inputted to the light source control data production unit 16.

In the light source control data production unit 16, from among the sections, a value in the section H1 closest to a black level is compared with a threshold value HTL previously defined. As a result of the comparison, when the value in the section H1 is lower than HTL, the light source control data production unit 16 carries out control, in accordance with the above-mentioned control method shown in FIG. 3, such that light source control also dynamically follows the dynamic change in the APL when the APL is in the variable region (A1–A2), while the light source control level is fixed at L1 (min) and L2 (max) when the APL is in the fixed region Low and the fixed region High, respectively, as in the first embodiment.

On the other hand, when the value in the section H1 is higher than HTL, it is judged that the scene is a dark scene irrespectively of the APL. The light source control data production unit 16 sets the light source driving control level to L1 (min) prior to the same normal control as that in the above-mentioned first embodiment to mitigate floating blackness of display video. In a case where a particularly bright portion exists only in a part of the dark scene, the APL is increased upon being affected by the particularly bright portion. Accordingly, it cannot be judged that the scene is a dark scene from the APL. On the other hand, the dark scene is judged on the basis of the histogram distribution as in the present embodiment, thereby making it possible to judge that the scene is a dark scene, even when the particularly bright portion exists only in the dark scene.

Although, in the present embodiment, the number of sections composing the histogram distribution is set to four, the present invention is not limited to the same. For example, it may be an arbitrary number of sections. Although the range (width) of each of the brightness level sections is taken as 25%, the present invention is not limited to this, and the range may be arbitrary. Further, the size of the range may differ for each section.

Although, in the present embodiment, the light source control data production unit 16 produces light source control data on the basis of the value of the histogram distribution in the section H1, the present invention is not limited to this. For example, the histogram distribution at the brightness level in the other section may be used depending on a scene control to be sought, or a plurality of histogram distributions may be used in combination.

Although, in the present embodiment, the light source control level is also set to L1 (min) shown in FIG. 3, the present invention is not limited to this. For example, the light source control level may be set to a range from L2 (max) or L1 (min) to L2 (max) depending on the control to be sought. For example, when the scene is a bright scene or a scene which is neither bright nor dark on the basis of the histogram distribution, the light source control level may be set in the range from L2 (max) or L1 (min) to L2 (max) irrespectively of the value of the APL.

Although, in the present embodiment, it is judged whether the value in the section H1 is lower or higher than the threshold value HTL, to control the light source control level at two different modes depending on the results of the judgment, the present invention is not limited to this. For example, another threshold value may be added in addition to the threshold value HTL, to increase the number of modes for judging conditions, and the conditions of the light source control level may be set to a plurality of modes in accordance with the results of the judgment.

Although descriptions were made of a case where the light source was dynamically controlled as in the fourth embodiment, the method of controlling the light source described in the fourth embodiment may be also applicable to control an optical aperture and control a light control element. The configuration of the video display apparatus in a case where the method of controlling the light source in the present embodiment is applied to the control of the optical aperture and the control of the light control element is briefly described below.

Figure 23:
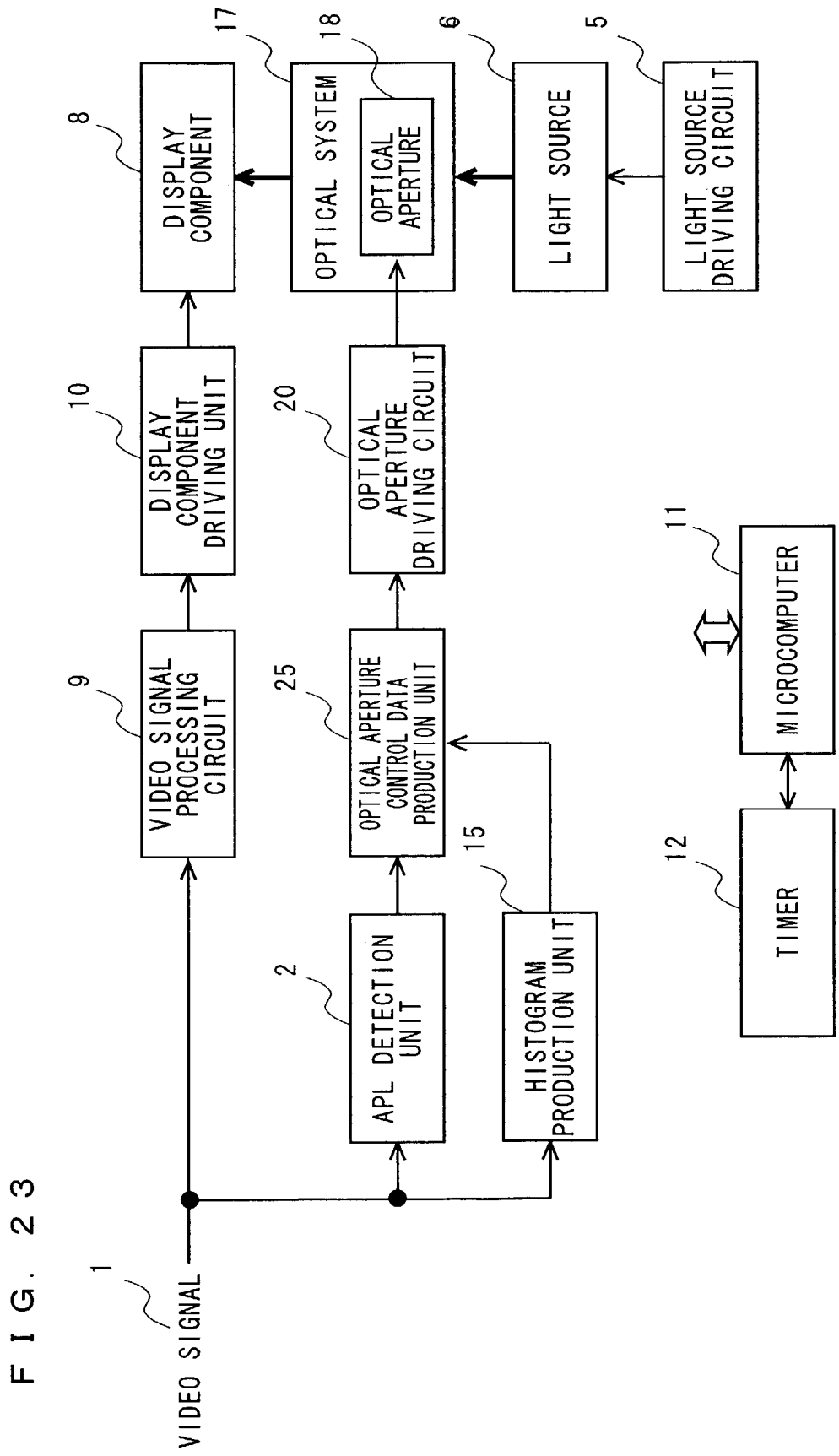
FIG. 23 is a block diagram showing the configuration of a video display apparatus when a method of controlling a light source in the fourth embodiment is applied to control an optical aperture.

FIG. 23 is a block diagram showing the configuration of the video display apparatus in a case where the method of controlling the light source in the fourth embodiment is applied to the control of the optical aperture. In FIG. 23, the video display apparatus includes an APL detection unit 2, a histogram production unit 15, an optical aperture control data production unit 25, an optical aperture driving circuit 20, a light source driving circuit 5, a light source 6, an optical system 17, a display component 8, a video signal processing circuit 9, a display component driving unit 10, a microcomputer 11, and a timer 12. The optical system 17 includes an optical aperture 18. In FIG. 23, the same components as those shown in FIG. 7 or 21 are assigned the same reference numerals. The optical aperture control data production unit 25 produces optical aperture control data on the basis of the results of APL detection and the results of histogram production, similarly to the light source control data production unit 16 shown in FIG. 21. Even when a particularly bright portion exists only in a part of a dark scene, and it cannot be judged that the scene is a dark scene from the results of APL detection, it is judged that the scene is a dark scene, thereby making it possible to prevent floating blackness.

Figure 24:
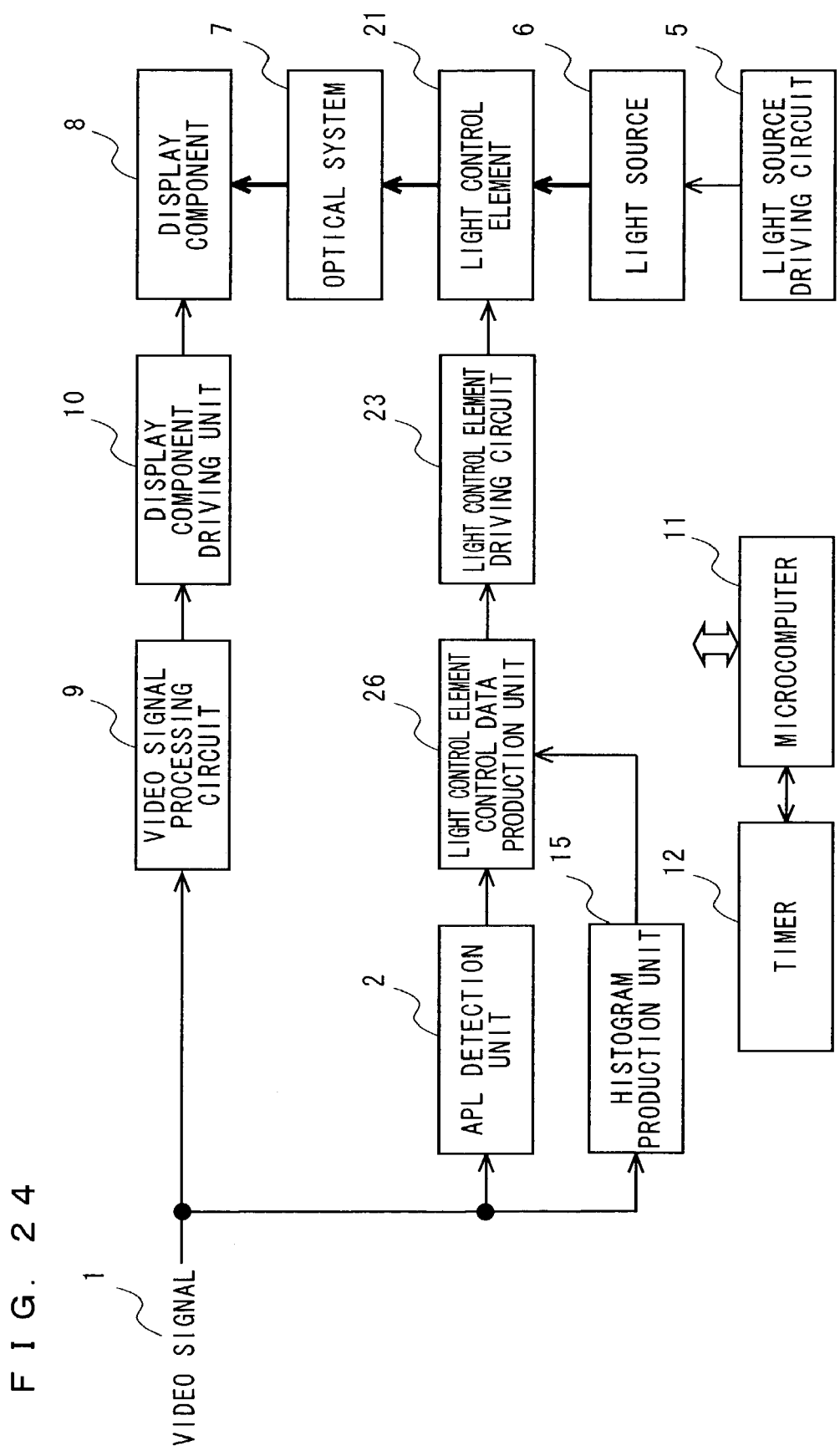
FIG. 24 is a block diagram showing the configuration of a video display apparatus when the method of controlling the light source in the fourth embodiment is applied to control a light control element.

FIG. 24 is a block diagram showing the configuration of a video display apparatus in a case where the method of controlling the light source in the fourth embodiment is applied to the control of the light control element. In FIG. 24, the video display apparatus includes an APL detection unit 2, a histogram production unit 15, a light control element control data production unit 26, a light control element driving circuit 23, a light source driving circuit 5, a light source 6, a light control element 21, an optical system 7, a display component 8, a video signal processing circuit 9, a display component driving unit 10, a microcomputer 11, and a timer 12. In FIG. 24, the same components as those shown in FIG. 10 or 21 are assigned the same reference numerals. The light control element control data production unit 26 produces light control element control data on the basis of the results of APL detection and the results of histogram production, similarly to the light source control data production unit 16 shown in FIG. 21. Even when a particularly bright portion exists only in a part of a dark scene, and it cannot be judged that the scene is a dark scene from the results of APL detection, it is judged that the scene is a dark scene, thereby making it possible to prevent floating blackness.

Although, in the foregoing, the configurations of the respective video display apparatuses in a case where the method of controlling the light source in the fourth embodiment is applied to the control of the optical aperture and the control of the light control element have been briefly described, the control of the light source and the control of the optical aperture may be simultaneously carried out, the control of the light source and the control of the light control element may be simultaneously carried out, or the control of the light source, the control of the optical aperture, and the control of the light control element maybe simultaneously carried out. The configuration of the video display apparatus in each of the cases is briefly described.

Figure 25:
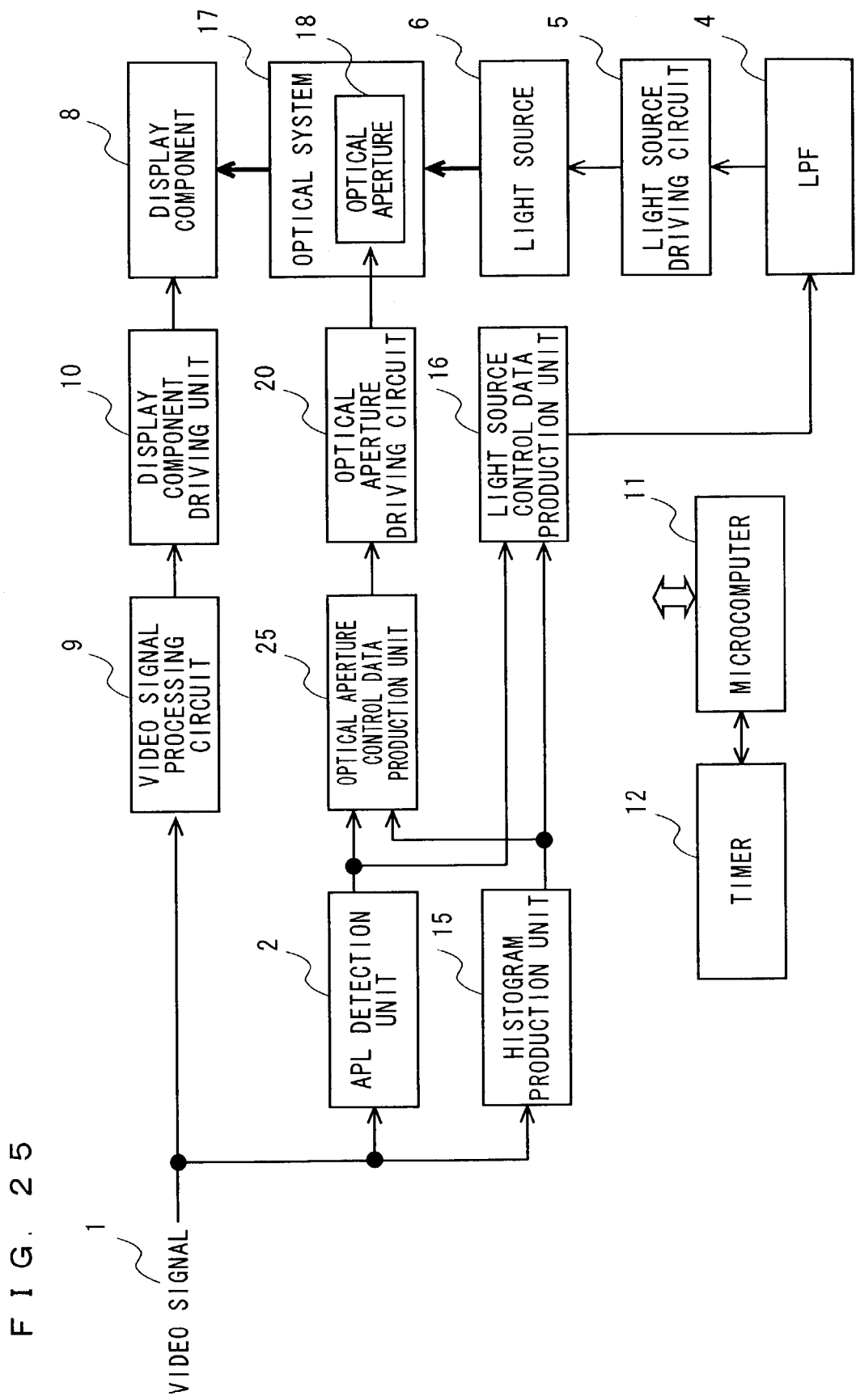
FIG. 25 is a block diagram showing the configuration of a video display apparatus when the method of controlling the light source in the fourth embodiment is applied to control a light source and the optical aperture.

FIG. 25 is a block diagram showing the configuration of the video display apparatus in a case where the method of controlling the light source in the fourth embodiment is applied to the control of the light source and the optical aperture. In FIG. 25, the video display apparatus includes an APL detection unit 2, a histogram production unit 15, an optical aperture control data production unit 25, an optical aperture driving circuit 20, a light source control data production unit 16, an LPF 4, a light source driving circuit 5, a light source 6, an optical system 17, a display component 8, a video signal processing circuit 9, a display component driving unit 10, a microcomputer 11, and a timer 12. The optical system 17 includes an optical aperture 18. In FIG. 25, the same components as those shown in FIG. 21 or 23 are assigned the same reference numerals. Even when a particularly bright portion exists only in a part of a dark scene, and it cannot be judged that the scene is a dark scene from the results of APL detection, it is judged that the scene is a dark scene, thereby making it possible to prevent floating blackness.

Figure 26:
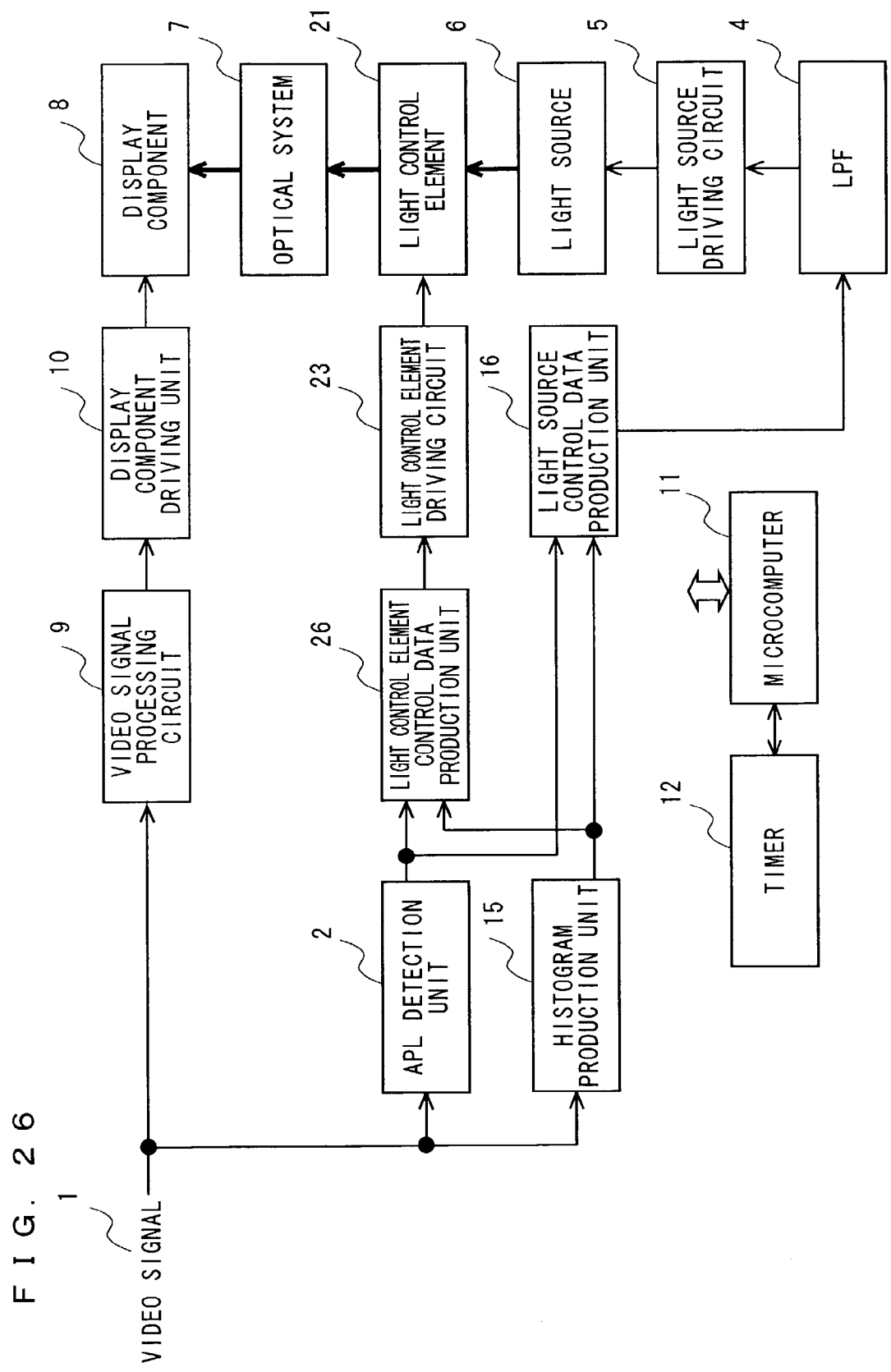
FIG. 26 is a block diagram showing the configuration of a video display apparatus when the method of controlling the light source in the fourth embodiment is applied to control the light source and a light control element.

FIG. 26 is a block diagram showing the configuration of a video display apparatus in a case where the method of controlling the light source in the fourth embodiment is applied to the control of the light source and the light control element. In FIG. 26, the video display apparatus includes an APL detection unit 2, a histogram production unit 15, a light control element control data production unit 26, a light control element driving circuit 23, a light source control data production unit 16, an LPF 4, a light source driving circuit 5, a light source 6, a light control element 21, an optical system 7, a display component 8, a video signal processing circuit 9, a display component driving unit 10, a microcomputer 11, and a timer 12. In FIG. 26, the same components as those shown in FIG. 21 or 24 are assigned the same reference numerals. Even when a particularly bright portion exists only in a part of a dark scene, and it cannot be judged that the scene is a dark scene from the results of APL detection, it is judged that the scene is a dark scene, thereby making it possible to prevent floating blackness.

Figure 27:
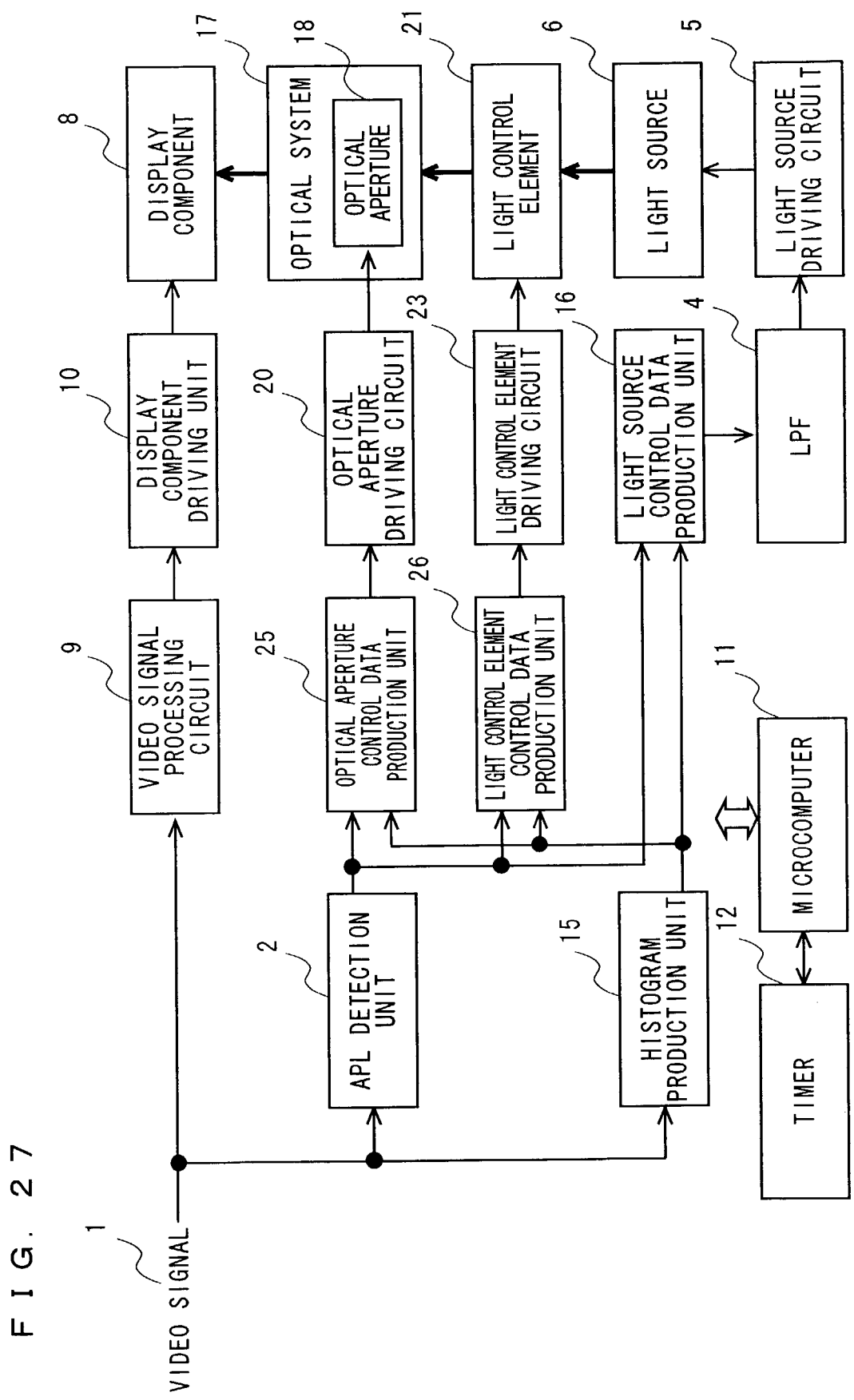
FIG. 27 is a block diagram showing the configuration of a video display apparatus when the method of controlling the light source in the fourth embodiment is applied to control the light source, the optical aperture, and the light control element.

FIG. 27 is a block diagram showing the configuration of a video display apparatus in a case where the method of controlling the light source in the fourth embodiment is applied to the control of the light source, the optical aperture, and the light control element. In FIG. 27, the video display apparatus includes an APL detection unit 2, a histogram production unit 15, an optical aperture control data production unit 25, an optical aperture driving circuit 20, a light control element control data production unit 26, a light control element driving circuit 23, a light source control data production unit 16, an LPF 4, a light source driving circuit 5, a light source 6, a light control element 21, an optical system 17, a display component 8, a video signal processing circuit 9, a display component driving unit 10, a microcomputer 11, and a timer 12. The optical system 17 includes an optical aperture 18. In FIG. 27, the same components as those shown in FIG. 21 or 24 are assigned the same reference numerals. Even when a particularly bright portion exists only in a part of a dark scene, and it cannot be judged that the scene is a dark scene from the results of APL detection, it is judged that the scene is a dark scene, thereby making it possible to prevent floating blackness.

As described in the foregoing, the brightness can be dynamically controlled depending on the video scene more effectively by combining the control of the light source and the control of the optical aperture or the light control element, thereby making it possible to further mitigate the problem of lack of a brightness feeling in a bright scene and floating blackness in a dark scene, to increase a contrast feeling.

Fifth Embodiment

Figure 28:
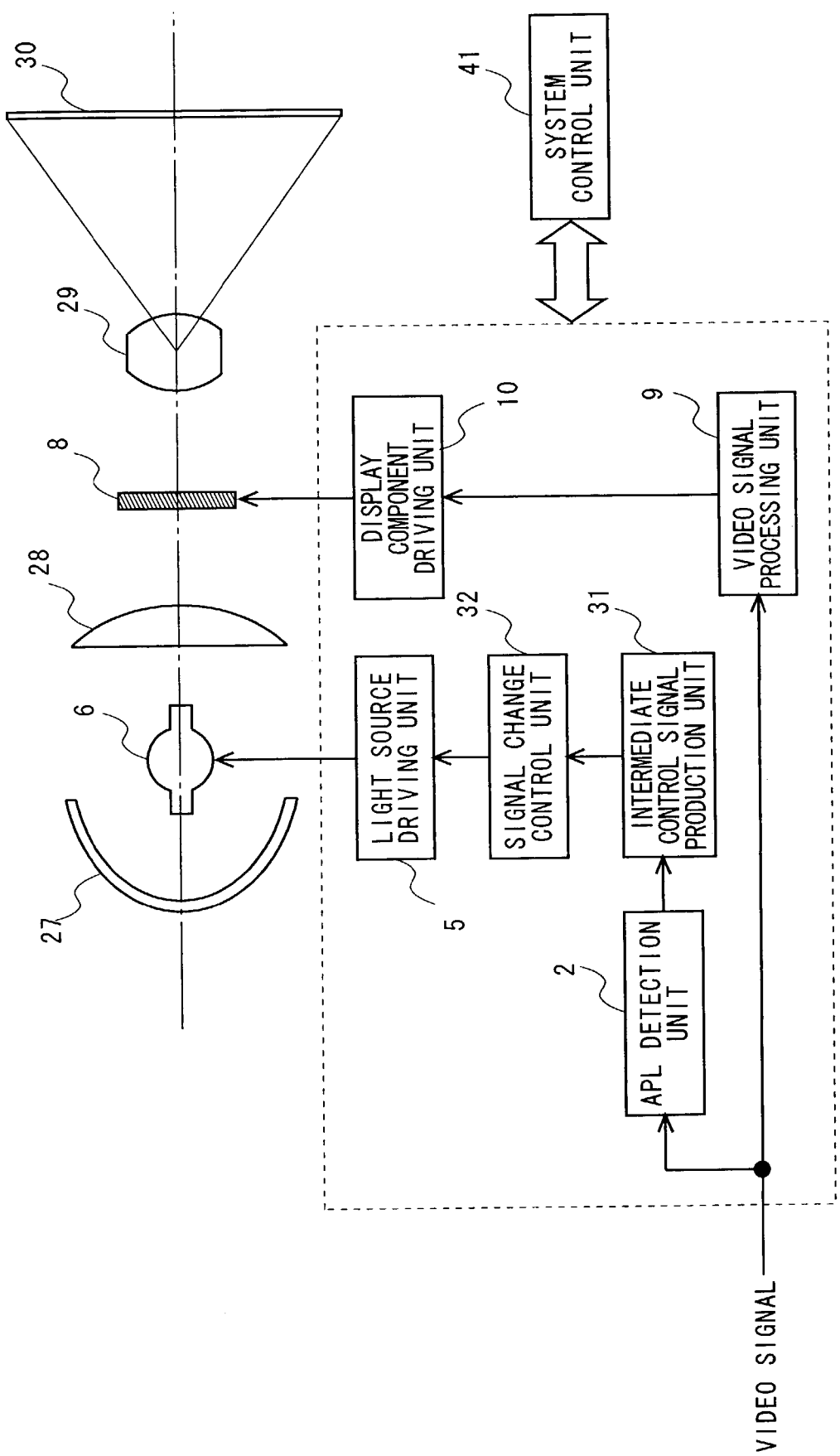
FIG. 28 is a block diagram showing the configuration of a video display apparatus according to a fifth embodiment of the present invention.

FIG. 28 is a block diagram showing the configuration of a video display apparatus according to a fifth embodiment of the present invention. In FIG. 28, the video display apparatus includes a display component 8, a light source 6, a reflecting mirror 27, a converging lens 28, a projection lens 29, a screen 30, an APL detection unit 2, an intermediate control signal production unit 31, a signal change control unit 32, a light source driving unit 5, a video signal processing unit 9, a display component driving unit 10, and a system control unit 41. In FIG. 28, the same components as those shown in FIG. 1 are assigned the same reference numerals.

The display component 8 has a light modulating function, and the light source 6 illuminates the display component 8. The reflecting mirror 27, the converging lens 28, and the projection lens 29 constitute an illumination optical system. The reflecting mirror 27 reflects light irradiated from the light source 6. The converging lens 28 collects the light irradiated from the light source 6 and the light reflected on the reflecting mirror 27. The projection lens 29 enlarges and projects video displayed on the display component 8 on a screen 30. The reflecting mirror 27 and the converging lens 28 are a configuration corresponding to the optical system 7 shown in FIG. 1. A video signal is inputted to the APL detection unit 2. The APL detection unit 2 detects the APL of the inputted video signal, and outputs the results of the detection as an APL signal. Based on the APL signal outputted from the APL detection unit 2, the intermediate control signal generation unit 31 generates an intermediate control signal forming a basis of a light source control signal for controlling the brightness of the light source 6. The signal change control unit 32 controls the change in the level of the intermediate control signal outputted from the intermediate control signal generation unit 31, to produce and output a light source control signal for controlling the brightness of the light source 6. The light source driving unit 5 drives the light source 6 under conditions conforming to the light source control signal supplied from the signal change control unit 32. The video signal processing unit 9 processes the inputted video signal in a form suitable for display on the display component 8. The display component driving unit 10 drives the display component 8 on the basis of the video signal processed by the video signal processing unit 9. A system control unit 41 controls each of the above-mentioned control units.

Figure 29:
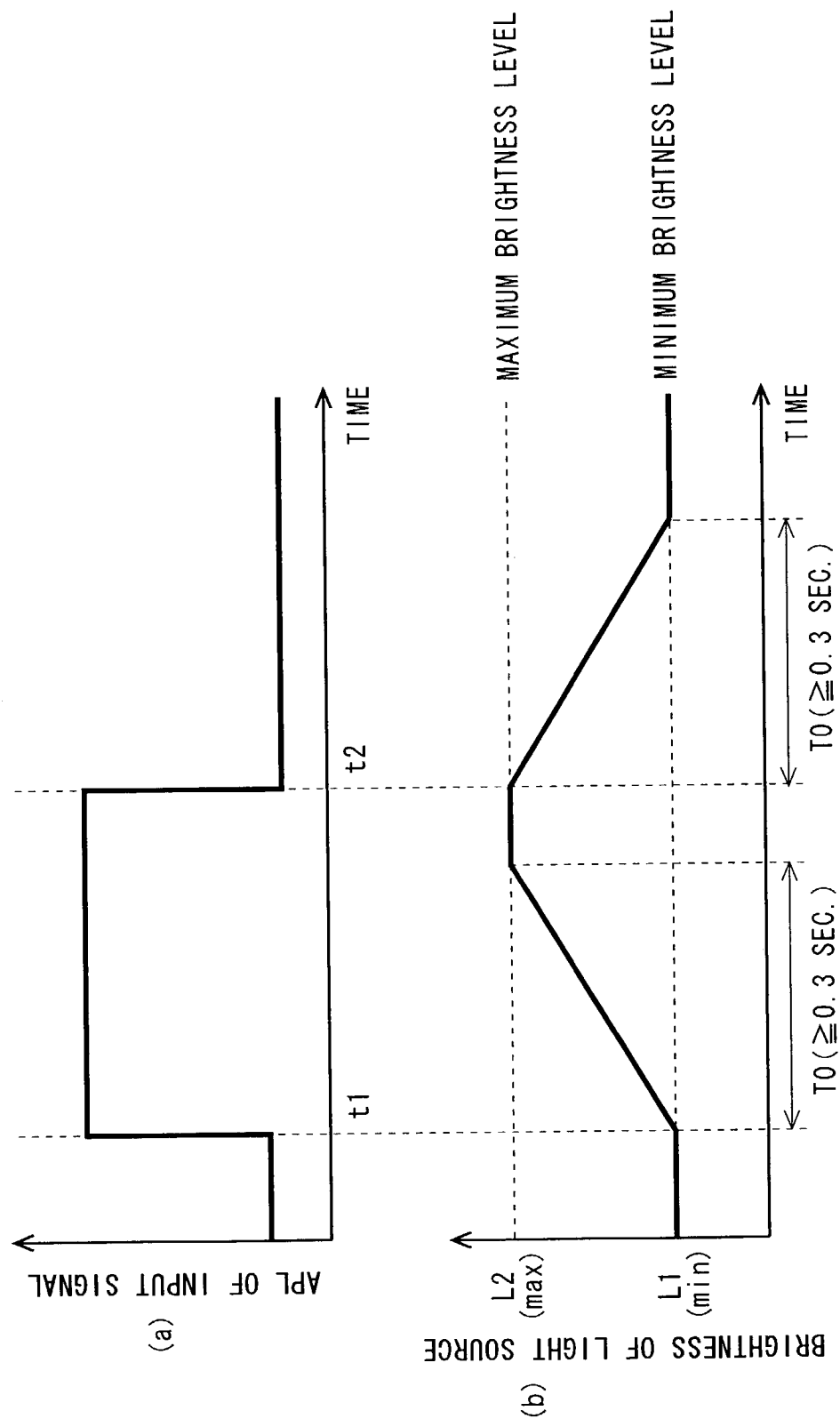
FIGS. 29(a) and 29(b) are diagrams showing an example of the change in time of an APL signal outputted from an APL detection unit 2 and the brightness of a light source 6.

FIG. 29 (a) illustrates an example of the change in time of an APL signal outputted from the APL detection unit 2, and FIG. 29 (b) illustrates the change in time of the brightness of the light source 6 driven by the light source control signal generated on the basis of the APL signal shown in FIG. 29 (a).

Referring now to FIGS. 28 and 29(a) and (b), operations particularly related to the control of the brightness of the light source 6 in the video display apparatus according to the present embodiment are described in detail. The operations of the video signal processing unit 9 and the display component driving unit 10 are well known and hence, the descriptions thereof are omitted.

The APL detection unit 2 detects the APL of the inputted video signal for each unit field time period with respect to a brightness signal component of the inputted video signal, and outputs the results of the detection as an APL signal. The intermediate control signal generation unit 31 converts, for each unit field time period, the level of the APL signal outputted from the APL detection unit 2 in accordance with a set conversion function or conversion table, and generates an intermediate control signal. The intermediate control signal is a signal forming a basis of the light source control signal for ultimately controlling the brightness level of the light source. The intermediate control signal is generated such that the brightness of the light source 6 increases when the APL is high, while decreasing when the APL is low. Herein, the conversion function or the conversion table may be previously incorporated into the intermediate control signal generation unit 31 or may be suitably set from the system control unit 41. Since the intermediate control signal is a signal directly formed from the APL of the video signal, it is a signal which changes for each unit field time period by following the change in the APL of the video signal. The signal change control unit 32 controls the change speed of the intermediate control signal which changes for each unit field time period on the basis of a set time constant, thereby converting the intermediate control signal into a signal having a slow change speed and outputting the signal as a light source control signal. The detailed operations of the signal change control unit 32 are described further below. The light source driving unit 5 drives the light source 6 under driving conditions conforming to the light source control signal, thereby changing the brightness of the light source 6.

For the purpose of reference, consider a case where the intermediate control signal is directly inputted to the light source driving unit 5 to control the light source 6 without using the signal change control unit 32. In this case, the intermediate control signal is a signal on which the change in the APL of the video signal is reflected as it is, as described above, so that the brightness of the light source 6 changes for each unit field time period in accordance with the intermediate control signal. When the brightness of the light source 6 is thus controlled in a form such that the change in the APL is reflected as it is, the brightness is changed too early, such that the video looks as if it is flickering, resulting in the degraded display quality. Since the light source driving unit 5 and the light source 6 respectively have time constants with respect to the change in the controlled state, the change in the brightness is delayed from the change in the APL. Therefore, in such cases where a bright scene is rapidly changed to a dark scene, for example, the brightness of a screen is rapidly changed upon being delayed from the change in the scene, resulting in video that provides a very uncomfortable feeling. On the other hand, the brightness of the light source 6 is controlled in a form such that the change in the APL is reflected as it is, whereby the light emitted state is frequently changed. Accordingly, the degradation of an electrode is accelerated, resulting in the degraded reliability of the light source 6.

In order to solve the above-mentioned problem, it is considered that the intermediate control signal is passed through a low-pass filter, to reduce the change in the light emitted state of the light source. However, the time constant of the low-pass filter composed of an electrical component is approximately 0.1 second at most, and the change in the brightness on the screen by the change in the brightness of the light source 6 is still detected, which is insufficient to solve the problem of degradation of the display quality.

In the present embodiment, the signal change control unit 32 is provided in order to solve the problem of degradation of quality due to perception of the change in the brightness on the screen, as described above. The change speed of the intermediate control signal is controlled by the signal change control unit 32, thereby reducing the change speed of the brightness of the light source 6 to a degree such that it is not perceived. Accordingly, it is possible to perform display with a high contrast feeling while preventing the display quality from being degraded. Further, the number of changes in the light emitted state of the light source 6 is reduced as the result of reducing the change speed of the brightness of the light source, thereby making it possible to prevent the reliability of the light source 6 from being degraded. In order to prevent the degradation of the display quality due to perception of the change in the brightness of the light source 6, it was experimentally found that the brightness of the light source 6 may be slowly changed at a change speed such that a time period T0 required for a case where the brightness of the light source 6 is linearly changed from a minimum brightness L1 to a maximum brightness L2 and a case where it is linearly changed from the maximum brightness to the minimum brightness is at least 0.3 seconds and preferably more. Herein, the degree of the desirable change speed is merely indirectly expressed by a time period required for a case where the brightness of the light source is directly changed from the maximum brightness to the minimum brightness and a case where it is linearly changed from the minimum brightness to the maximum brightness. It goes without saying that the change speed is important in actually controlling the brightness of the light source.

Figure 30:
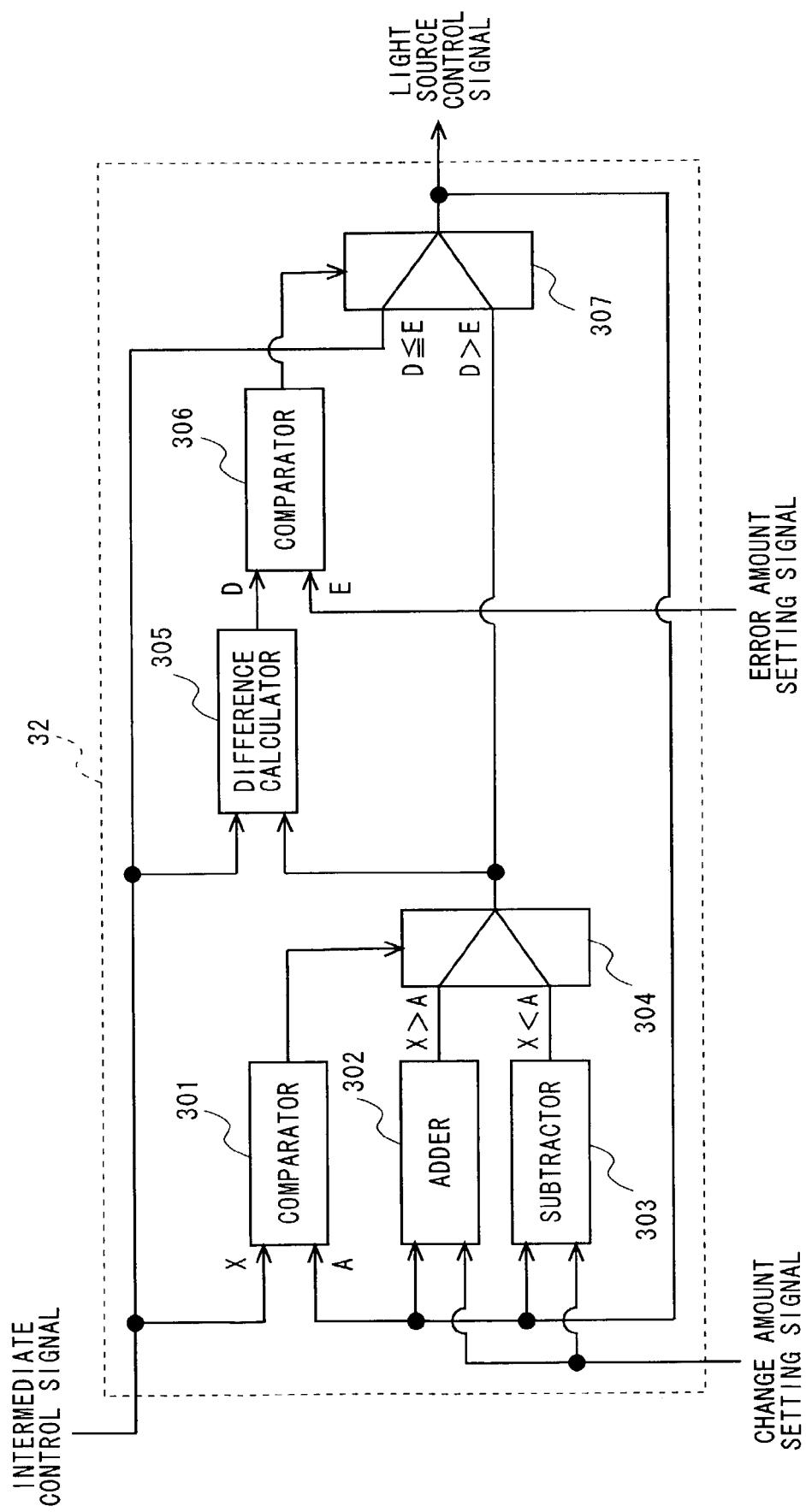
FIG. 30 is a block diagram showing the configuration of a signal change control unit 32.

The signal change control unit 32 that controls the change speed of the brightness of the light source as described above is described below in detail. FIG. 30 is a block diagram showing the configuration of the signal change control unit 32. The signal change control unit 32 includes a comparator 301, an adder 302, a subtractor 303, a selector 304, a difference calculator 305, a comparator 306, and a selector 307. The operations of the signal change control unit 32 are described below.

An intermediate control signal generated by the intermediate control signal generation unit 31 is inputted to the signal change control unit 32. In the signal change control unit 32, a light source control signal is generated on the basis of the intermediate control signal and is outputted from the selector 307. The light source control signal outputted from the selector 307 is fed back to the comparator 301, the adder 302, and the subtracter 303. The signal change control unit 32 adds or subtracts a light source control signal in the preceding unit field time period to or from a change amount setting signal from the system control unit 41 in the adder 302 or the subtracter 303, thereby successively updating and outputting the light source control signal for each unit field time period. The change amount setting signal is set to an amount of change such that the change speed of the brightness of the light source 6 is not perceived, as described using FIG. 29. The inputted intermediate control signal is compared with the light source control signal in the preceding unit field time period in the comparator 301. In the selector 304, either one of an output of the adder 302 and an output of the subtracter 303 is selected and outputted depending on the results of the comparison. When the level of the intermediate control signal in the current unit field time period is higher than the level of the light source control signal in the preceding unit field time period, for example, a predetermined amount of change is added to the output of the adder 302, that is, the light source control signal in the preceding unit field time period, and the result of the addition is outputted from the selector 304. Herein, the change amount setting signal from the system control unit 41 is arbitrarily set, thereby making it possible to freely control the change speed of the light source control signal. The light source control signal may be updated not for each unit field time period but for a plurality of unit field time periods, thereby making it possible to further make the change speed of the light control signal lower. The reason for this is that the change speed of the light source control signal is, proportional to the amount of change set by the change amount setting signal divided by the updating intervals of the light source control signal.

The difference calculator 305 finds a difference between the output from the selector 304 and the intermediate control signal. A difference output from the difference detector 305 is compared with an error amount setting signal inputted from the system control unit 41 in the comparator 306. As a result, when the difference output of the difference calculator 305 is not more than the error amount setting signal, the selector 307 selects the inputted intermediate control signal, thereby outputting the intermediate control signal as it is as the light source control signal. On the other hand, when the difference output of the difference calculator 305 is larger than the error amount setting signal, the selector 307 selects an output from the selector 304, thereby outputting the output as the light source control signal. To select and output the intermediate control signal or the output of the selector 304 depending on an error amount is not necessarily indispensable but is preferable. This is because, if the output is thus selected depending on the error amount setting signal, it is possible to prevent a problem such that the output from the selector 304 is not stabilized to enter an oscillated state despite the fact that the level of the intermediate control signal is fixed depending on the set value of the change amount setting signal. Note that it is desirable that the error amount is set to half of the change amount in order to reliably prevent the oscillated state.

As described in the foregoing, according to the fifth embodiment, the brightness of the light source 6 is controlled in synchronization with the APL. Therefore, in a dark scene where the APL is low, as in movie software or the like, the brightness of the light source 6 is controlled so as to be decreased, thereby making it possible to mitigate the problem of the degradation of the quality of display video, for example, floating blackness on a screen, and to provide video which is higher in quality. Particularly, the change speed of the brightness of the light source 6 is decreased to a degree such that a viewer does not perceive the change in the brightness of the light source by the signal change control unit 32, thereby producing large effects. For example, it is possible to display video providing no uncomfortable feeling and to prevent the life characteristics of the light source 6 from being degraded.

Sixth Embodiment

Figure 31:
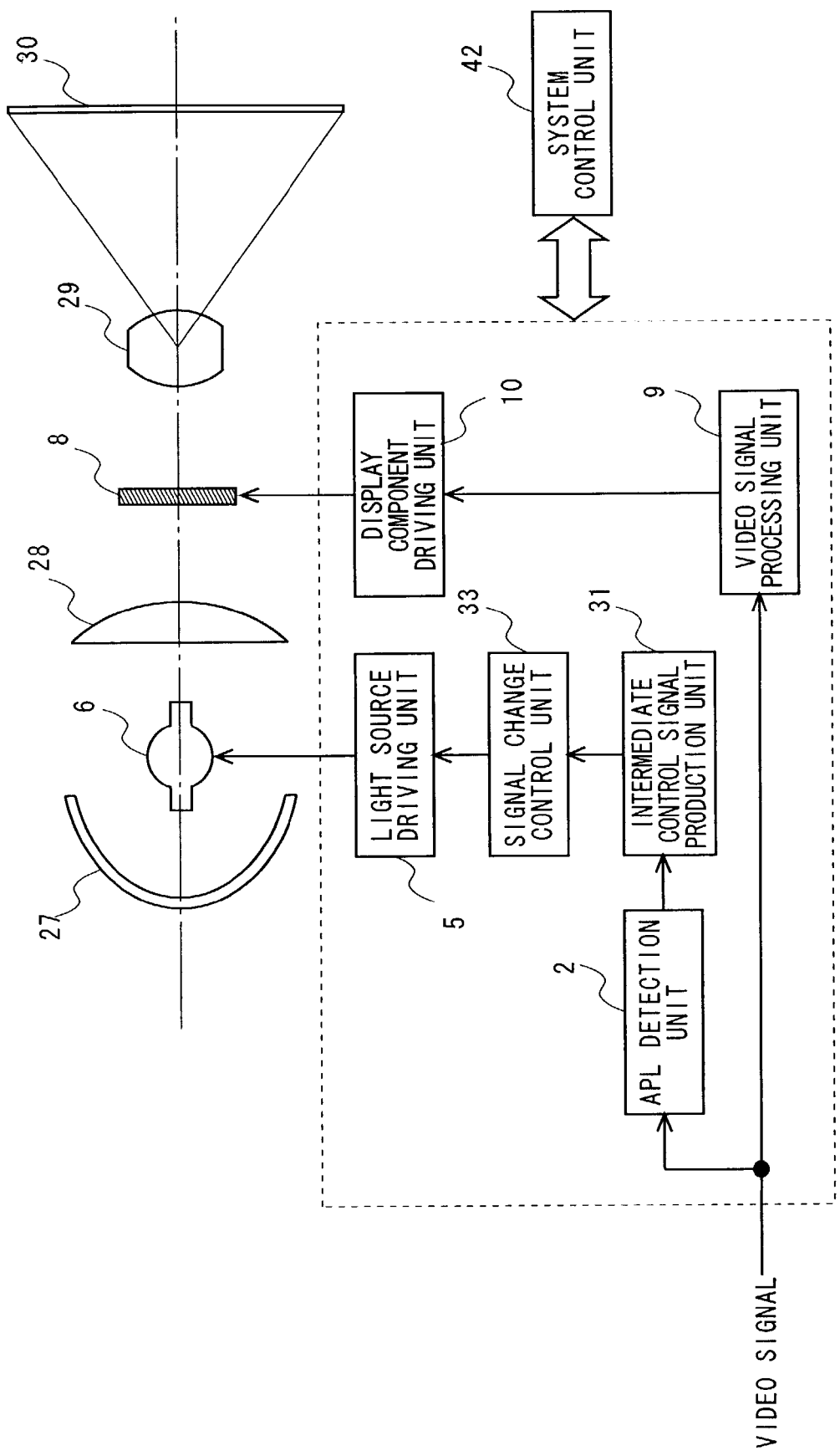
FIG. 31 is a block diagram showing the configuration of a video display apparatus according to a sixth embodiment of the present invention.

FIG. 31 illustrates the configuration of a video display apparatus according to a sixth embodiment of the present invention. The video display apparatus shown in FIG. 31 differs from the video display apparatus shown in FIG. 28 only in a signal change control unit 33 and a system control unit 42. In FIG. 31, the same components as those shown in FIG. 28 are assigned the same reference numerals and hence, the descriptions thereof are not repeated.

In the present embodiment, the signal change control unit 33 controls the change speed of an intermediate control signal generated in an intermediate control signal generation unit 31, to generate a light source control signal for controlling the brightness of a light source 6, as in the fifth embodiment. The change speed of the brightness of the light source 6 is controlled such that the change speed in a case where it is decreased is higher than that in a case where it is increased. The operations of the signal change control unit 33 are described below in detail.

Figure 32:
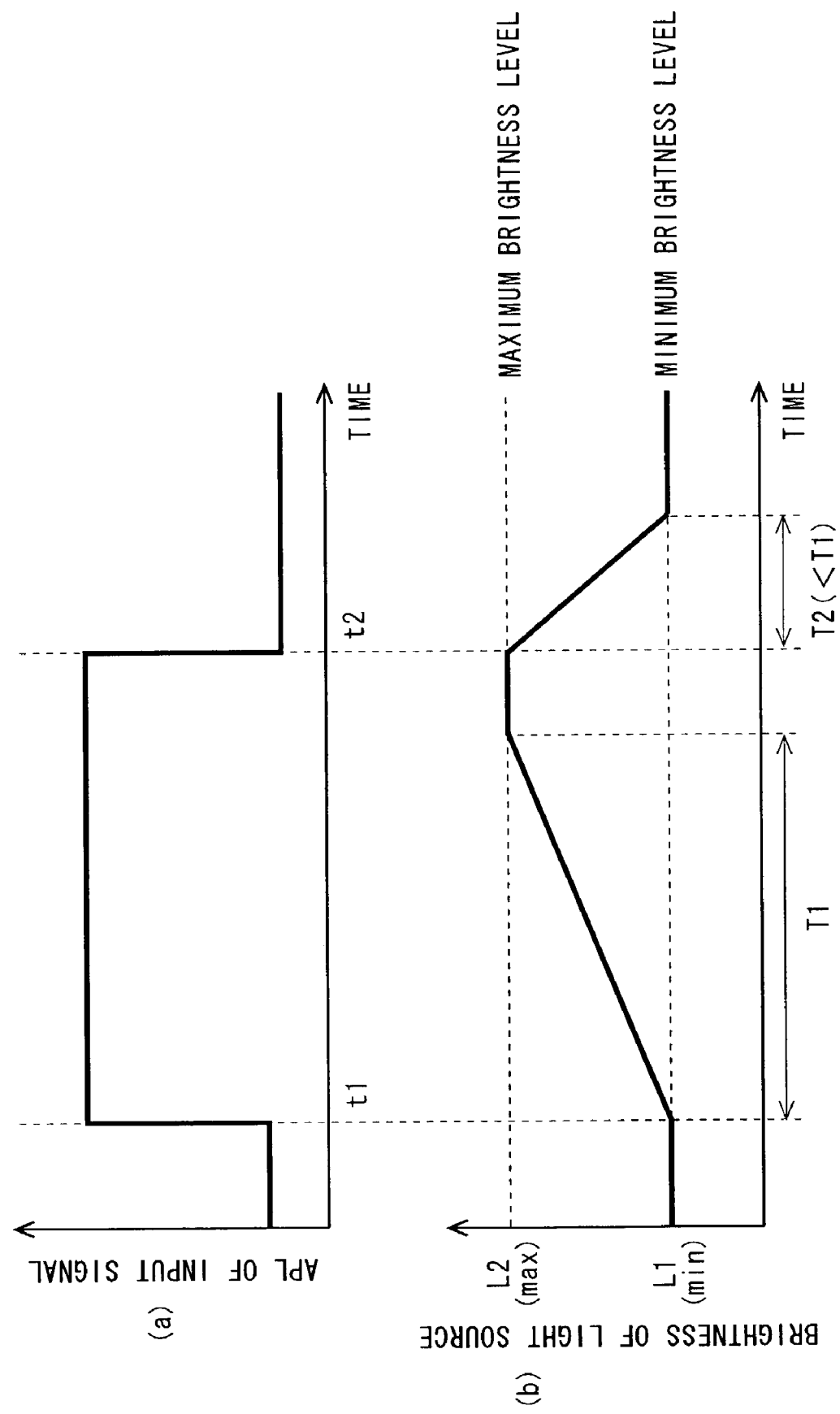
FIGS. 32(a) and 32(b) are diagrams showing an example of the change in time of an APL signal outputted from an APL detection unit 2 and the brightness of a light source 6.

FIG. 32 (a) illustrates an example of the change in time of an APL signal outputted from an APL detection unit 2, and FIG. 32 (b) illustrates the change in time of the brightness of the light source 6 driven by a light source control signal generated on the basis of the APL signal shown in FIG. 32 (a).

The signal change control unit 33 controls the change speed of the intermediate control signal which changes for each unit field time period by a set time constant, and converts the intermediate control signal into a light source control signal having a low change speed. At this time, it is detected whether the intermediate control signal changes in the direction in which the brightness of the light source 6 is increased or conversely changes in the direction in which the brightness of the light source 6 is decreased. In a case where control is carried out in the direction in which the brightness of the light source 6 is decreased, control is carried out such that the change speed of the light source control signal is increased to change the brightness of the light source 6 earlier, as compared with that in a case where control is carried out in the direction in which the brightness of the light source 6 is increased. That is, letting T1 be the time when the brightness of the light source 6 is changed from a minimum brightness level L1 to a maximum brightness level L2, as shown in FIGS. 32 (a) and 32 (b), control is carried out such that the time when the brightness of the light source 6 is changed from the maximum brightness level L2 to the minimum brightness level L1 is a time T2 shorter than the time T1. Also in this case, it goes without saying that the change of speed is important.

Figure 33:
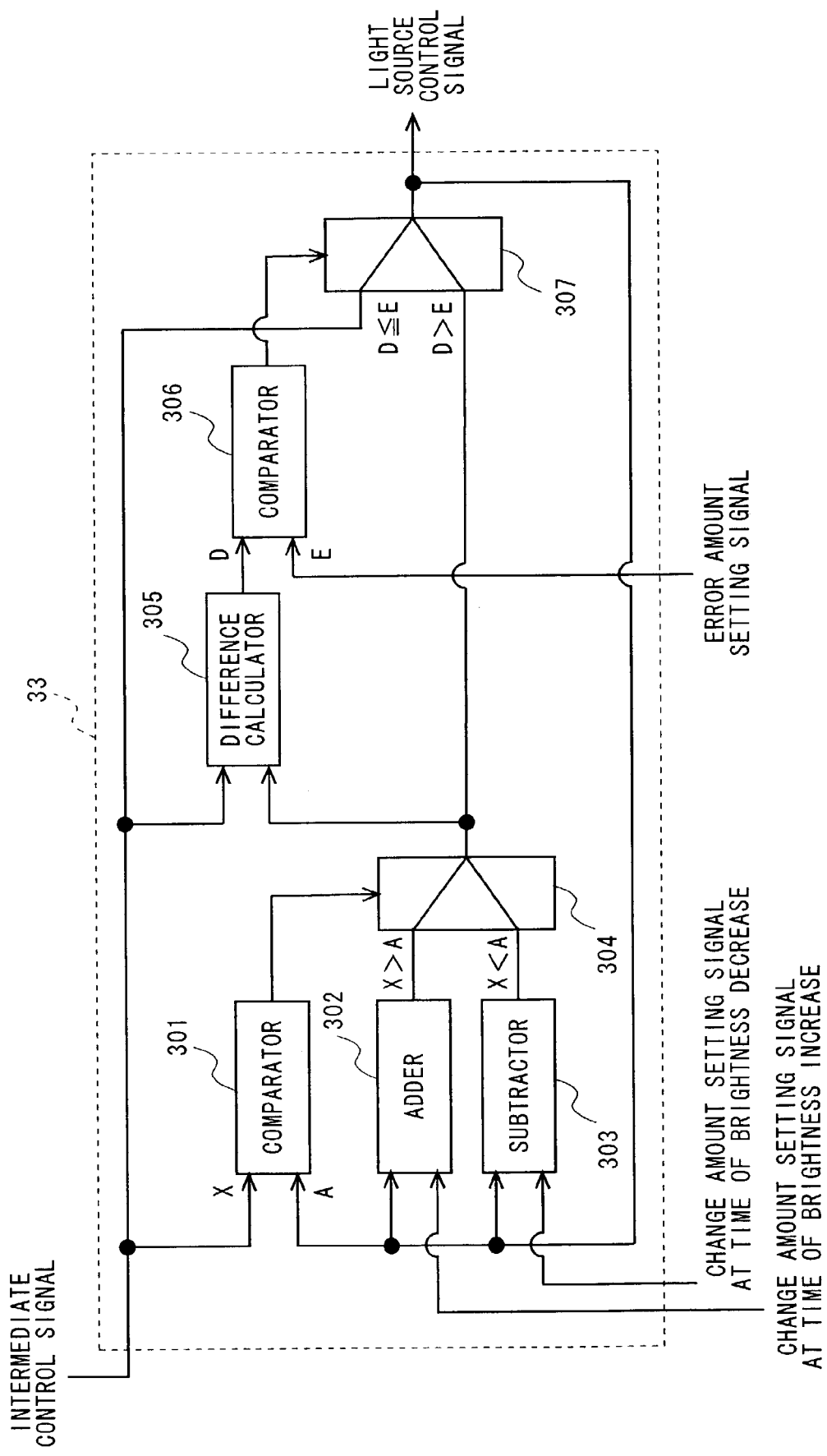
FIG. 33 is a block diagram showing the configuration of a signal change control unit 33.

FIG. 33 illustrates the configuration of the signal change control unit 33. The signal change control unit 33 differs from the signal change control unit 32 in the fifth embodiment shown in FIG. 30 only in that change amount setting signals are separately inputted to an adder 302 and a subtracter 303 from a system control unit 42 and hence, the description of the other components is not repeated.

In the signal change control unit 33, a change amount setting signal at the time of brightness increase is inputted to the adder 302, and a change amount setting signal at the time of brightness decrease is inputted to the subtracter 303. The signal change control unit 32 is thus configured, thereby making it possible to separately set the change speeds in a case where the brightness of the light source 6 is increased and in a case where it is decreased. The change amount setting signal at the time of brightness decrease is always set to a value higher than the change amount setting signal at the time of brightness increase, thereby making it possible to increase the change speed of the brightness in a case where the brightness of the light source 6 is changed in the direction in which it decreases.

Meanwhile, when the change speed of the brightness of the light source is high, the change in the brightness of the light source is perceived so that the quality of display video is degraded, as described above. From this point of view, it is preferable that the change speed of the brightness of the light source is low. However, a lot of relatively dark scenes exist particularly in movie software or the like. The degradation in the quality of display video due to the occurrence of floating blackness, particularly in a dark scene, is a problem which should be avoided. When the dark scene is changed to a bright scene, therefore, the brightness of the light source is changed relatively slowly in order to prevent the change in the brightness of the light source from being perceived to the utmost. On the other hand, when the bright scene is changed to a dark scene, the brightness of the light source is changed relatively fast in order to prevent the occurrence of floating blackness to the utmost, thereby making it possible to improve the quality of the display video as a whole.

The brightness of the light source 6 is reduced quickly depending on the change in the video, thereby making it possible to make a viewer feel that the brightness of the video is further darkened by a multiplier effect produced by the reduction in the brightness of the video and the reduction in the brightness of the light source, and to display more effective video in movie software or the like placing a high value on dark scenes.

As described in the foregoing, according to the sixth embodiment, the change speed of the brightness of the light source 6 in a case where the brightness is controlled in the direction in which it decreases is made higher than that in a case where the brightness is controlled in the direction in which it increases, thereby preventing unnaturalness by the change in the brightness of the light source 6 in a case where the video scene is changed from a dark scene to a bright scene. On the other hand, when the video scene is changed to a dark scene, the brightness of the light source 6 is decreased earlier to mitigate the degradation of the display quality, for example, the floating blackness due to the fact that the brightness of the light source 6 is high, thereby making it possible to improve the quality of the display video as a whole.

Seventh Embodiment

Figure 34:
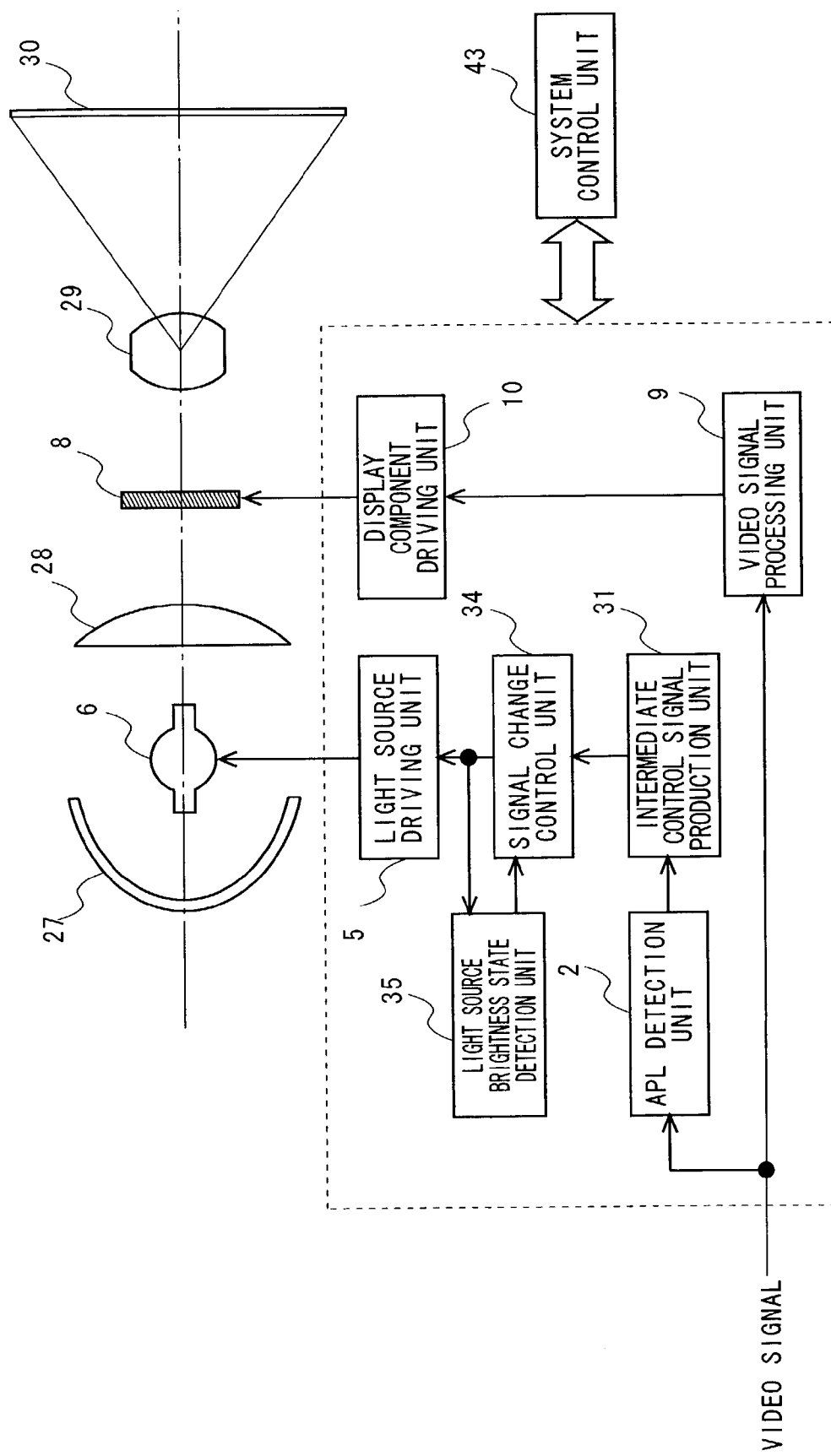
FIG. 34 is a block diagram showing the configuration of a video display apparatus according to a seventh embodiment of the present invention.

FIG. 34 is a block diagram showing the configuration of a video display apparatus according to a seventh embodiment of the present invention. The video display apparatus shown in FIG. 34 differs from the video display apparatus shown in FIG. 28 only in a signal change control unit 34, a light source brightness state detection unit 35, and a system control unit 43. Accordingly, the same other components are assigned to the same reference numerals and hence, the descriptions thereof are not repeated.

In the present embodiment, the signal change control unit 34 controls the change speed of an intermediate control signal generated in an intermediate control signal generation unit 31, to generate a light source control signal for controlling the brightness of a light source 6, as in the fifth embodiment. The light source brightness state detection unit 35 always monitors the light source control signal outputted by the signal change control unit 34, to carry out control for temporarily interrupting or resuming control for causing the brightness of the light source 6 to follow an APL by an elapse of the light emitted state of the light source 6. The control is carried out by outputting a follow-up control signal from the light source brightness state detection unit 35 to the signal change control unit 34, for example. The signal change control unit 34 fixes the level of the light source control signal depending on the follow-up control signal, thereby making it possible to temporarily interrupt control for causing the brightness of the light source to follow the APL.

Figure 35:
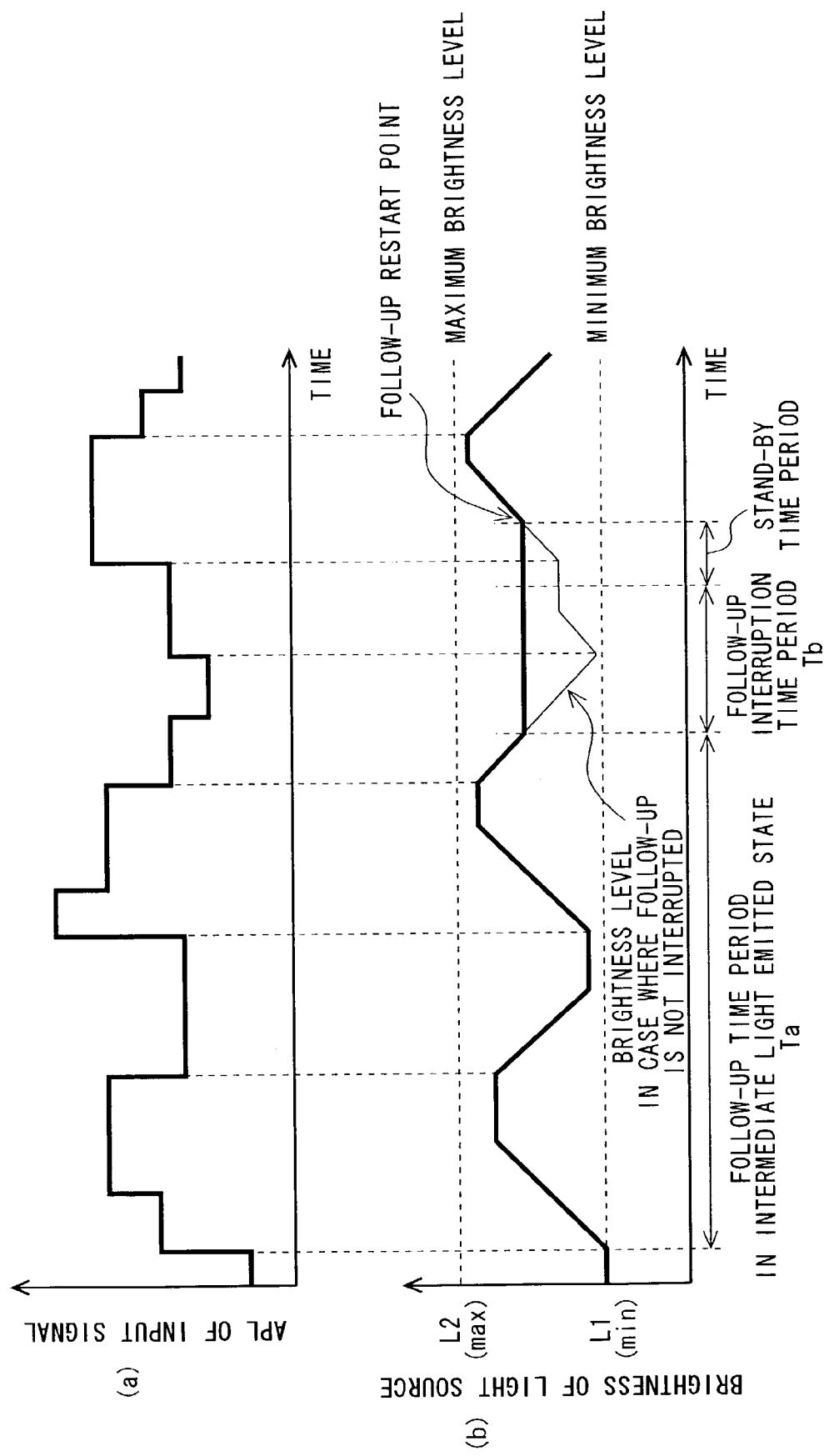
FIGS. 35(a) and 35(b) are diagrams showing an example of the change in time of an APL signal outputted from an APL detection unit 2 and the brightness of a light source 6.

Referring now to FIGS. 35 (a) and 35 (b), the change in the light emitted state of the light source 6 based on the control of the light source brightness state detection unit 35 is described below in detail. FIG. 35 (a) illustrates an example of the change in time of an APL signal outputted from the APL detection unit 2, and FIG. 35 (b) illustrates the change in time of the brightness of the light source 6 driven by a light source control signal generated on the basis of the APL signal shown in FIG. 35 (a). In the present embodiment, the light source brightness state detection unit 35 counts an elapsed time period in a state where the brightness is at neither a minimum brightness level L1 nor a maximum brightness level L2 and is continuously changed in an intermediate region therebetween. When a predetermined time period Ta previously set in the system control unit 43 is counted, the light source brightness state detection unit 35 feeds a follow-up control signal to the signal change control unit 34, to interrupt control for causing the brightness of the light source 6 to follow the APL to change the brightness only for a predetermined time period Tb, and to maintain the brightness at the time point of the interruption. When the interruption time period Tb has elapsed, the procedure enters a stand-by state. The signal change control unit 34 does not resume control for causing the brightness of the light source 6 to follow the APL by a follow-up control signal until the brightness in a case where the control of the light source 6 by the light source control signal is continued without being interrupted (a thin line shown in FIG. 35 (b)) and the brightness of the light source 6 currently maintained (a thick line shown in FIG. 35 (b)) are within a predetermined level difference.

Although the timing at which the control of the light source is resumed is after the brightness of the light source 6 in a case where the control of the light source 6 by the light source control signal is continued without being interrupted and the brightness of the light source 6 which is currently maintained are within a predetermined level difference, the present invention is not limited to the same. For example, the control of the light source may be resumed immediately after an elapse of a follow-up interruption time period Tb, for example. It is preferable that the follow-up is not resumed until the brightness of the light source 6 in a case where the control of the light source 6 by the light source control signal is continued without being interrupted and the brightness of the light source 6 currently maintained are within a predetermined level difference because there is no uncomfortable feeling in video display produced by rapidly resuming the control of the light source which has been interrupted.

Figure 36:
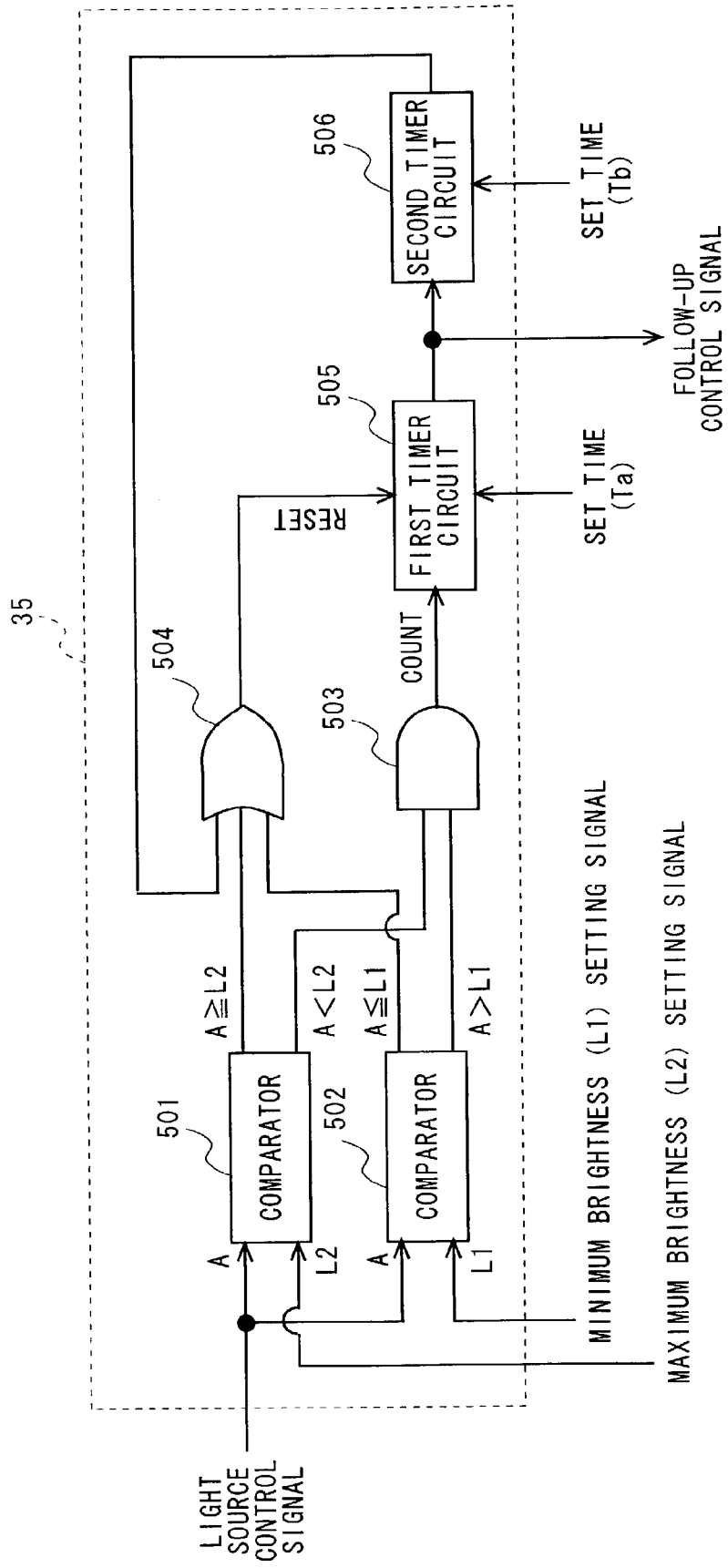
FIG. 36 is a block diagram showing the configuration of a light source brightness state detection unit 35.

FIG. 36 illustrates the configuration of the light source brightness state detection unit 35 in the present embodiment. A light source control signal outputted from the signal change control unit 34 is inputted to a comparator 501 and a comparator 502. The comparator 501 compares the light source control signal with a maximum brightness (L2) setting signal, and the comparator 502 similarly compares the light source control signal with a minimum brightness (L1) setting signal. Both the maximum brightness (L2) setting signal and the minimum brightness (L1) setting signal are fed from the system control unit 43. As a result of the comparison, when the current brightness is in an intermediate state higher than the minimum brightness L1 and lower than the maximum brightness L2, a control signal is outputted to a timer circuit 505 from an AND circuit 503, and the first timer circuit 505 starts the counting of time. In a time period during which the brightness is in an intermediate state, the first timer circuit 505 continues to count time. When the set time Ta set by the system control unit 43 has elapsed, the first timer circuit 505 outputs a follow-up control signal to the signal change control unit 34, to interrupt the brightness control of the light source 6 which has followed the APL as well as to start the counting of the second timer circuit 506.

The second timer circuit 506 feeds a control signal to an OR circuit 504 when the set time Tb set by the system control unit 43 has elapsed, to reset the first timer circuit 505. When the first timer circuit 505 is reset, the follow-up control signal outputted from the first timer circuit 505 is reset, so that the brightness control of the light source 6 in the signal change control unit 34 is allowed to be resumed. When it is detected that the follow-up control signal is reset, the signal change control unit 34 compares the brightness of the light source 6 currently maintained and the intermediate control signal outputted from the intermediate control signal generation unit 31 with each other to perform an operation so as to resume the control of the brightness of the light source 6 when the difference therebetween is within a predetermined range. When the brightness reaches the maximum brightness (L2) or the minimum brightness (L1) while the first timer circuit 505 is counting, the first timer circuit 505 is reset by the comparators 501 and 502 and the OR circuit 504.

As described in the foregoing, according to the seventh embodiment, when the light source continues to change in brightness for a predetermined time period (Ta) in an intermediate state in the control of the brightness of the light source in the video display apparatus, a control such as to cause the brightness of the light source to follow the APL is interrupted for a predetermined time period (Tb), thereby making it possible to prevent the life of the light source from being degraded by changing the brightness of the light source for a long time period.

The improvement in the display quality by causing the brightness of the light source to follow the APL and the improvement in the life of the light source by interrupting the control of the brightness of the light source are generally in a trade-off relationship. Accordingly, to interrupt the control of the light source only for a time period determined each time at timing determined each time, for example, is merely to place the improvement the life of the light source before the improvement in the display quality. In the present embodiment, however, the control of the light source is temporarily interrupted only when the light source continues to change in the brightness in the intermediate state for not less than the predetermined time period. Accordingly, an advantage exceeding a mere trade-off relationship is obtained. The foregoing is described below.

As a hypothetical example for comparison with the present embodiment, description is made of a case where the control of the light source is interrupted only for a time period determined each time at timing determined each time.

Figure 37:
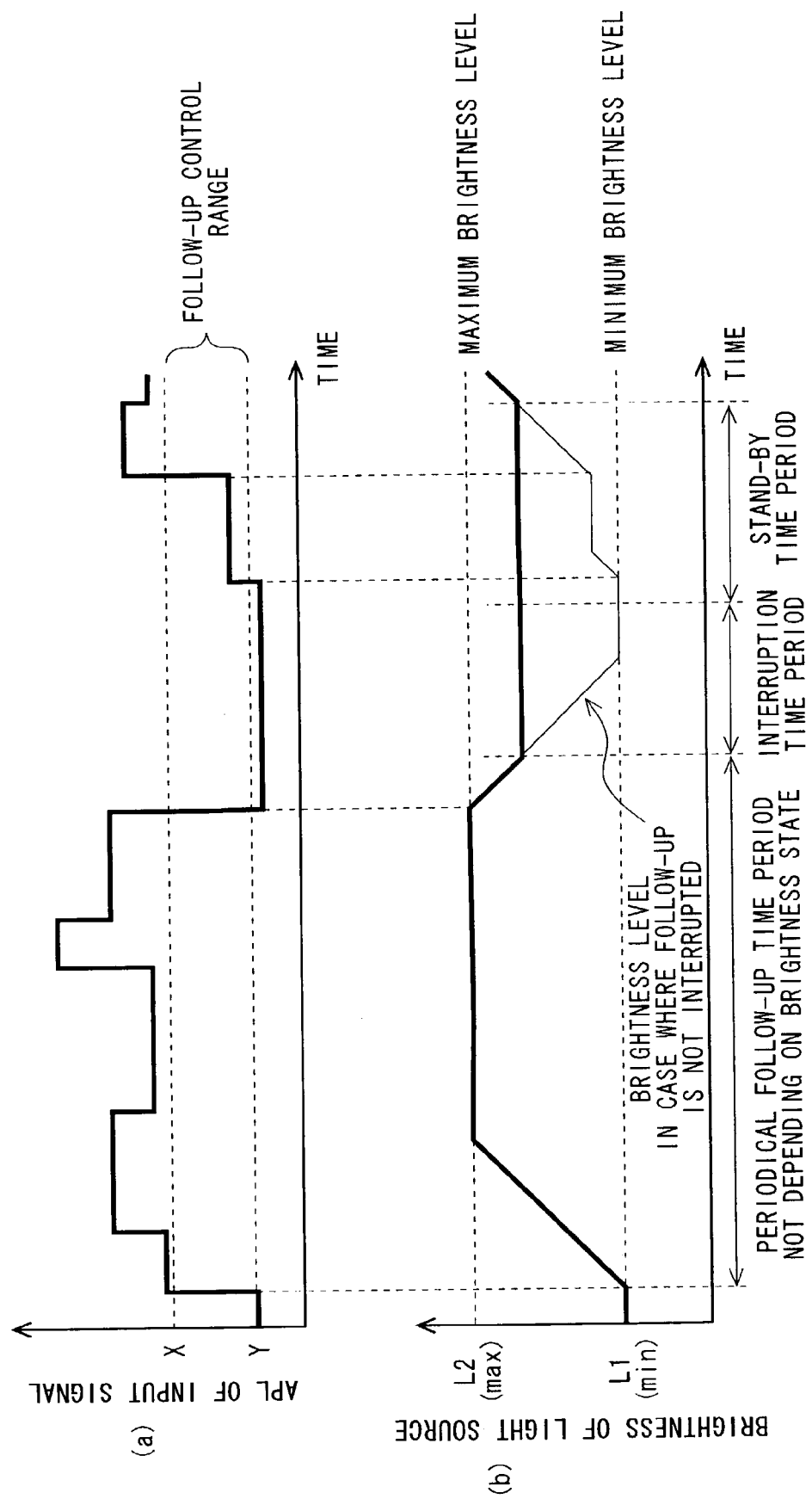
FIGS. 37(a) and 37(b) are diagrams for explaining a comparative example for explaining the effect of the seventh embodiment.

FIG. 37 (a) illustrates an example of the change in time of an APL signal outputted from an APL detection unit in the virtual example. FIG. 37 (b) illustrates the change in time of the brightness of the light source driven by the light source control signal generated on the basis of the APL signal illustrated in FIG. 37 (b). In the virtual example, the light source is driven at the minimum brightness L1 when the level of the APL signal is not more than Y, while being driven at the maximum brightness L2 when it is not less than X. In the virtual example, the control of the light source is merely interrupted for only a time period determined each time at timing determined each time, thereby controlling the brightness of the light source, as indicated by a thick line shown in FIG. 37 (b). A thin line shown in FIG. 37 (b) indicates the change in the brightness of the light source in a case where the control of the light source is not interrupted. When the thick line is viewed, the brightness of the light source is at a predetermined level L2 in a time period before an "interruption time period" as illustrated. Therefore, in this case, even if the brightness control of the light source is not interrupted during the interruption time period, the life of the light source is not seriously affected. According to the hypothetical example, however, the control of the light source is uselessly interrupted, and does not serve to improve the display quality, such as, for example, to prevent floating blackness in this time period.

On the other hand, according to the present embodiment, the control of the light source is not uselessly interrupted. For not less than the predetermined time period, the control of the brightness of the light source is interrupted only when the brightness of the light source is changed in the intermediate state. Consequently, it is possible to interrupt the control of the brightness of the light source at a minimum essential while improving the display quality, thereby obtaining an effect exceeding a mere trade-off relationship.

Eighth Embodiment

Figure 38:
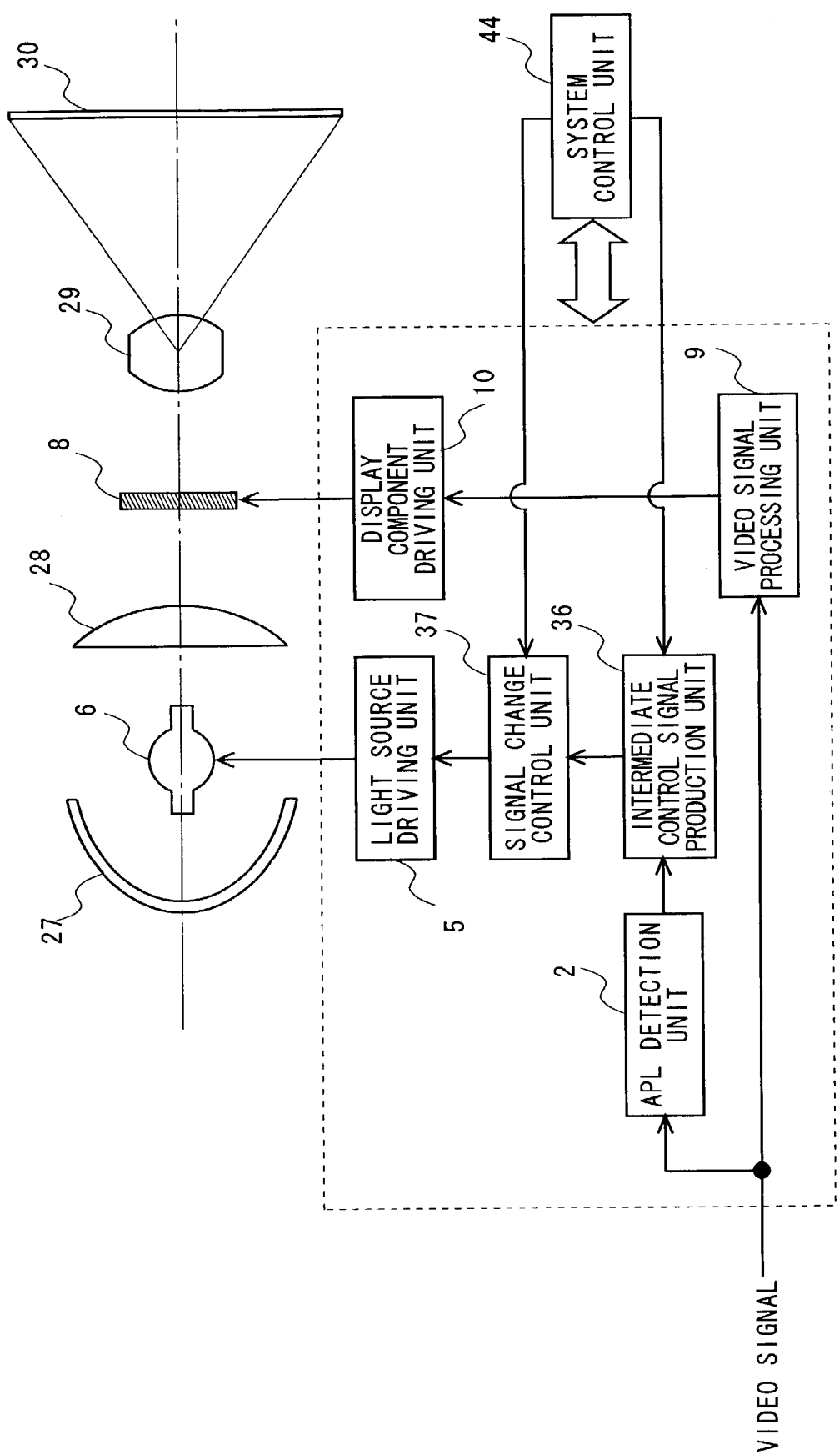
FIG. 38 is a block diagram showing the configuration of a video display apparatus according to an eighth embodiment of the present invention.

FIG. 38 illustrates the configuration of a video display apparatus according to an eighth embodiment of the present invention. The video display apparatus shown in FIG. 38 differs from the video display apparatus shown in FIG. 28 only in an intermediate control signal generation unit 36, a signal change control unit 37, and a system control unit 44. In FIG. 38, the same components as those shown in FIG. 28 are assigned the same reference numerals and hence, the descriptions thereof are not repeated.

In the present embodiment, the system control unit 44 controls each of the above-mentioned control units, particularly to feed a brightness control mute signal to the intermediate control signal generation unit 36 and to feed an initial value setting signal to the signal change control unit 37.

The intermediate control signal generation unit 36 converts an inputted APL signal into an intermediate control signal forming a basis of a light source control signal for controlling for each unit field time period the brightness level of a light source 6 in accordance with a set conversion function or conversion table. The intermediate control signal is controlled such that the brightness of the light source 6 increases when the APL is high, while decreasing when the APL is low.

Since the intermediate control signal generated in the intermediate control signal generation unit 36 is a signal directly formed from the APL of a video signal, it is a signal which changes for each unit field time period by following the change in the APL of the video signal. Herein, a change threshold level APL min is previously set in the intermediate control signal generation unit 36, to carry out control such that the intermediate control signal does not change when the change in the APL in the unit field time period is smaller than the change threshold level APL min. By this processing, control is carried out such that the brightness of the light source 6 is not changed when the change in the APL of the video signal is very small, thereby making it possible to reduce the frequent change in light source driving conditions and to reduce the degradation of the light source by the change in the light source driving conditions.

An intermediate control signal generation unit 36 is supplied from the system control unit 44 with a brightness control mute signal for preventing, when a video signal enters an unstable state at the time of switching an input video signal, for example, light source brightness control from being carried out by following the unstable video signal. Even when the brightness control mute signal is on, an intermediate control signal is controlled so as not to change.

Figure 39:
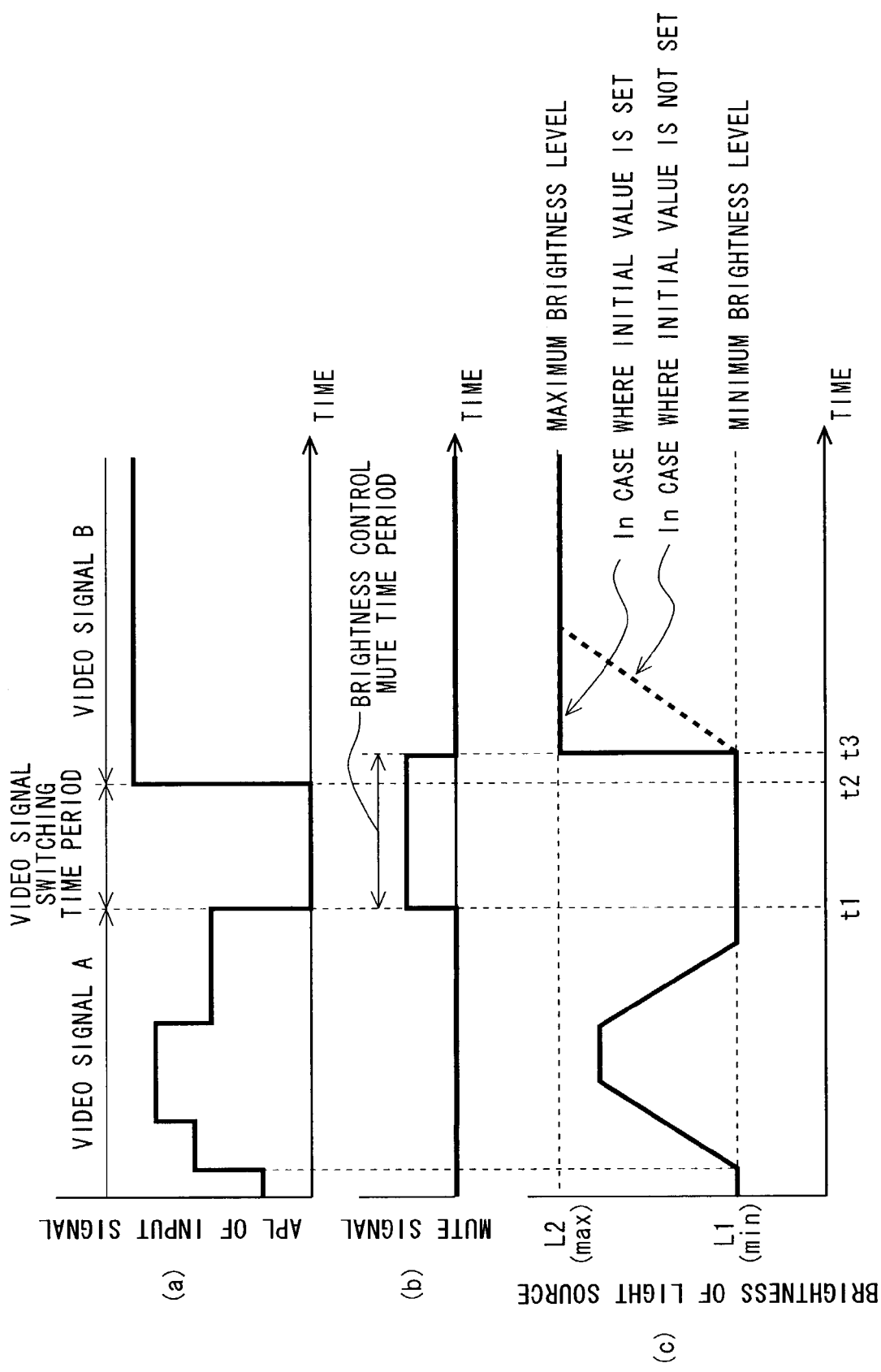
FIGS. 39(a) and 39(b) are diagrams showing an example of the change in time of an APL signal outputted from an APL detection unit 2, a mute signal from a system control unit 44, and the brightness of a light source 6.

The signal change control unit 37 converts an intermediate control signal which changes for each unit field time period into a light source control signal having a low change speed by a set time constant. Referring now to FIGS. 39 (a) to 39 (c), the change in the light emitted state of the light source 6 by the control of the signal change control unit 37 is described below in detail.

FIG. 39 (a) illustrates an example of the change in time of the APL signal outputted from an APL detection unit 2.

FIG. 39 (b) illustrates an example of the change in time of a brightness control mute signal at the time of switching an input video signal. FIG. 39 (c) illustrates the change in time of the brightness of the light source 6 driven by the light source control signal generated on the basis of the APL signal and the brightness control mute signal shown in FIGS. 39 (a) and 39 (b).

Consider a case where the input video signal is switched from a video signal A to a video signal B at a time t1 to a time t2. An APL signal based on each of video signals before and after the switching shall be a signal as shown in FIG. 39 (a). At this time, the brightness control mute signal fed to the intermediate control signal generation unit 36 is controlled by the system control unit 44 such that it is in an on state from the time t1 when the video signal A is switched to a time t3 when the video signal A is switched to the video signal B to stabilize the operations of each of the control units, as shown in FIG. 39 (b). In the intermediate control signal generation unit 36, control is carried out such that the intermediate control signal is not changed while the brightness control mute signal is in an on state. As a result, the light source control signal is not also changed, so that the brightness of the light source does not change from the time t1 to the time t3, as shown in FIG. 39 (c).

Next, consider a state where the brightness control mute signal enters an off state at the time t3, to resume the control of the intermediate control signal generation unit 36. For example, it is assumed that the video signal A is a video signal whose APL is low in a state before the time t1, and the video signal B obtained by the switching is a video signal whose APL continues to be high in a state after the time t2, as shown in FIG. 39 (a). In this case, the brightness of the light source 6 is in a low state immediately before the video signal A is switched, while being maintained in the low state while the brightness control mute signal is in an on state, as shown in FIG. 39 (c). Thereafter, when the brightness control mute signal enters an off state at the time t3, and continues, when control by the intermediate control signal generation unit 36 is resumed, the control as it is in the signal change control unit 37, the signal change control unit 37 starts the follow-up from a state immediately before the time t3: That is, a state where the control level of the brightness of light source is low irrespectively of the fact that the APL of the video signal B is fixed in a state where it is high (a state indicated by a dotted line in FIG. 39 (c)). Accordingly, there occurs a difference between the state of the APL of the actual video and the state of the brightness of the light source, thereby displaying video having an uncomfortable feeling.

In the present embodiment, in order to solve the above-mentioned problem, when an initial value setting signal generated by the system control unit 44 is newly introduced, to turn the brightness control mute signal off, the initial value setting signal is simultaneously fed to the signal change control unit 37, to reset the controlled state. Consequently, control can be newly started from the time point where the controlled state is reset irrespectively of past control history. Accordingly, such video display that an uncomfortable feeding is not produced by non-coincidence between the control of the brightness of the light source and the display video at the time of switching the video signal becomes possible.

Figure 40:
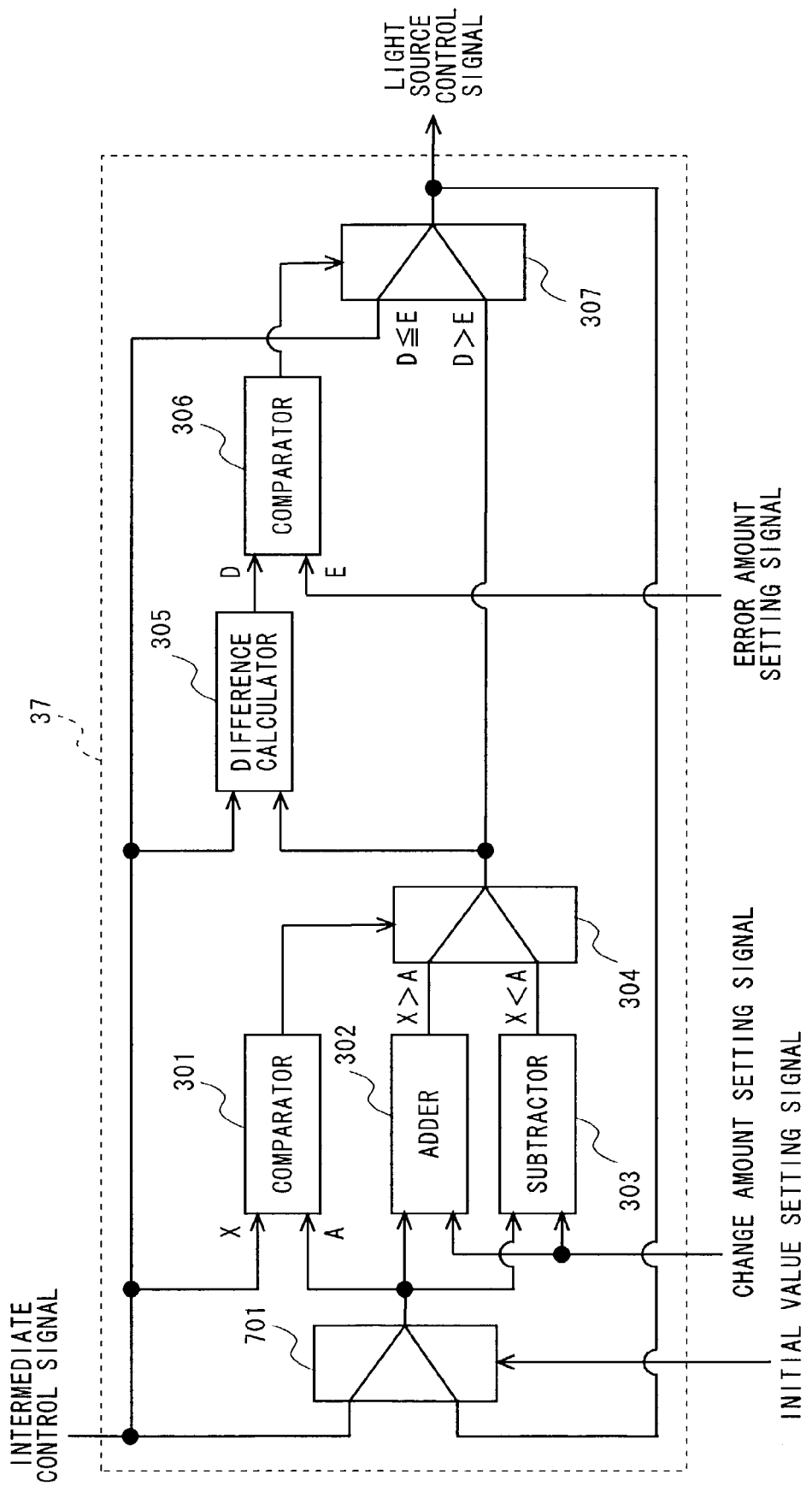
FIG. 40 is a block diagram showing the configuration of a signal change control unit 37.

The signal change control unit 37 is described below in detail. FIG. 40 illustrates the configuration of the signal change control unit 37. The signal change control unit 37 shown in FIG. 40 differs from the signal change control unit 32 shown in FIG. 30 in that it newly includes a selector 701. Accordingly, the same other components are assigned the same reference numerals and hence, the descriptions thereof are not repeated.

The selector 701 is controlled by the initial value control signal from the system control unit 44. The selector 701 switches a signal to be fed back to an adder 302, a subtracter 303, and a comparator 301 in accordance with the initial value control signal. More specifically, the selector 701 generally feeds an output of the selector 307 to each of the above-mentioned units, and feeds, when it receives the initial value control signal from the system control unit 44 at the timing of the time t3 shown in FIG. 39 (c), that is, the timing at which the video signal is stabilized upon completion of the switching thereof, the intermediate control signal from the intermediate control signal generation unit 36 to each of the above-mentioned units. The intermediate control signal is fed back as it is after it is switched, to reset the past controlled state of the light source control signal, thereby making it possible to immediately adjust the light source control signal to a level corresponding to the APL of the current video signal.

As described in the foregoing, according to the eighth embodiment, the video display apparatus is configured so as to control the brightness of the light source in synchronization with the APL, thereby to control the brightness of the light source in the direction in which it decreases in a dark scene where the APL is low, as in movie software, thereby making it possible to mitigate the problem of the quality of display video in the dark scene, for example, floating blackness on a screen, to provide video which is higher in quality. Particularly, the light source control signal is reset by the initial value control signal, thereby making it possible to start the control of the brightness of the light source under new conditions in a case where it is not desired to continue the past controlled state, for example, at the time of switching the input video signal, the control of the brightness of the light source can be started under new conditions. Accordingly, it is possible to avoid the problem that the controlled state of the brightness of the light source and the state of the display video do not coincide with each other, thereby making it possible to display video having noun comfortable feeling dependent on the state of the display video.

INDUSTRIAL APPLICABILITY

As described in the foregoing, in a video display apparatus including a transmission type or reflection type display component having a light modulating function and a light source for irradiating light onto the display component, a video display apparatus and a video display method according to the present invention mitigate the degradation of the quality of display video caused by the lack of a contrast feeling and the occurrence of floating blackness, and also improve the reliability of the apparatus.

The invention claimed is:

1. A video display apparatus that irradiates light from a light source onto a display component of transmission or reflection type having a light modulating function to display video, the video display apparatus comprising:
   APL detection means for detecting an average picture level of an input video signal;
   light amount control data production means for producing light amount control data for controlling an amount of the light irradiated onto the display component on the basis of the average picture level detected by the APL detection means; and
   light amount control means for controlling the amount of the light irradiated onto the display component on the basis of the light amount control data, wherein
   the light amount control data production means produces the light amount control data such that the amount of the light irradiated onto the display component is controlled so as to be constant when the average picture level detected by the APL detection means is within a range from 0 to a first predetermined value greater than 0 and so as to continuously increase with an increase of the average picture level detected by the APL detection means when the average picture level is in a range of more than the first predetermined value.

2. The video display apparatus according to claim 1, wherein the light amount control data production means comprises light source control data production means for producing light source control data for controlling the light source on the basis of the average picture level detected by the APL detection means,
   the light amount control means comprises light source driving means for driving the light source on the basis of the light source control data, and
   the light source control data production means produces the light source control data so as to drive the light source substantially at a minimum level at which the light source is stably drivable when the average picture level detected by the APL detection means is within the range from 0 to the first predetermined value greater than 0 and so as to drive the light source to continuously increase the amount of the light irradiated onto the display component with an increase of the average picture level detected by the APL detection means when the average picture level is in the range of more than the first predetermined value.

3. The video display apparatus according to claim 1, further comprising an optical aperture placed between the light source and the display component for controlling the amount of the light irradiated onto the display component, wherein
   the light amount control data production means comprises optical aperture control data production means for producing optical aperture control data for controlling the optical aperture on the basis of the average picture level detected by the APL detection means, the light amount control means comprises optical aperture driving means for driving the optical aperture on the basis of the optical aperture control data, and the optical aperture control data production means produces the optical aperture control data so as to drive the optical aperture such that the amount of the light irradiated onto the display component is constant when the average picture level detected by the APL detection means is within the range from 0 to the first predetermined value greater than 0 and such that the amount of the light irradiated onto the display component continuously increases with an increase of the average picture level detected by the APL detection means when the average picture level is in the range of more than the first predetermined value.

4. The video display apparatus according to claim 1, further comprising a light control element placed between the light source and the display component for controlling the amount of the light irradiated onto the display component, wherein the light amount control data production means comprises light control element control data production means for producing light control element control data for controlling the light control element on the basis of the average picture level detected by the APL detection means, the light amount control means comprises light control element driving means for driving the light control element on the basis of the light control element control data, and the light control element control data production means produces the light control element control data so as to drive the light control element such that the amount of the light irradiated onto the display component is constant when the average picture level detected by the APL detection means is within the range from 0 to the first predetermined value greater than 0 and such that the amount of the light irradiated onto the display component continuously increases with an increase of the average picture level detected by the APL detection means when the average picture level is in the range of more than the first predetermined value.

5. The video display apparatus according to claim 1, wherein the light amount control data production means produces the light amount control data so as to fix the amount of the light irradiated onto the display component to be constant at a predetermined minimum level when the average picture level detected by the APL detection means is lower than the first predetermined value.

6. The video display apparatus according to claim 1, wherein the light amount control data production means produces the light amount control data so as to fix the amount of the light irradiated onto the display component at a predetermined maximum level when the average picture level detected by the APL detection means is higher than a second predetermined value greater than the first predetermined value.

7. The video display apparatus according to claim 1, further comprising means for filtering the light amount control data produced by the light amount control data production means, to provide a delay function to a change in the light amount control data.

8. The video display apparatus according to claim 1, wherein the light amount control data production means produces the light amount control data on the basis of an average of average picture levels in a plurality of unit field time periods.

9. The video display apparatus according to claim 1, further comprising means for filtering an output at the average picture level detected by the APL detection means, to provide a delay function to a change in the average picture level.

10. The video display apparatus according to claim 1, wherein the light amount control data production means produces, when a change per unit time in the average picture level detected by the APL detection means is smaller than a predetermined threshold value, the light amount control data so as to maintain the amount of the light irradiated onto the display component at a level immediately before the change without following the change.

11. The video display apparatus according to claim 1, further comprising histogram production means for dividing a picture level of the input video signal into a plurality of picture level sections, and detecting a histogram distribution for each of the picture level sections, wherein the light amount control data production means produces, when the histogram distribution for each of the picture level sections which is detected by the histogram production means is in a predetermined distributed state, the light amount control data so as to fix the amount of the light irradiated onto the display component to be constant at a predetermined level corresponding to the predetermined distributed state irrespectively of the average picture level detected by the APL detection means.

12. The video display apparatus according to claim 11, wherein the light amount control data production means produces, when the histogram distribution for at least one of the plurality of picture level sections which is detected by the histogram production means is larger or smaller than a predetermined threshold value, the light amount control data so as to fix the amount of the light irradiated onto the display component to be constant at the predetermined level.

13. The video display apparatus according to claim 11, wherein the light amount control data production means produces, when judged that a video scene related to the input video signal is a dark scene on the basis of the histogram distribution detected by the histogram production means, the light amount control data so as to fix the amount of the light irradiated onto the display component to be constant at a predetermined minimum level.

14. A video display method in which light from a light source is irradiated onto a display component of transmission or reflection type having a light modulating function to display video, the video display method comprising:

detecting an average picture level of an input video signal;

producing light amount control data for controlling an amount of the light irradiated onto the display component on the basis of the average picture level; and controlling the amount of the light irradiated onto the display component on the basis of the light amount control data, wherein the producing of the light amount control data comprises producing the light amount control data such that the amount of the light irradiated onto the display component is controlled so as to be constant when the average picture level is within a range from 0 to a first predetermined value greater than 0 and so as to continuously increase with an increase of the average picture level when the average picture level is in a range of more than the first predetermined value.

15. The video display method according to claim 14, wherein the producing of the light amount control data comprises producing light source control data for controlling the light source on the basis of the average picture level,
  the controlling of the amount of the light comprises driving the light source on the basis of the light source control data, and
  the producing of the light source control data comprises producing the light source control data so as to drive the light source substantially at a minimum level at which the light source is stably drivable when the average picture level is within the range from 0 to the first predetermined value greater than 0 and so as to drive the light source to continuously increase the amount of the light irradiated onto the display component with an increase of the average picture level when the average picture level is in the range of more than the first predetermined value.

16. The video display method according to claim 14, wherein the producing of the light amount control data comprises producing optical aperture control data for controlling an optical aperture placed between the light source and the display component for controlling the amount of the light irradiated onto the display component on the basis of the average picture level,
  the controlling of the amount of the light comprises driving the optical aperture on the basis of the optical aperture control data, and
  the producing of the optical aperture control data comprises producing the optical aperture control data so as to drive the optical aperture such that the amount of the light irradiated onto the display component is constant when the average picture level is within the range from 0 to the first predetermined value greater than 0 and such that the amount of the light irradiated onto the display component continuously increases with an increase of the average picture level when the average picture level is in the range of more than the first predetermined value.

17. The video display method according to claim 14, wherein the producing of the light amount control data comprises producing light control element control data for controlling a light control element placed between the light source and the display component for controlling the amount of the light irradiated onto the display component on the basis of the average picture level,
  the controlling of the amount of the light comprises driving the light control element on the basis of the light control element control data, and
  the producing of the light control element control data produces the light control element control data so as to drive the light control element such that the amount of the light irradiated onto the display component is constant when the average picture level is within the range from 0 to the first predetermined value greater than 0 and such that the amount of the light irradiated onto the display component continuously increases with an increase of the average picture level when the average picture level is in the range of more than the first predetermined value.

18. The video display method according to claim 14, wherein the producing of the light amount control data comprises producing the light amount control data so as to fix the amount of the light irradiated onto the display component to be constant at a predetermined minimum level when the average picture level is lower than the first predetermined value.

19. The video display method according to claim 14, wherein the producing of the light amount control data comprises producing the light amount control data so as to fix the amount of the light irradiated onto the display component at the predetermined maximum level when the average picture level is higher than a second predetermined value greater than the first predetermined value.

20. The video display method according to claim 14, further comprising filtering the light amount control data, to provide a delay function to a change in the light amount control data.

21. The video display method according to claim 14, wherein the producing of the light amount control data comprises producing the light amount control data on the basis of an average of average picture levels in a plurality of unit field time periods.

22. The video display method according to claim 14, further comprising filtering an output at the detecting of the average picture level operation, to provide a delay function to a change in the average picture level.

23. The video display method according to claim 14, wherein the producing of the light amount control data comprises producing, when a change per unit time in the average picture level is smaller than a predetermined threshold value, the light amount control data so as to maintain the amount of the light irradiated onto the display component at a level immediately before the change without following the change.

24. The video display method according to claim 14, further comprising dividing a picture level of the input video signal into a plurality of picture level sections, and detecting a histogram distribution for each of the picture level sections, wherein
  the producing of the light amount control data comprises producing, when the histogram distribution for each of the picture level sections is in a predetermined distributed state, the light amount control data so as to fix the amount of the light irradiated onto the display component to be constant at a predetermined level corresponding to the predetermined distributed state irrespectively of the average picture level.

25. The video display method according to claim 24, wherein the producing of the light amount control data comprises producing, when the histogram distribution for at least one of the plurality of picture level sections is larger or smaller than a predetermined threshold value, the light amount control data so as to fix the amount of the light irradiated onto the display component to be constant at the predetermined level.

26. The video display method according to claim 24, wherein the producing of the light amount control data comprises producing, when judged that a video scene related to the input video signal is a dark scene on the basis of the histogram distribution, the light amount control data so as to fix the amount of the light irradiated onto the display component be constant at a predetermined minimum level.

27. A video display apparatus that irradiates light from a light source onto a display component of transmission or reflection type having a light modulating function to display video, the video display apparatus comprising:
  an APL detection unit operable to detect an average picture level of an input video signal;
  a light amount control data production unit operable to produce light amount control data for controlling an amount of the light irradiated onto the display component on the basis of the average picture level detected by the APL detection unit; and a light amount control unit operable to control the amount of the light irradiated onto the display component on the basis of the light amount control data, wherein the light amount control data production unit produces the light amount control data such that the amount of the light irradiated onto the display component is controlled so as to be constant when the average picture level detected by the APL detection unit is within a range from 0 to a first predetermined value greater than 0 and so as to continuously increase with an increase of the average picture level detected by the APL detection unit when the average picture level is in a range of more than the first predetermined value.

28. The video display apparatus according to claim 27, wherein the light amount control data production unit comprises a light source control data production unit operable to produce light source control data for controlling the light source on the basis of the average picture level detected by the APL detection unit, the light amount control unit comprises a light source driving unit operable to drive the light source on the basis of the light source control data, and the light source control data production unit produces the light source control data so as to drive the light source substantially at a minimum level at which the light source is stably drivable when the average picture level detected by the APL detection unit is within the range from 0 to the first predetermined value greater than 0 and so as to drive the light source to continuously increase the amount of the light irradiated onto the display component with an increase of the average picture level detected by the APL detection unit when the average picture level is in the range of more than the first predetermined value.

29. The video display apparatus according to claim 27, further comprising an optical aperture placed between the light source and the display component for controlling the amount of the light irradiated onto the display component, wherein the light amount control data production unit comprises an optical aperture control data production unit operable to produce optical aperture control data for controlling the optical aperture on the basis of the average picture level detected by the APL detection unit, the light amount control unit comprises an optical aperture driving unit operable to drive the optical aperture on the basis of the optical aperture control data, and the optical aperture control data production unit produces the optical aperture control data so as to drive the optical aperture such that the amount of the light irradiated onto the display component is constant when the average picture level detected by the APL detection unit is within the range from 0 to the first predetermined value greater than 0 and such that the amount of the light irradiated onto the display component continuously increases with an increase of the average picture level detected by the APL detection unit when the average picture level is in the range of more than the first predetermined value.

30. The video display apparatus according to claim 27, further comprising a light control element placed between the light source and the display component for controlling the amount of the light irradiated onto the display component, wherein the light amount control data production unit comprises a light control element control data production unit operable to produce light control element control data for controlling the light control element on the basis of the average picture level detected by the APL detection unit, the light amount control unit comprises a light control element driving unit operable to drive the light control element on the basis of the light control element control data, and the light control element control data production unit produces the light control element control data so as to drive the light control element such that the amount of the light irradiated onto the display component is constant when the average picture level detected by the APL detection unit is within the range from 0 to the first predetermined value greater than 0 and such that the amount of the light irradiated onto the display component continuously increases with an increase of the average picture level detected by the APL detection unit when the average picture level is in the range of more than the first predetermined value.

31. The video display apparatus according to claim 27, wherein the light amount control data production unit produces the light amount control data so as to fix the amount of the light irradiated onto the display component to be constant at a predetermined minimum level when the average picture level detected by the APL detection unit is lower than the first predetermined value.

32. The video display apparatus according to claim 27, wherein the light amount control data production unit produces the light amount control data so as to fix the amount of the light irradiated onto the display component at a predetermined maximum level when the average picture level detected by the APL detection unit is higher than a second predetermined value greater than the first predetermined value.

33. The video display apparatus according to claim 27, further comprising a filter operable to filter the light amount control data produced by the light amount control data production unit, to provide a delay function to a change in the light amount control data.

34. The video display apparatus according to claim 27, wherein the light amount control data production unit produces the light amount control data on the basis of an average of average picture levels in a plurality of unit field time periods.

35. The video display apparatus according to claim 27, further comprising a filter operable to filter an output at the average picture level detected by the APL detection unit, to provide a delay function to a change in the average picture level.

36. The video display apparatus according to claim 27, wherein the light amount control data production unit produces, when a change per unit time in the average picture level detected by the APL detection unit is smaller than a predetermined threshold value, the light amount control data so as to maintain the amount of the light irradiated onto the display component at a level immediately before the change without following the change.

37. The video display apparatus according to claim 27, further comprising a histogram production unit operable to divide a picture level of the input video signal into a plurality of picture level sections, and detect a histogram distribution for each of the picture level sections, wherein the light amount control data production unit produces, when the histogram distribution for each of the picture level sections which is detected by the histogram production unit is in a predetermined distributed state, the light amount control data so as to fix the amount of the light irradiated onto the display component to be constant at a predetermined level corresponding to the predetermined distributed state irrespectively of the average picture level detected by the APL detection unit.

38. The video display apparatus according to claim 37, wherein the light amount control data production unit produces, when the histogram distribution for at least one of the plurality of picture level sections which is detected by the histogram production unit is larger or smaller than a predetermined threshold value, the light amount control data so as to fix the amount of the light irradiated onto the display component to be constant at the predetermined level.

39. The video display apparatus according to claim 37, wherein the light amount control data production unit produces, when judged that a video scene related to the input video signal is a dark scene on the basis of the histogram distribution detected by the histogram production unit, the light amount control data so as to fix the amount of the light irradiated onto the display component to be constant at a predetermined minimum level.

40. A video display apparatus comprising:
a light source;
a display component of transmission or reflection type operable to modulate light;
a light amount control unit operable to control an amount of light irradiated onto the display component, wherein
the light amount control unit controls the amount of the light irradiated onto the display component so as to be constant when an average picture level of an input video signal is within a range from 0 to a first predetermined value greater than 0 and so as to continuously increase with an increase of the average picture level when the average picture level is in a range of more than the first predetermined value.

41. The video display apparatus according to claim 40, wherein the light amount control unit comprises:
a light source control data production unit operable to produce light source control data for controlling the light source on the basis of the average picture level; and
a light source driving unit operable to drive the light source on the basis of the light source control data, and
the light source control data production unit produces the light source control data so as to drive the light source substantially at a minimum level at which the light source is stably drivable when the average picture level is within the range from 0 to the first predetermined value greater than 0 and so as to drive the light source to continuously increase the amount of the light irradiated onto the display component with an increase of the average picture level when the average picture level is in the range of more than the first predetermined value.

42. The video display apparatus according to claim 40, further comprising an optical aperture placed between the light source and the display component for controlling the amount of the light irradiated onto the display component, wherein
the light amount control unit comprises;
an optical aperture control data production unit operable to produce optical aperture control data for controlling the optical aperture on the basis of the average picture level; and
an optical aperture driving unit operable to drive the optical aperture on the basis of the optical aperture control data, and the optical aperture control data production unit produces the optical aperture control data so as to drive the optical aperture such that the amount of the light irradiated onto the display component is constant when the average picture level is within the range from 0 to the first predetermined value greater than 0 and such that the amount of the light irradiated onto the display component continuously increases with an increase of the average picture level when the average picture level is in the range of more than the first predetermined value.

43. The video display apparatus according to claim 40, further comprising a light control element placed between the light source and the display component for controlling the amount of the light irradiated onto the display component, wherein
the light amount control unit comprises:
a light control element control data production unit operable to produce light control element control data for controlling the light control element on the basis of the average picture level; and
a light control element driving unit operable to drive the light control element on the basis of the light control element control data, and
the light control element control data production unit produces the light control element control data so as to drive the light control element such that the amount of the light irradiated onto the display component is constant when the average picture level is within the range from 0 to the first predetermined value greater than 0 and such that the amount of the light irradiated onto the display component continuously increases with an increase of the average picture level when the average picture level is in the range of more than the first predetermined value.

44. The video display apparatus according to claim 40, wherein the light amount control unit fixes the amount of the light irradiated onto the display component to be constant at a predetermined minimum level when the average picture level is lower than the first predetermined value.

45. The video display apparatus according to claim 40, wherein the light amount control unit fixes the amount of the light irradiated onto the display component at a predetermined maximum level when the average picture level is higher than a second predetermined value greater than the first predetermined value.

46. The video display apparatus according to claim 40, further comprising a filter operable to provide a delay function to the control of the amount of the light irradiated onto the display component by the light amount control unit.

47. The video display apparatus according to claim 40, wherein the light amount control unit controls the amount of the light irradiated onto the display component on the basis of an average of average picture levels in a plurality of unit field time periods.

48. The video display apparatus according to claim 40, further comprising a filter operable to filter the average picture level, to provide a delay function to a change in the average picture level.

49. The video display apparatus according to claim 40, wherein when a change per unit time in the average picture level is smaller than a predetermined threshold value, the light amount control unit maintains the amount of the light irradiated onto the display component at a level immediately before the change without following the change.

50. The video display apparatus according to claim 40, further comprising a histogram production unit operable to divide a picture level of the input video signal into a plurality of picture level sections, and detect a histogram distribution for each of the picture level sections, wherein when the histogram distribution for each of the picture level sections which is detected by the histogram production unit is in a predetermined distributed state, the light amount control unit fixes the amount of the light irradiated onto the display component to be constant at a predetermined level corresponding to the predetermined distributed state irrespectively of the average picture level.

51. The video display apparatus according to claim 50, wherein when the histogram distribution for at least one of the plurality of picture level sections which is detected by the histogram production unit is larger or smaller than a predetermined threshold value, the light amount control unit fixes the amount of the light irradiated onto the display component to be constant at the predetermined level.

52. The video display apparatus according to claim 50, wherein when judged that a video scene related to the input video signal is a dark scene on the basis of the histogram distribution detected by the histogram production unit, the light amount control unit fixes the amount of the light irradiated onto the display component to be constant at a predetermined minimum level.

* * * * *